US012162039B2

(12) United States Patent
Randolph et al.

(10) Patent No.: US 12,162,039 B2
(45) Date of Patent: Dec. 10, 2024

(54) PRODUCT CLASSIFICATION, SORTING, AND PACKING SYSTEMS AND METHODS

(71) Applicant: Marble, Inc., Cambridge, MA (US)

(72) Inventors: Tyler Randolph, Edgefield, SC (US); Geethika Weliwitigoda, Westford, MA (US); Fayez Albarbari, Belmont, MA (US); David McKenna, Sioux City, IA (US)

(73) Assignee: Marble, Inc., Cambridge, MA (US)

( * ) Notice: Subject to any disclaimer, the term of this patent is extended or adjusted under 35 U.S.C. 154(b) by 0 days.

(21) Appl. No.: 18/449,537

(22) Filed: Aug. 14, 2023

(65) Prior Publication Data

US 2024/0050989 A1 Feb. 15, 2024

Related U.S. Application Data

(60) Provisional application No. 63/424,043, filed on Nov. 9, 2022, provisional application No. 63/397,664, filed on Aug. 12, 2022.

(51) Int. Cl.
*B07C 3/06* (2006.01)
*B07C 1/04* (2006.01)

(52) U.S. Cl.
CPC .................. *B07C 3/06* (2013.01); *B07C 1/04* (2013.01); *B07C 2501/0081* (2013.01)

(58) Field of Classification Search
CPC ..... B07C 3/06; B07C 1/04; B07C 2501/0081; B07C 5/36
See application file for complete search history.

(56) References Cited

U.S. PATENT DOCUMENTS

| | | | | |
|---|---|---|---|---|
| 3,653,918 | A | 4/1972 | Wallace | |
| 2004/0151364 | A1 | 8/2004 | Kenneway et al. | |
| 2008/0036139 | A1 | 2/2008 | Reyner et al. | |
| 2017/0174439 | A1 | 6/2017 | Ripley | |
| 2023/0241776 | A1* | 8/2023 | Kuck | B65B 57/14 700/217 |
| 2023/0347386 | A1* | 11/2023 | Harris | B07C 5/362 |

FOREIGN PATENT DOCUMENTS

CN 211515240 U 9/2020

OTHER PUBLICATIONS

American Conveyor Group, SmartPace Dynamic Pacing Conveyor, Feb. 23, 2017, https://web.archive.org/web/20170223184834/https://acgconveyors.com/partners/dorner-smartpace-conveyor/ (Year: 2017).*
International Searching Authority, “International Search Report and Written Opinion” from PCT/US23/30162, mailed Jan. 22, 2024, pp. 1-9.

* cited by examiner

*Primary Examiner* — Jacob S. Scott
*Assistant Examiner* — Miraj T. Patel
(74) *Attorney, Agent, or Firm* — Fredrikson & Byron, P.A.

(57) ABSTRACT

A product processing and packing system including a product classifier to determine a product classification of a product as a function of sensor data. The system also has a sorting conveyor to guide the product to a loading station or other product receiving area. The system also has at least one processor to control the sorting of the product into the desired loading station or product receiving area as a function of the product classification. The system may also have a packed box merge and take away system.

20 Claims, 40 Drawing Sheets

PRODUCT CLASSIFICATION, SORTING, AND PACKING SYSTEMS AND METHODS

CROSS-REFERENCE TO RELATED APPLICATION(S)

This application claims the benefit under 35 U.S.C. § 119(e) to U.S. Provisional Application 63/397,664, filed Aug. 12, 2022 and entitled "Product Pack-Off;" and U.S. Provisional Application 63/424,043, filed Nov. 9, 2022 and entitled "Product Pack-Off," both of which are hereby incorporated herein by reference in their entireties.

FIELD

The various embodiments herein relate to product processing and, more particularly, various embodiments relate to sorting, moving, and/or packaging products.

BACKGROUND

Product processing plants may process different products. These products typically may be weighed, sorted into groups, and packaged for transport to stores, restaurants, or end users. Existing processing equipment lacks the automation and the software to accomplish the processing in an efficient manner and limited human input.

There is a need in the art for improved product processing and packing systems.

BRIEF SUMMARY

Discussed herein are various product processing systems for processing and packing a variety of different products and methods of operating those systems. The various embodiments include classification devices, sorting conveyors, loading stations, and packed product conveyors along with processors that utilize various sensors to classify each product and control the sorting and packing based in part on the classification of each product.

In Example 1, a product processing system comprises a sorting conveyor configured to guide a product along the sorting conveyor, at least two product pushing devices associated with the sorting conveyor, wherein each of the at least two product pushing devices is configured to move between a first position and a second position, at least two loading stations associated with the sorting conveyor such that each of the at least two loading stations is disposed adjacent to one of the at least two product pushing devices, and at least one processor. The processor is configured to control one or more sensors to capture sensor data regarding the product as the product moves through the product processing system, determine, based at least in part on the sensor data, a product classification of the product, select, based at least in part on the product classification, the second position for one of the at least two product pushing devices to guide the product into one of the at least two loading stations, and control the one of the at least two pushing devices to be configured in the second position.

Example 2 relates to the product processing system according to Example 1, further comprising a product classification device comprising at least one of the one or more sensors, wherein the at least one of the one or more sensors comprises at least one of a scale, a belt encoder, or an imaging device.

Example 3 relates to the product processing system according to Example 1, wherein the product classification includes a confidence value, and wherein the at least one processor is configured to select the first or second position as a function of the confidence value.

Example 4 relates to the product processing system according to Example 1, wherein the product classification includes a meat cut value, and wherein the at least one processor is configured to select one of the at least two loading stations as a function of the meat cut value.

Example 5 relates to the product processing system according to Example 1, further comprising a spacing conveyor configured to space the product from adjacent products.

Example 6 relates to the product processing system according to Example 1, wherein the at least two product pushing devices comprise pushing paddles or diverter arms.

Example 7 relates to the product processing system according to Example 1, comprising a robotic arm configured to move the product from the one of the at least two loading stations to a bulk package.

Example 8 relates to the product processing system according to Example 1, further comprising a packed box conveyor configured to move packed box from one of the at least two loading stations.

Example 9 relates to the product processing system according to Example 1, wherein the system automates product sorting by meat cut type (i.e., shank brisket, rib, short plate, flank, etc.), weight, geometric features (i.e., length, width, height, cross sectional area, volume, uniformity etc.), and/or product specific features (i.e., % fat cover, parallel end cuts, % bone content etc.).

Example 10 relates to the product processing system according to Example 1, wherein the at least one processor is configured to control sorting as a function of a plurality of properties.

In Example 11, a product processing system comprises a spacing conveyor configured to space a product from adjacent products, a product classification device comprising at least one classification sensor, wherein the product classification device is configured to receive the product from the spacing conveyor, a sorting conveyor configured to receive the product from the product classification device, at least two product pushing devices associated with the sorting conveyor, wherein each of the at least two product pushing devices is configured to move between a first position and a second position, at least two product receiving areas associated with the sorting conveyor such that each of the at least two product receiving areas is disposed adjacent to one of the at least two product pushing devices, and at least one processor. The at least one processor is configured to control the at least one classification sensor and at least one additional sensor to capture sensor data regarding the product as the product moves through the product processing system, determine, based at least in part on the sensor data, a product classification of the product, select, based at least in part on the product classification, the second position for one of the at least two product pushing devices to guide the product into one of the at least two product receiving areas, and control the one of the at least two pushing devices to be configured in the second position.

Example 12 relates to the product processing system according to Example 11, wherein the at least one classification sensor comprises a scale, a belt encoder, or an imaging device.

Example 13 relates to the product processing system according to Example 11, wherein the at least two product receiving areas comprises a loading station or a bulk container disposed in the at least two product receiving areas.

Example 14 relates to the product processing system according to Example 13, wherein the loading station comprises a chute disposed adjacent to the sorting conveyor, a product landing area disposed at the bottom of the chute, and a takeaway conveyor disposed under the chute.

Example 15 relates to the product processing system according to Example 14, further comprising a packed box conveyor disposed adjacent to the takeaway conveyor, wherein the packed box conveyor is configured to receive a packed box from the takeaway conveyor and transport the packed box away from the takeaway conveyor.

Example 16 relates to the product processing system according to Example 11, further comprising an empty box conveyor associated with the at least product receiving areas.

In Example 17, a product processing system comprises a product classification device comprising at least one classification sensor and a stacked conveyor structure. The stacked conveyor structure comprises a sorting conveyor configured to receive the product from the product classification device, the sorting conveyor comprising at least two product pushing devices associated with the sorting conveyor, wherein each of the at least two product pushing devices is configured to move between a first position and a second position, and a packed box conveyor disposed under the sorting conveyor, wherein the packed box conveyor is configured to transport at least one packed box. The system further comprises at least two loading stations disposed adjacent to the stacked conveyor structure such that each of the at least two loading stations is disposed adjacent to one of the at least two product pushing devices, and at least one processor configured to control the at least one classification sensor and at least one additional sensor to capture sensor data regarding the product as the product moves through the product processing system, determine, based at least in part on the sensor data, a product classification of the product, select, based at least in part on the product classification, the second position for one of the at least two product pushing devices to guide the product into one of the at least two loading stations, and control the one of the at least two pushing devices to be configured in the second position.

Example 18 relates to the product processing system according to Example 17, further comprising a spacing conveyor configured to space a product from adjacent products and transport the product to the product classification device.

Example 19 relates to the product processing system according to Example 17, wherein the loading station comprises a chute disposed adjacent to the sorting conveyor, a computer interface coupled to the chute, wherein the computer interface is operably coupled to the at least one processor, a product landing area disposed at the bottom of the chute, and a takeaway conveyor disposed under the chute and adjacent to the packed box conveyor.

Example 20 relates to the product processing system according to Example 17, wherein the stacked conveyor structure further comprises a rejected product conveyor disposed under the sorting conveyor.

While multiple embodiments are disclosed, still other embodiments will become apparent to those skilled in the art from the following detailed description, which shows and describes illustrative embodiments. As will be realized, the various implementations are capable of modifications in various obvious aspects, all without departing from the spirit and scope thereof. Accordingly, the drawings and detailed description are to be regarded as illustrative in nature and not restrictive.

DETAILED DESCRIPTION

The various embodiments herein relate to systems and methods for classifying, sorting, and packing products into bulk packaging. Such systems (also referred to herein as "pack-off systems") can include implementations that receive products from a vacuum sealer, classify the products, sort the products, and pack the products into bulk packaging. While some of the system embodiments discussed in detail herein are configured to process meat products, alternative implementations can process any types of products.

Figure 1:
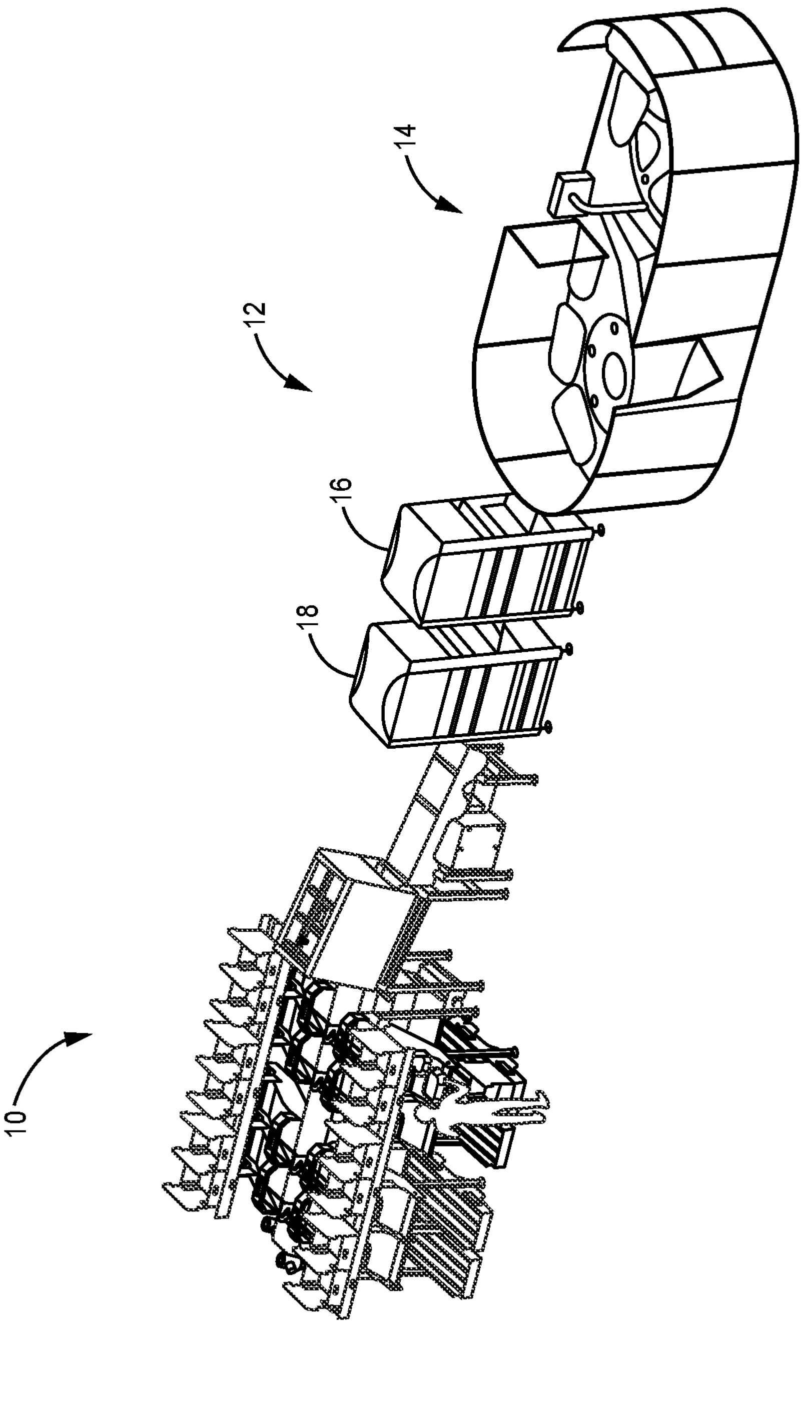
FIG. 1 is a perspective view of a product processing and packing system receiving products from a vacuum-sealing system, according to one embodiment.

One exemplary system embodiment 10 is shown in FIG. 1, in which the processing system 10 receives meat products from a known vacuum-sealing system 12 that vacuum seals each individual meat product. The vacuum-sealing system 12 has a vacuum sealer 14 that vacuums and seals the meat product into a packaging, a shrink tunnel 16 that uses hot water to shrink the bag tighter around the meat, and a blower 18 that dries the vacuum-sealed meat product. The processing system 10 receives the vacuum-sealed meat product from the blower 18 and classifies, sorts, and ultimately packs that product into a box or other bulk packaging. In other embodiments, the pack-off system 10 and any other system embodiment disclosed or contemplated herein receives meat products from any known vacuum-sealing system or any other product conveyance system. Further, the various pack-off systems herein can receive meat products which are packaged or unpackaged. In further alternatives, any of the exemplary pack-off systems herein may be configured to receive other types of products.

Figure 2A:
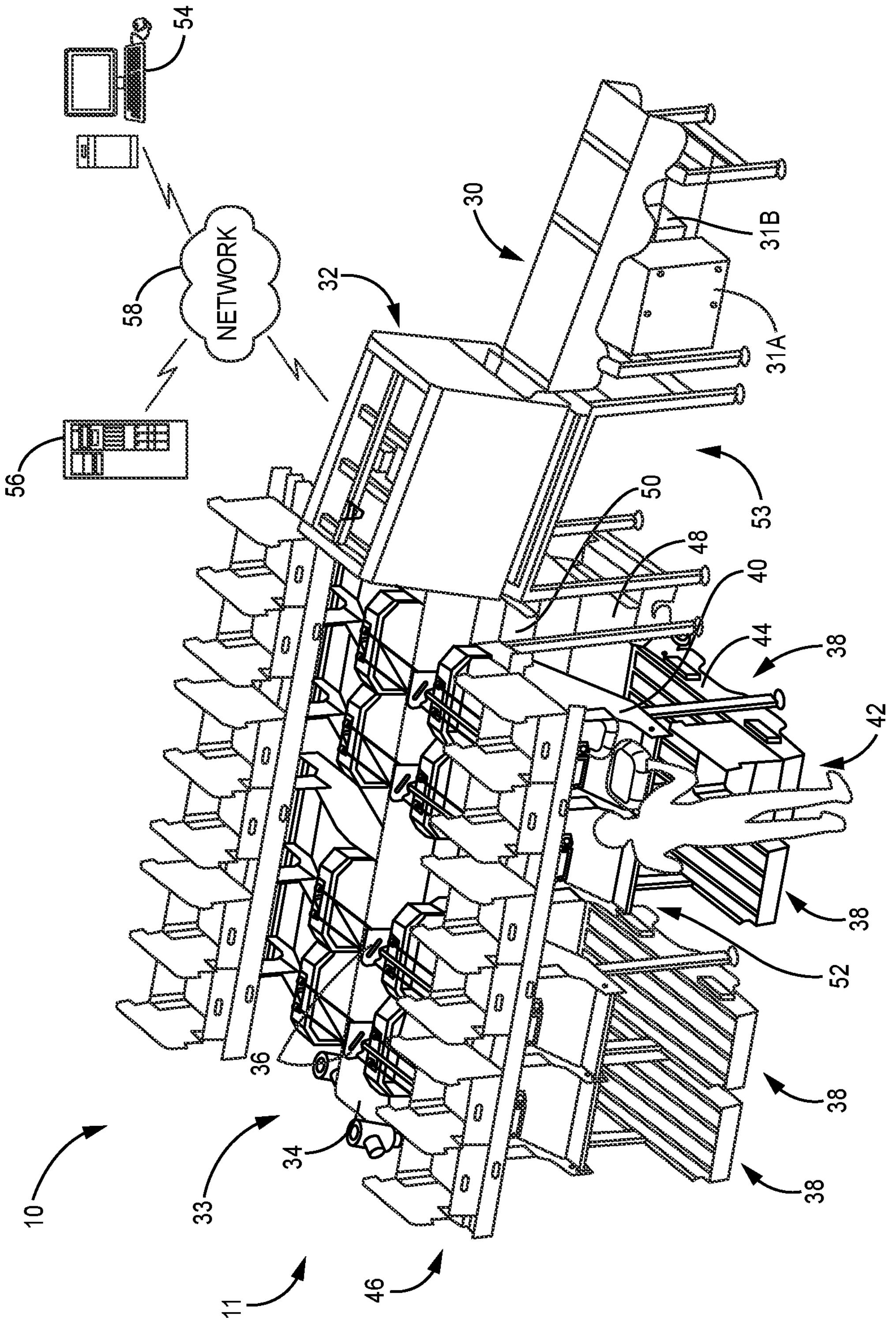
FIG. 2A is a perspective view of a product processing and packing system, according to one embodiment.

The exemplary product processing system 10 of FIG. 1 is shown in additional detail in FIGS. 2A-3F, according to one implementation. More specifically, FIG. 2A depicts the entire system 10, including the product processing and packing equipment system 11 and the associated computing device and servers (and related software) 54 used to operate the processing and packing equipment system 11 and the overall system 10, FIGS. 2B and 2B depict additional details about the computing device 54 and overall architecture of the system 10, and FIGS. 3A-3F depict exemplary mechanical processing components of one embodiment of the processing and packing equipment system 11. As best shown in FIGS. 2A and 3A-3F, the processing and packing equipment system 11 in this embodiment has a product receiving conveyor 30, a product classification system 32, a sort conveyor 34 with multiple sorting pushers 36, and multiple loading stations 38 disposed along the sort conveyor 34 adjacent to the pushers 36. As shown, there are loading stations 38 on both sides of the conveyor 34. Alternatively, there can be loading stations 38 on only one side of the conveyor 34. Each loading station 38 includes a product chute 40 adjacent to the conveyor 34, a box loading area 42 at the end of the chute 40, and a takeaway conveyor 44 disposed under the chute 40. In certain implementations, each loading station 38 can also have a computer interface 45 that can display certain information about the products being boxed at that station 38 and further can allow for a user to interact with the interface 45 to input information and/or control certain aspects of the system 10. There is also an empty box conveyer 46 positioned across and above the loading stations 38. Further, the system 10 also has a packed box conveyor 48 disposed adjacent to the takeaway conveyors 44 and a rejected product conveyor 50 disposed above the packed box conveyor 48 such that the rejected product conveyor 50 is disposed between the sort conveyor 34 above and the packed box conveyor 48 below.

Figure 3A:
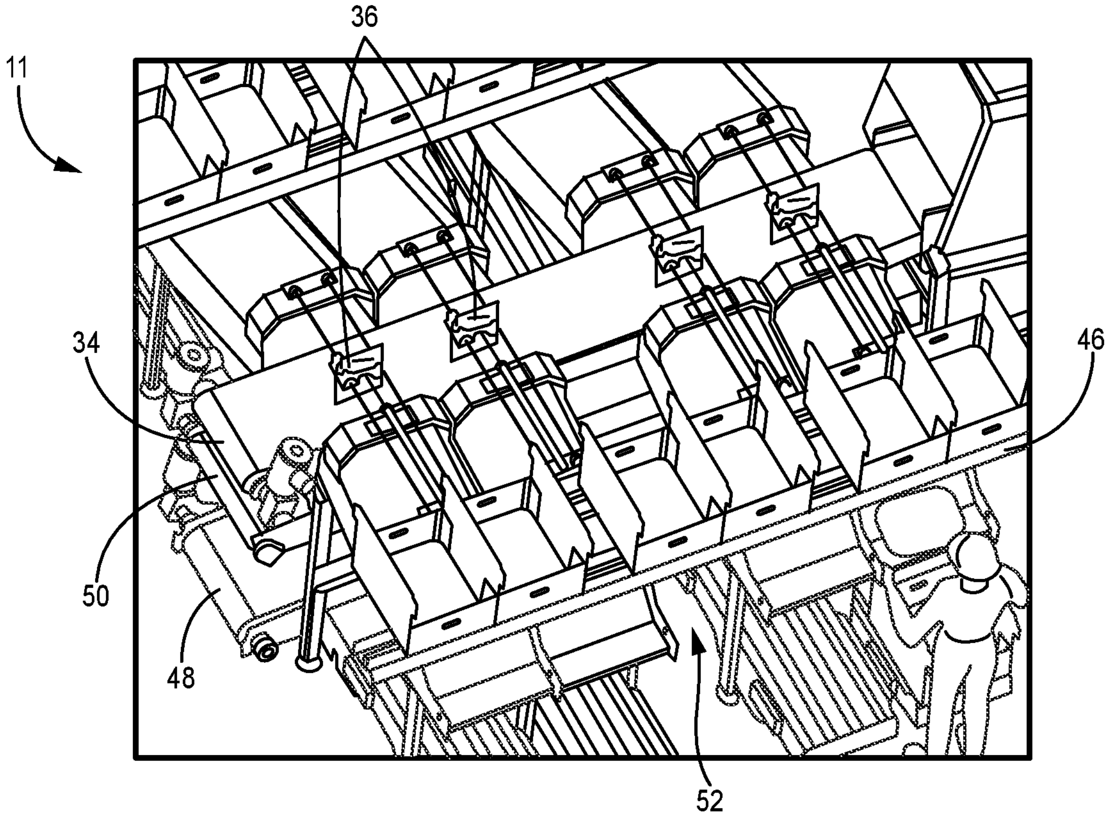
FIG. 3A is a perspective view of a product processing and packing equipment system, according to one embodiment.
Figure 3B:
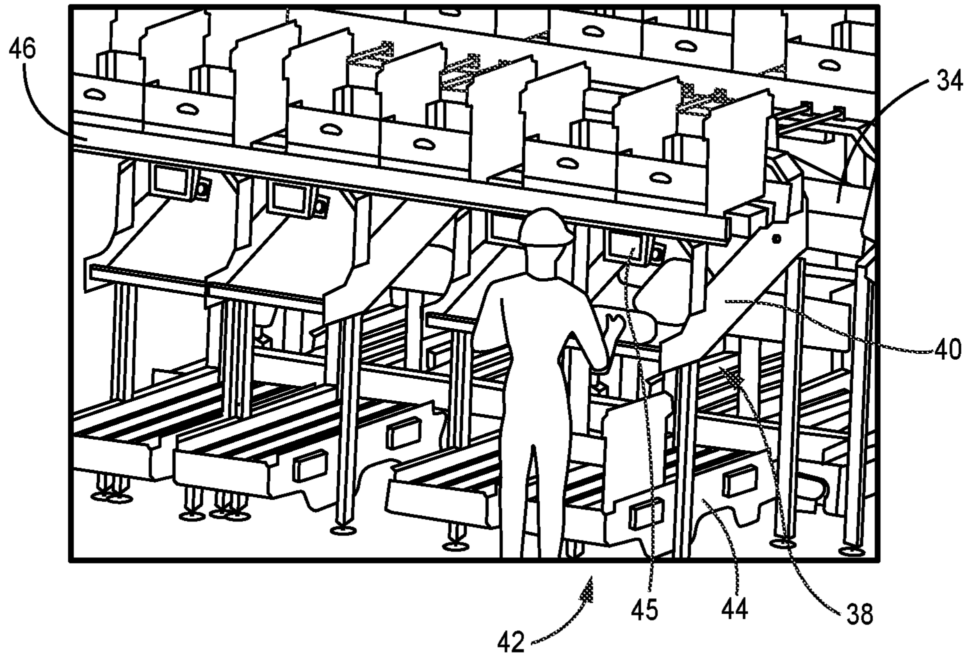
FIG. 3B is another perspective view of the product processing and packing equipment system of FIG. 3A, according to one embodiment.
Figure 3C:
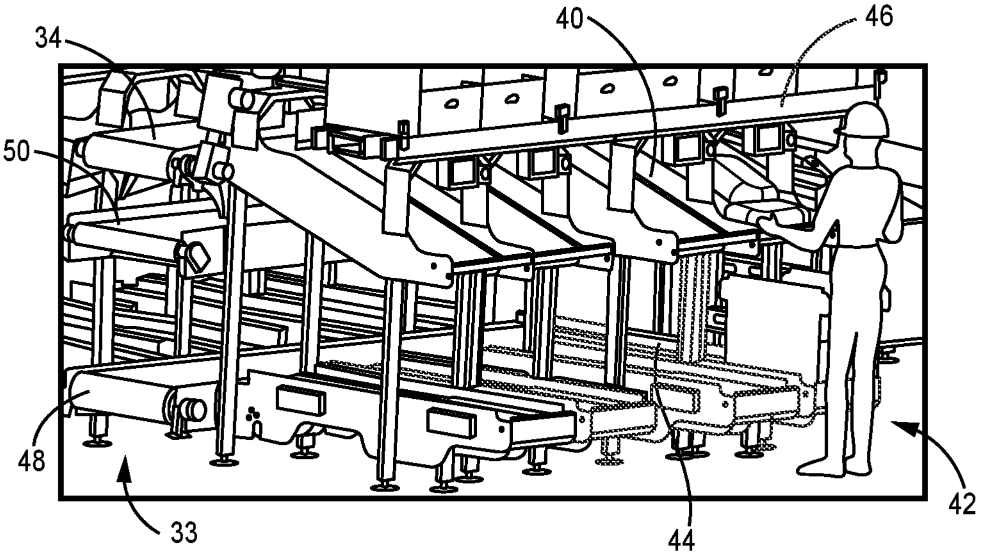
FIG. 3C is another perspective view of the product processing and packing equipment system of FIG. 3A, according to one embodiment.
Figure 3D:
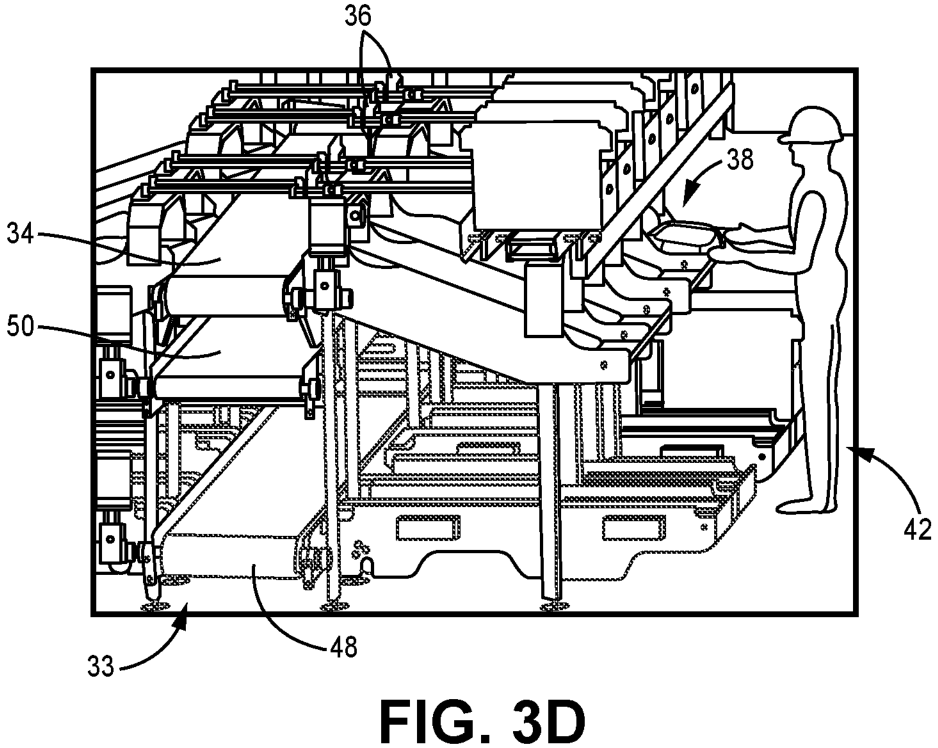
FIG. 3D is another perspective view of the product processing and packing equipment system of FIG. 3A, according to one embodiment.

Thus, in this exemplary embodiment, the sorting conveyor 34, the rejected product conveyor 50, and the packed box conveyor 48 form a stacked conveyor structure 33 as best shown in FIGS. 3C and 3D. Stacking the conveyors 34, 50, 48 in this manner (i.e., in the Z-direction) into a stacked structure like structure 33 reduces the cumulative footprint of the three conveyors 34, 50, 48. This enables use of the overall system in a smaller space, thereby enhancing the configurability of the overall processing and packing equipment system 11.

Figure 2B:
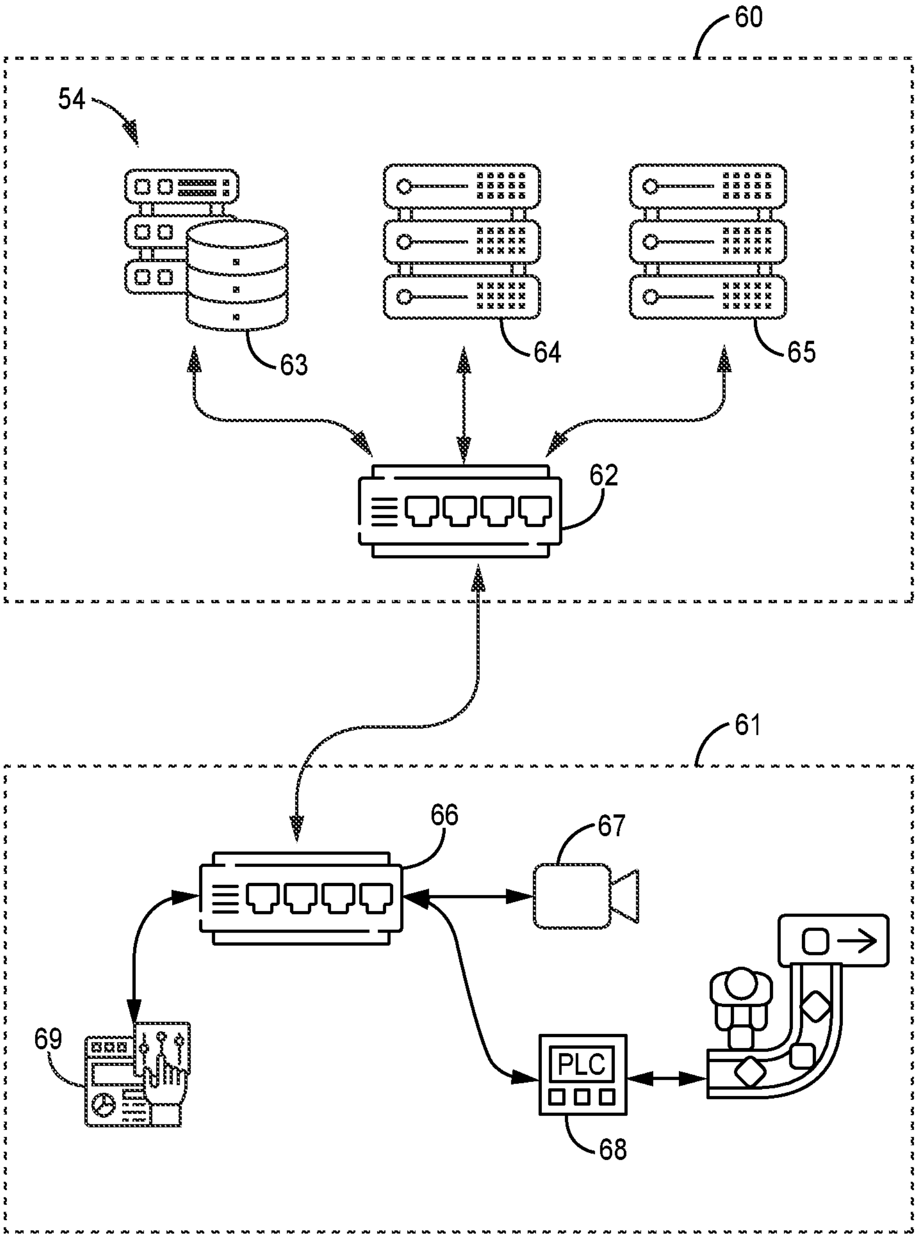
FIG. 2B is a schematic view of a computing device and overall computer architecture of a product processing and packing system, according to one embodiment.
Figure 2C:
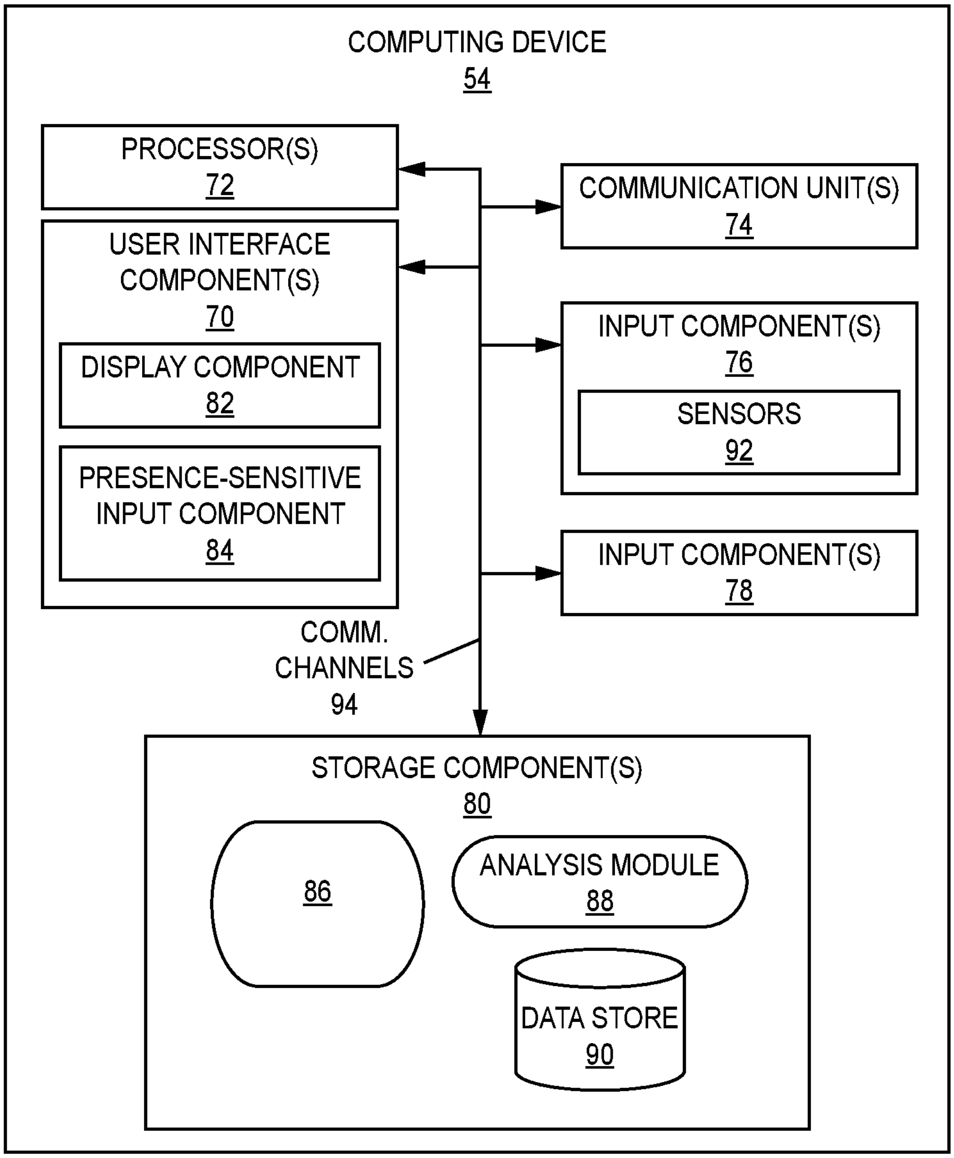
FIG. 2C is a schematic view of another computing device of a product processing and packing system, according to one embodiment.

Further, as shown in FIGS. 2B and 2C, various computing device 54 embodiments with one or more servers 56 can be coupled to any of the systems disclosed or contemplated herein via a network 58 such as the internet 58 or the like. More specifically, FIG. 2B depicts one version of a computer device 54 for use with the system 10 (or any system herein) while FIG. 2C depicts another version of a computer device 54 that can be used with the system 10 (or any system herein).

FIG. 2B is a schematic diagram illustrating one exemplary embodiment of a computing device 54 configured to perform the techniques described herein. In certain implementations, the device 54 is a comprehensive system designed for use in product processing, including meat packing facilities, and other industrial settings. The device consists of two main components: the data center 60 and the packoff line 61. In certain embodiments, the data center 60 is on premises. The data center 60 hosts managed network switches 62, database servers 63, computer vision servers 64, and application servers 65. In certain embodiments, these servers 63, 64, 65 run the software that operates the product processing equipment as described in detail herein. The packoff line 61 has a managed switch 66 that facilitates communication and data transfer among the various components of the computing device 54. Further, the packoff line 61 can be coupled to a computer vision camera 67 that, according to certain embodiments, is disposed within the classification system 32 as described herein such that the camera 67 can capture image frames of the products and transmit them to the computer vision servers 64. The computer vision servers 64 can perform product classification and geometric feature analysis on the images as described in further detail elsewhere herein. In addition, the packoff line 61 also has a controller 68 that helps to operate the real-time sorting function of the processing equipment. More specifically, in certain embodiments, the controller is a programmable logic controller ("PLC") 68 that actuates the pushers 36 to urge items into the predetermined loading stations 38 as described in detail elsewhere herein. Further, the packoff line 61 can also have interfaces 69 (such as interfaces 45 discussed above and elsewhere herein) that allow operators to interact with the system 10. In certain exemplary embodiments, the interfaces 69 are touch screen human-machine interfaces ("HMI") that display real-time product classification information and collect valuable feedback and inputs from the operators as described in additional detail elsewhere herein, helping to optimize and create a more efficient packing process.

According to an alternative implementation, FIG. 2C depicts another example of a computing device 54 configured to perform the techniques described herein. Computing device 54 of FIG. 2C is described below as an example of computing device 54 in FIG. 2A. FIG. 2C illustrates only one additional example of computing device 54, and many other examples of computing device 54 may be used in other instances and may include a subset of the components included in example computing device 54 or may include additional components not shown in FIG. 2C.

Computing device 54 may be any computer with the processing power required to adequately execute the techniques described herein. For instance, computing device 54 may be any one or more of a mobile computing device (e.g., a smartphone, a tablet computer, a laptop computer, etc.), a desktop computer, a wearable computing device (e.g., a smart watch, computerized glasses, smart headphones, etc.), a virtual reality/augmented reality/extended reality (VR/AR/XR) system, a video game or streaming system, a network modem, router, or server system, or any other computerized device that may be configured to perform the techniques described herein.

As shown in the example of FIG. 2C, computing device 54 includes user interface components (UIC) 70, one or more processors 72, one or more communication units 74, one or more input components 76, one or more output components 78, and one or more storage components 80. UIC 70 includes display component 82 and presence-sensitive input component 84. Storage components 80 of computing device 54 include communication module 86, analysis module 88, and data store 90.

One or more processors 72 may implement functionality and/or execute instructions associated with computing device 54 to operate various aspects of the product processing embodiments herein. That is, processors 72 may implement functionality and/or execute instructions associated with computing device 54 to control functionalities such as product spacing, classification, sorting, packing, etc.

Examples of processors 72 include any combination of application processors, display controllers, auxiliary processors, one or more sensor hubs, and any other hardware configured to function as a processor, a processing unit, or a processing device, including dedicated graphical processing units (GPUs). Modules 86 and 88 may be operable by processors 72 to perform various actions, operations, or functions of computing device 54 for operation of the various system embodiments herein (including system 10). In certain specific embodiments, the programmable controller such as the PLC 68 discussed above can also be operable by the processors 72 to perform various actions relating to the product processing systems herein, including, for example, product sorting. In other examples, processors 72 of computing device 54 may retrieve and execute instructions stored by storage components 80 that cause processors 72 to perform the various operations of the system implementations herein. The instructions, when executed by processors 72, may cause computing device 54 to operate the system equipment, including, for example, the conveyors, the classification system, the sorting equipment, the loading stations, etc.

Communication module 86 may execute locally (e.g., at processors 72) to provide functions associated with managing a user interface (e.g., user interfaces 45) that computing device 54 provides at UIC 70 for example, for facilitating interactions between an operator and the system 10. In some examples, communication module 86 may act as an interface to a remote service accessible to computing device 54. For example, communication module 86 may be an interface or application programming interface (API) to a remote server that controls managing user interfaces 45 that computing device 54 provides at UIC 70 for facilitating interactions between an operator and the system.

In some examples, analysis module 88 may execute locally (e.g., at processors 72) to provide functions associated with the various functionalities of the system embodiments herein, such as analyzing the data captured by the various sensors placed throughout product processing system 10 in order to control diverter arm 440. In some examples, analysis module 88 may act as an interface to a remote service accessible to computing device 54. For example, analysis module 88 may be an interface or application programming interface (API) to a remote server that controls the product analysis and receives diverter arm positioning information based on such analysis.

One or more storage components 80 within computing device 54 may store information for processing during operation of computing device 54 (e.g., computing device 54 may store data accessed by modules 86 and 88 during execution at computing device 54). In some examples, storage component 80 is a temporary memory, meaning that a primary purpose of storage component 80 is not long-term storage. Storage components 80 on computing device 54 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 80, in some examples, also include one or more computer-readable storage media. Storage components 80 in some examples include one or more non-transitory computer-readable storage mediums. Storage components 80 may be configured to store larger amounts of information than typically stored by volatile memory. Storage components 80 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 80 may store program instructions and/or information (e.g., data) associated with modules 86 and 88 and data store 90. Storage components 80 may include a memory configured to store data or other information associated with modules 86 and 88 and data store 90.

Communication channels 94 may interconnect each of the components 70, 72, 74, 76, 78, and 80 for inter-component communications (physically, communicatively, and/or operatively). In some examples, communication channels 94 may include a system bus, a network connection, an inter-process communication data structure, or any other method for communicating data.

One or more communication units 74 of computing device 54 may communicate with external devices—such as the product processing equipment and systems—via one or more wired and/or wireless networks by transmitting and/or receiving network signals on one or more networks. Examples of communication units 74 include a network interface card (e.g., such as an Ethernet card), an optical transceiver, a radio frequency transceiver, a GPS receiver, a radio-frequency identification (RFID) transceiver, a near-field communication (NFC) transceiver, or any other type of device that can send and/or receive information. Other examples of communication units 74 may include short wave radios, cellular data radios, wireless network radios, as well as universal serial bus (USB) controllers.

One or more input components 76 of computing device 54 may receive input. Examples of input are tactile, audio, and video input. Input components 76 of computing device 54, in one example, include a presence-sensitive input device (e.g., a touch sensitive screen, a PSD), a button or other actuable component, mouse, keyboard, voice responsive system, camera, microphone or any other type of device for detecting input from a human or machine, including such a device associated with the processing equipment of the various systems herein. In some examples, input components 76 may include one or more sensor components (e.g., sensors 92). Sensors 92 may include one or more biometric sensors (e.g., fingerprint sensors, retina scanners, vocal input sensors/microphones, facial recognition sensors, cameras), one or more location sensors (e.g., GPS components, Wi-Fi components, cellular components), one or more temperature sensors, one or more movement sensors (e.g., accelerometers, gyros), one or more pressure sensors (e.g., barometer), one or more ambient light sensors, one or more presence sensors such as those used in certain components of the product processing equipment, and one or more other sensors (e.g., infrared proximity sensor, hygrometer sensor, and the like). Other sensors, to name a few other non-limiting examples, may include a radar sensor, a lidar sensor, a sonar sensor, magnetometer, or a compass sensor. The sensors include any sensor that might be incorporated into the product processing equipment of any of the various implementations herein.

One or more output components 78 of computing device 54 may generate output in a selected modality. Examples of modalities may include a tactile notification, audible notification, visual notification, machine generated voice notification, or other modalities. Output components 78 of computing device 54, in one example, include a presence-sensitive display, a sound card, a video graphics adapter card, a speaker, a cathode ray tube (CRT) monitor, a liquid crystal display (LCD), a light emitting diode (LED) display, an organic LED (OLED) display, a virtual/augmented/extended reality (VR/AR/XR) system, a three-dimensional display, or any other type of device for generating output to a human or machine in a selected modality. In one exemplary embodiment, the output component can be a button on the loading station, as described in further detail elsewhere herein.

UIC 70 of computing device 54 includes display component 82 and presence-sensitive input component 84. Display component 82 may be a screen, such as any of the displays or systems described with respect to output components 78, at which information (e.g., a visual indication) is displayed by UIC 70 while presence-sensitive input component 84 may detect an object at and/or near display component 82. In one specific embodiment, the UIC 70 can be the interface 45 described in additional detail elsewhere herein.

While illustrated as an internal component of computing device 54, UIC 70 may also represent an external component that shares a data path with computing device 54 for transmitting and/or receiving input and output. For instance, in one example, UIC 70 represents a built-in component of computing device 54 located within and physically connected to the external packaging of computing device 54 (e.g., a screen on a mobile phone). In another example, UIC 70 represents an external component of computing device 54 located outside and physically separated from the packaging or housing of computing device 54 (e.g., a monitor, a projector, etc. that shares a wired and/or wireless data path with computing device 54).

UIC 70 of computing device 54 may detect two-dimensional and/or three-dimensional gestures as input from a user of computing device 54. For instance, a sensor of UIC 70 may detect a user's movement (e.g., moving a hand, an arm, a pen, a stylus, a tactile object, etc.) within a threshold distance of the sensor of UIC 70. UIC 70 may determine a two or three-dimensional vector representation of the movement and correlate the vector representation to a gesture input (e.g., a hand-wave, a pinch, a clap, a pen stroke, etc.) that has multiple dimensions. In other words, UIC 70 can detect a multi-dimension gesture without requiring the user to gesture at or near a screen or surface at which UIC 70 outputs information for display. Instead, UIC 70 can detect a multi-dimensional gesture performed at or near a sensor which may or may not be located near the screen or surface at which UIC 70 outputs information for display.

In accordance with one or more techniques of the various system embodiments herein, communication module 86 may control various components of the processing/packing equipment system 11 herein to optimize the operation thereof. For example, the communication module 86 can control one or more sensors to capture sensor data, including, for example, sensor data collected from the camera, scale, and other sensors in the classification system (such as system 32), sensor data collected from the various presence sensors and encoders disposed along the various chutes, conveyors, and pushers (including chutes 40, conveyors 30, 34, 44, 50, 48, 46, pushers 36, etc.) herein, input data collected by the computer interfaces 45, 370 and input buttons 306, 372 as described in detail herein, and any other data collected at any type of sensor, interface, or actuable component (such as a button or the like).

Analysis module 88 may analyze the captured data above in a variety of ways. For example, the analysis module 88 can analyze the captured sensor data from the classification system (such as system 32) to determine a product classification for the product. Based at least in part on the product classification, analysis module 88 may then determine which position of a plurality of positions to place the pusher or diverter arm (such as pusher 36 or diverter arm 440 or any other such device for urging products of the sort conveyor 34) such that the product is guided into the proper loading station (such as station 38), bulk container (such as container 382), other target receptacle or area, or to the defective product conveyor 50 or other area for defective products. Based on the above determinations of the analysis module 88, the communication module 86 may control the pusher 36 or diverter arm 440 (or the like) to place it in the proper position based on the determination made by analysis module 88.

Further, the analysis module 88 can analyze the captured sensor data from the intake conveyor 30 and the sorting conveyor 34 to determine a specific location of each product in the classification system 32 and on the sort conveyor 34. Based at least in part on the product location, analysis module 88 may then determine when to actuate the pusher or diverter arm (such as pusher 36 or diverter arm 440 or any other such device for urging products of the sort conveyor 34) such that the product is guided into the proper loading station (such as station 38), bulk container (such as container 382), or other target receptacle or area. Based on the above determinations of the analysis module 88, the communication module 86 may control the pusher 36 or diverter arm 440 (or the like) to place it in the proper position based on the determination made by analysis module 88.

In addition, as will be described in additional detail herein, the analysis module 88 can analyze the captured sensor data from each loading station chute 40 to determine the number of products in each chute 40 and/or the relative status of the products in the chute 40 (the chute is empty, partially full, or full of products, for example). Based at least in part on the status of the products in the chute 40, analysis module 88 may then determine when/how to send a notification to the computer interface 45, 370 and/or button 306, 372 or other location to notify an operator of the status of the particular chute 40 such that the operator is aware of the status of the various chutes 40 and can focus her attention as needed. Alternatively, or in addition, the analysis module 88 can also determine when to actuate the pushers or diverter arms such that the category of products previously directed to the now-full chute 40 is now directed to a different, less full chute 40. Based on the above determinations of the analysis module 88, the communication module 86 may control the pusher 36 or diverter arm 440 (or the like) to place it in the proper position based on the determination made by analysis module 88.

Additionally, as will be described in additional detail herein, the analysis module 88 can analyze the input data from the computer interface 45 and/or input button 306, 372 at any particular loading station 38 (actuated by an operator in some cases) to determine when a box disposed on the loading area of the takeaway conveyor 44 is packed/full. Based at least in part on the status of the box in the loading area, analysis module 88 may then determine when to actuate the takeaway conveyor 44 to transport the box toward the packed box conveyor 48. Based on the above determinations of the analysis module 88, the communication module 86 may control the conveyor 44 to transport the box toward the packed box conveyor 48 based on the determination made by analysis module 88. In certain specific embodiments as set forth elsewhere herein, the communication module 86 can control the front lifting rails 326 to lower, thereby allowing the box to make contact with the conveyor belts 324A-C and move along the takeaway conveyor 44 toward the packed box conveyor 48 and then subsequently control the rails 326 to raise back up after the box has been transferred from the front rails 326.

Further, as will be described in additional detail herein, the analysis module 88 can analyze the captured sensor data from each takeaway chute 44 and the packed box conveyor 48 to determine when a box disposed on the back of the takeaway conveyor 44 should be transferred to the packed box conveyor 48. Based at least in part on the locations of the packed boxes on the conveyor 48 and the presence of a packed box on the back of the takeaway conveyor 44, analysis module 88 may then determine when to actuate the takeaway conveyor 44 to transfer the packed box from the takeaway conveyor 44 to the packed box conveyor 48. Based on the above determinations of the analysis module 88, the communication module 86 may control the takeaway conveyor 44 to transport the box onto the packed box conveyor 48. In certain specific embodiments as set forth elsewhere herein, the communication module 86 can control the back lifting rails 328 to lower them, thereby allowing the box to make contact with the conveyor belts 324A-C and move off the takeaway conveyor 44 onto the packed box conveyor 48.

Additionally, as will be described in additional detail herein, the analysis module 88 can analyze the input data from trigger sensors 282 adjacent to the empty box conveyor 46 (actuated by an operator in some cases) to determine when to actuate the empty box conveyor 46 to stop urging empty boxes toward the end of the conveyor 46. Based on the above determinations of the analysis module 88, the communication module 86 may control the conveyor 46 to stop the conveyor 46 from continuing to transport boxes. In certain specific embodiments as set forth elsewhere herein, the communication module 86 can control the lifting rails 280A, 280B to move into their raised position, thereby raising the boxes out of contact with the conveyor belt 270 and thereby remove the back pressure on the boxes so that an operator can remove one from the conveyor 46. The communication module 86 can, after a predetermined period of time, subsequently control the rails 280A, 280B to lower back down after the box has been removed such that the boxes are again in contact with the conveyor 270 and urged toward the end of the conveyor 46.

In addition, according to certain implementations, the communication module 86 and analysis module 88 can work together in any other way such that the communication module 86 controls any other components of the processing/packing equipment system 11 herein to optimize the operation thereof while the analysis module 88 analyzes any type of captured or input data from any type of component of the equipment system 11 in a variety of ways to operate with the communication module 86 to operate the system 10 herein.

For example, in certain embodiments, there may be other controllable elements, such as motors and actuators, which the computing device 54—including the communication module 86 and the analysis module 88—may control in fashion similar to that described above. In addition to controlling elements, the communication module 86 and analysis module 88 may use data from the sensors to detect undesirable product flow scenarios and to adjust the system behavior to accommodate the recovery of the system to a stable state whenever unexpected scenarios arise. Additional uses of the sensor data by the communication module 86 and the analysis module 88 may include real time alerting of undesirable production parameters, predictive maintenance alerts, product flow monitoring, product flow optimization recommendations, and the facilitation of improved decision making for plant operations, sales and business leadership teams.

The combination of the various product processing and packing equipment systems 11 herein with the various embodiments of the computing device 54 and related components can provide significant advantages over prior known systems. For example, by enabling communication module 86 to control the pusher 36/diverter arm 440 based on the product classification and other analysis performed by analysis module 88 as described above, the various system 10 embodiments herein can quickly sort and pack multiple different types of products on a same line far more efficiently and with fewer machines/less equipment than known systems. In addition, the operation of the loading stations (such as stations 38) with the computer interfaces 45, release buttons 306, 372, and various presence sensors in the chutes 40 and takeaway conveyors 44 at the loading stations (such as stations 38) via the communication module 86 and analysis module 88 as described above result in faster, more accurate packing of the boxes with the various sorted products. Further, the various other processes that are operated by the communication module 86 and analysis module 88 as discussed above also provide advantages over known systems.

Returning to FIG. 2A, in certain embodiments as will be discussed in further detail below, the product receiving conveyor 30 is a product spacing conveyor 30. That is, the conveyor 30 and related processor controlling the conveyor 30 operates to ensure each product is appropriately spaced from adjacent products prior to reaching the classification system 32 and the sort conveyor 34 to ensure that the classification system 32 and conveyer 34 can appropriately classify and sort the product. Further, according to some implementations, the classification system 32 includes a scale and machine vision system to collect information about each product such that the system 32 can classify the product by type, weight, dimensions, etc., as will be described in further detail below.

In use according to one embodiment, products to be processed are transported along the product receiving conveyor 30 into the product classification system 32, which collects information about each product. The product then moves along the sort conveyor 34 and is pushed into a loading station 38 by one of the pushers 36 based on the information collected by the classification system 32. More specifically, the system 10 uses the information collected by the classification system 32 about the product to identify the appropriate loading station 38 to receive the product and actuates the correct pusher 36 to push the product into the chute 40 of the selected loading station 38. The product moves down the chute 40 to the box loading area 42 and is packed into a waiting box on the takeaway conveyor 44 via automation or a user. Once fully packed, the box is urged along the takeaway conveyor 44 onto the packed box conveyor 48 and out of the system 10. The packed box can then be replaced from the empty box conveyor 46 above—a user reaches up and moves one of the empty boxes from the conveyor 46 down to the end of takeaway conveyor 44 as shown.

If a rejected product reaches the box loading area 42, the user can remove the rejected product from the box loading area 42 and carry it to and place it on the rejected product conveyor 50 via the access area 52. Alternatively, a rejected product can be identified by the classification system 32 at the beginning of the process and transported to the rejected product conveyor 50 by transporting it along the full length of the sort conveyor 34 to an area past the loading stations 38 where the product can be transferred to the rejected product conveyor 50 via any number of mechanisms or methods. Alternatively, the rejected product can be transported along the sort conveyor 34 to a return conveyor (not shown) configured to return such rejected products to the vacuum sealers or to any other location. In certain embodiments, the rejected product conveyor 50 can be positioned to run to another conveyor (not shown) such that the rejected products on the conveyor 50 are transported to the end of the rejected product conveyor 50 and transferred to the other conveyor that transports the rejected products elsewhere. According to various implementations, the rejected product conveyor 50 or the additional conveyor can transport the rejected product to an area where it can be reworked, modified, fixed, or otherwise manipulated to address the issue with the product, or, if beyond repair, it can be discarded appropriately.

According to yet another alternative implementation, the packed box conveyor 48 can run in the opposite direction of the embodiments described above such that the packed boxes travel toward the classification system 32. In this embodiment, a conveyor can be positioned under the classification system 32 and between the legs thereof in the space identified as 53 in FIG. 2A such that the packed boxes are transferred from the packed box conveyor 48 to the conveyor (not shown) that is disposed through the space 53 under the classification system 32. Further, in certain embodiments in which multiple pack-off process systems are disposed in the same facility, a common conveyor (not shown) can be positioned such that it receives all of the packed boxes from all of the packed box conveyors and transports those boxes to a single location, wherein the common conveyor can be positioned at the end of the conveyors 34, 50, 48 opposite the classification system 32 or under the classification system 32.

As will be discussed in additional detail below, the system 10 and any other system embodiments disclosed or contemplated herein are configured to handle products (including, in some cases, meat products) of varying shape, size and weight. For example, when the products to be processed are meat products, the meat products may have a weight ranging from about 1 to about 30 pounds and a length ranging from about 4 to about 24 inches. Further, the geometries and shapes of the products—including meat products—may vary widely, complicating sorting processes.

As will also be discussed in additional detail below, the system 10 and any other system implementations herein are formed from a plurality of separate modular components. Thus, the configurations of the pack-off system embodiment in FIGS. 2A-3F and all other implementations herein are non-limiting illustrative examples. For example, any processing and packing equipment system according to the various embodiments herein may include more or fewer loading stations, more or fewer sorter conveyor levels, or repositioned components, to name but a few examples. The configurable and modular nature of these system implementations makes it possible for the systems to be used in a wide variety of spaces of different dimensions and configurations. Further, it is contemplated that the configurability of the modular systems allow for two or more configurable pack-off systems to be used in the same space and/or facility in a variety of different configurations, including, for example, multiple such pack-off systems coupled via one or more common conveyors resulting in combination product processing.

In accordance with certain implementations, hardware relating to the computer device 54 and operation of the various processing and packing equipment system 11 components may be housed in multiple enclosures distributed around the system 11. For example, as shown in FIG. 2A, two large enclosures 31A, 31B can be disposed at the front end (upstream) of the system 11, according to one embodiment. One enclosure 31A includes the high voltage motor control and protection hardware for the conveyors, while the other enclosure 31B includes the server and low voltage controls equipment including field input/outputs, scale heads, and relays. Further, certain embodiments of the system 11 herein can include small enclosures (not shown) at each loading station 38 including hardware and wiring terminations for each station 38 including the computer interface 45 and button 306, 372. Finally, the system 11 can include an enclosure (not shown) at the end of the system including hardware and wiring terminations for the belt encoders, industrial arm controls, label printers, and other items at the end (downstream) of the system 11.

Figure 4A:
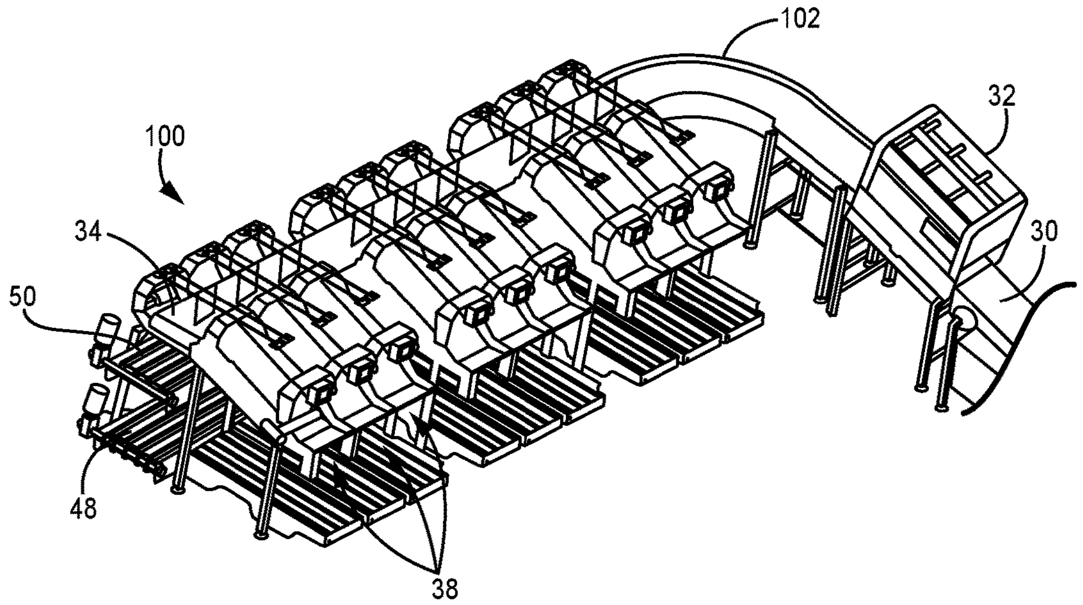
FIG. 4A is a perspective view of another product processing and packing equipment system, according to another embodiment.
Figure 4B:
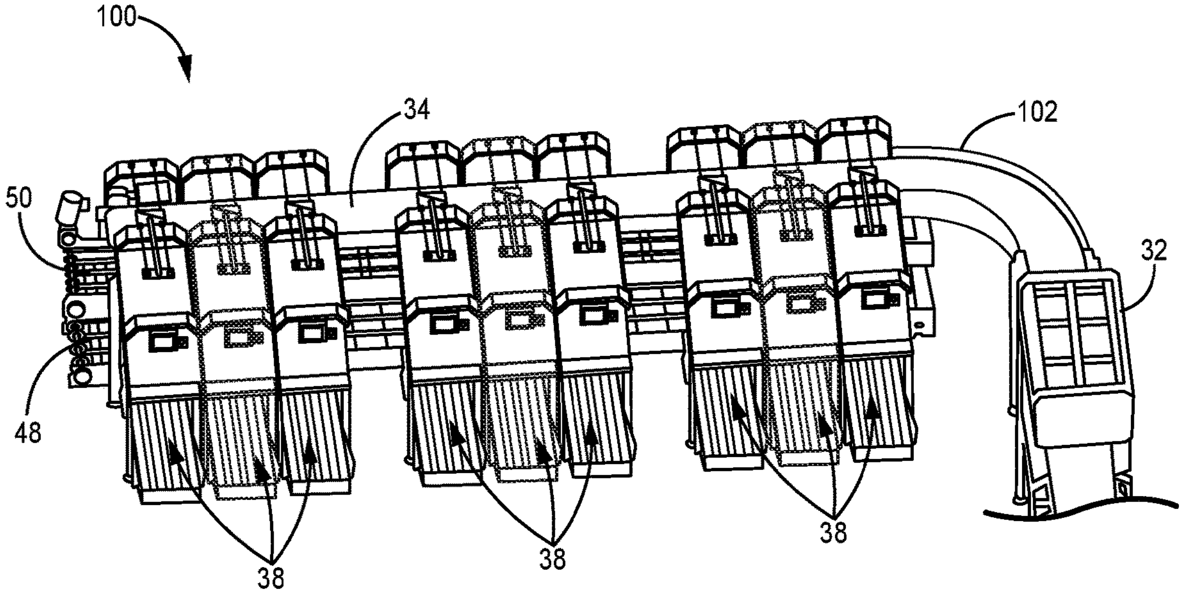
FIG. 4B is another perspective view of the product processing and packing equipment system of FIG. 4A, according to one embodiment.

One exemplary system embodiment 100 that highlights the modularity of the various systems herein is shown in FIGS. 4A and 4B. Except as expressly stated herein, the various components, features, and functionality of the system 100 are substantially similar to the equivalent components, features, and functionalities of the system 10 discussed above and elsewhere herein. In this specific implementation, the system 100 has nine product loading stations 38. Further, the system 100 also has a curved conveyor 102 that extends between the classification system 32 and the sorting conveyor 34 that results in the sorting conveyor 34 being disposed at a position that is transverse to the product receiving conveyor 30. Alternatively, the curved conveyor 102 can result in the sorting conveyor 34 being disposed at any angle in relation to the produce receiving conveyor 30. This configurability of the positioning of the sorting conveyor 34 in relation to the product receiving conveyor allows for systems to be constructed in the appropriate configuration to fit within many different spaces of different sizes and/or configurations. For example, the specific embodiment as shown in FIGS. 4A and 4B can be used in a facility with a space that lacks sufficient length to fit the in-line version of FIG. 2A. The curved conveyor 102 can be incorporated into any of the various systems (including system 10) disclosed or contemplated herein.

Thus, any of the various processing and packing equipment systems 11 herein can be configured or arranged to conform to a space requirement of the facility. Further, any of these systems as disclosed or contemplated herein can be arranged in other configurations not illustrated, or be arranged using elements of multiple illustrated configurations in in-line flow and/or using a perpendicular flow or any other arrangement.

In the system 100 and the various other systems disclosed or contemplated herein, the modularity of the system 100 allows for the number of loading stations 38 to adjusted as needed. As noted above, the system 100 as shown has nine product loading stations 38 disposed in pods of three each. Alternatively, the system 100 (and any system herein) can have one, two, three, four, five, six, seven, eight, 10, 11, 12, 13, 14, 15, 16, or any number of loading stations 38. Further, while the specific implementation as shown has loading stations 38 on only one side of the sort conveyor 102, there can be loading stations 38 positioned on the other side as well. The modularity of any of the system embodiments herein allow for almost limitless configurability depending on the needs of the facility.

Figure 5A:
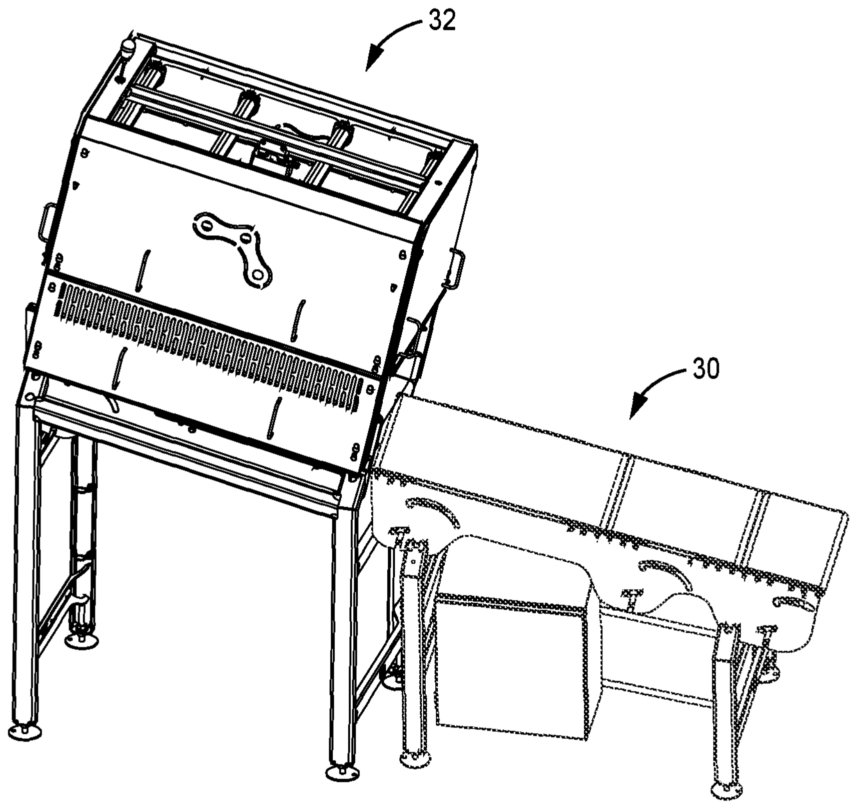
FIG. 5A is a perspective view of a spacing conveyor and a classification device, according to one embodiment.
Figure 5B:
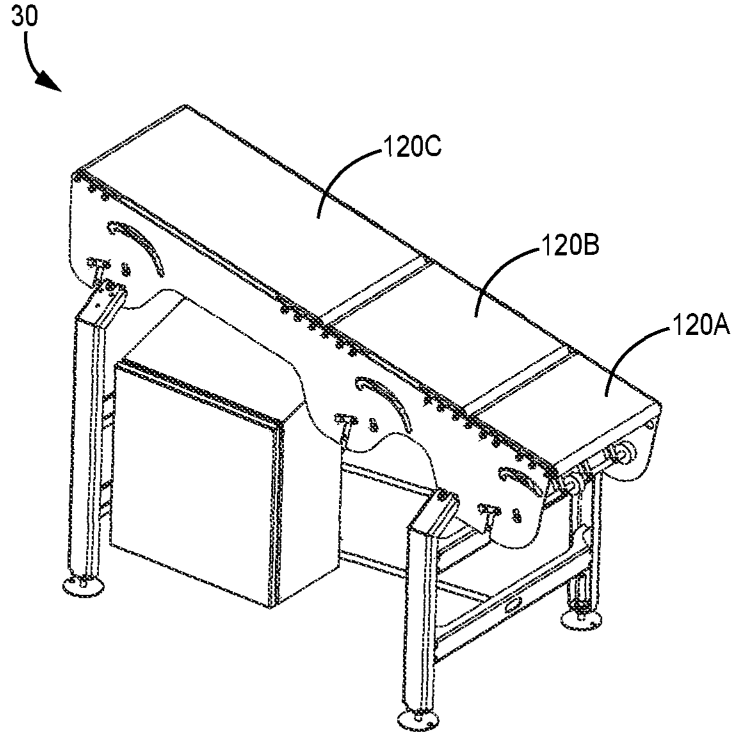
FIG. 5B is a perspective view of the spacing conveyor of FIG. 5A, according to one embodiment.
Figure 5C:
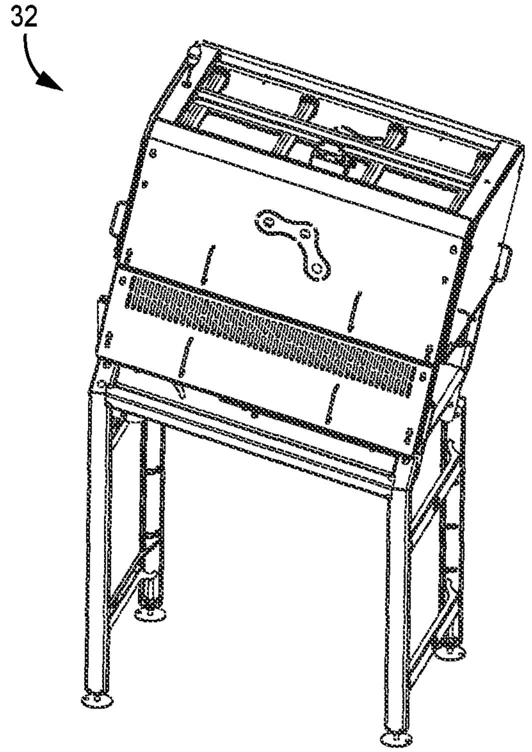
FIG. 5C is a perspective view of the classification device of FIG. 5A, according to one embodiment.

FIGS. 5A, 5B, and 5C depict one exemplary embodiment of the product receiving conveyor 30 and the classification system 32 that can be incorporated into any of the various system embodiments herein. As mentioned above, the conveyor 30 can be a spacing conveyor 30 that operates to space each product in relation to the adjacent products to ensure that the product can be successfully weighed in the classification system 32. More specifically, if the products are too close together, the scale will capture the weight of both products and be unable to capture the weight of the individual products. According to one embodiment as best shown in FIG. 5B, the spacing conveyor 30 has three separate conveyor belts 120A, 120B, 120C that can be operated by the computer system 54 discussed above to ensure that each product is spaced from the adjacent products as desired. The details of this spacing conveyor are disclosed in additional detail in U.S. patent application Ser. No. 18/449,674, entitled "Spacing and Classification Conveyors and Related Systems and Methods" and filed on Aug. 14, 2023, a commonly assigned, concurrently filed U.S. patent application which is hereby incorporated herein by reference in its entirety. Alternatively, any other known conveyor can be used for the product receiving conveyor 30.

In one embodiment, the classification system 32 as best shown in FIG. 5C has a conveyor 130 with a hood 132 disposed over the conveyor 130. Further, a scale (not shown) in incorporated into the conveyor 130. According to certain implementations, the hood 132 has a camera and diffuse lighting (not shown) such that the camera can capture images of each product. In certain embodiments, the camera can be part of a computer vision system, a 3D scanner, and RGB camera, or any other known camera for use in such a system. In addition, the classification system 32 also can collect other information, including, for example, weight (via the scale), dimensions, etc. Further, any of the various system embodiments herein can use a computer vision system to utilize the images to classify each product by type, dimensions, etc. Thus, the classification system 32 can use any of the collected information to make product sorting decisions that can then be used to control the sorting equipment and move the specific products into the desired loading stations, as described in additional detail herein. One specific embodiment of a classification system 32 is also disclosed in additional detail in U.S. patent application Ser. No. 18/449,674, entitled "Spacing and Classification Conveyors and Related Systems and Methods" and filed on Aug. 14, 2023, a commonly assigned, concurrently filed U.S. patent application which is incorporated herein by reference in its entirety above. Alternatively, any other known information collection and classification systems can be used for the classification system 32.

In certain specific implementations in which the products are meat products, the classification system 32 can be configured to determine a product classification of meat products. Among other things, the product classification may include a "meat cut value," which identifies a meat cut type, a weight, and/or a dimension. The meat cut value may also identify a defective product, such as a leaking or damaged product (e.g., the seal around the meat may have broken). The product classification also may include a confidence value configured to indicate a likelihood a meat cut value is correct.

According to some embodiments, the classification system 32 can also have a sensor system with one or more sensors (not shown) configured to collect data corresponding to each product. As such, the various system embodiments herein may determine the product classification for each product using the sensor data. The sensor system also may include a belt encoder (not shown) configured to measure a belt speed or position of the scale conveyor. Those in the art may select sensors appropriate for the given system. In further embodiments, the sensor system may include photoelectric sensors configured to detect products moving along the conveyor of the classification system 32 or along the product receiving conveyor 30.

Figure 6A:
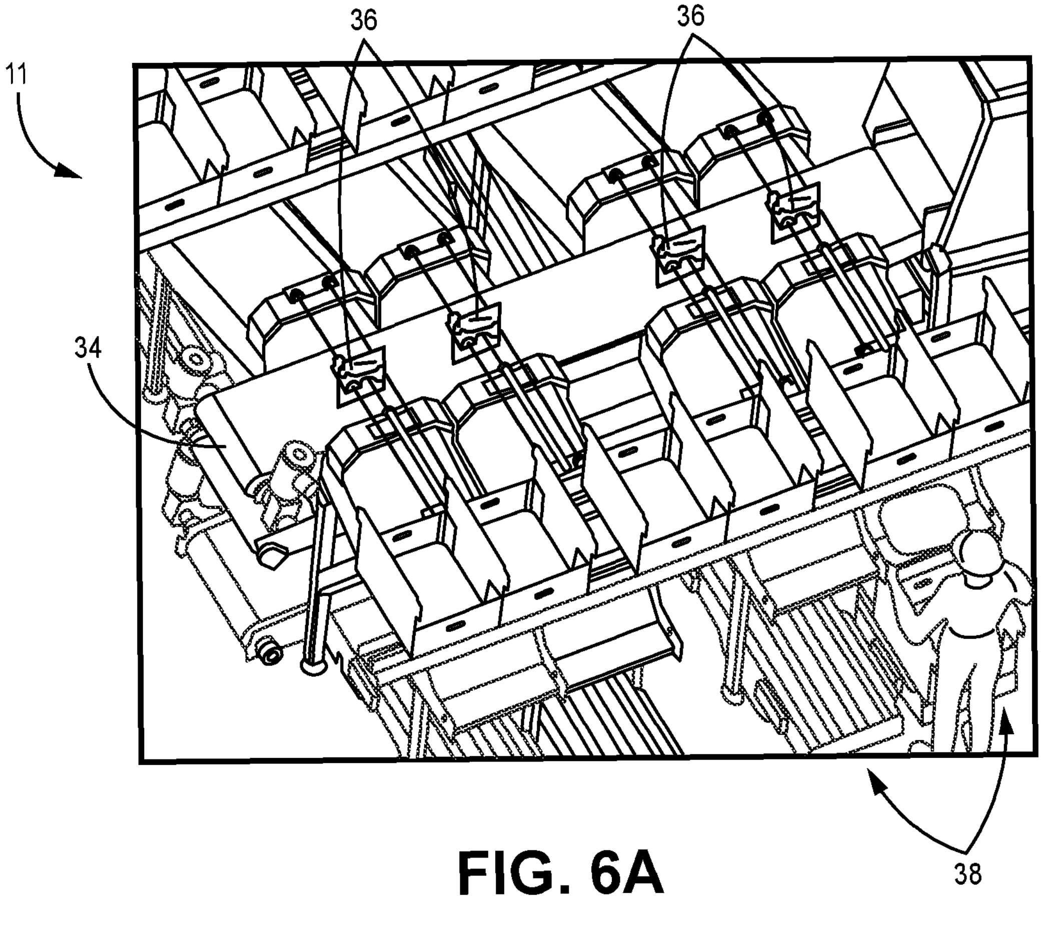
FIG. 6A is a perspective view of a sorting conveyor, according to one embodiment.
Figure 6B:
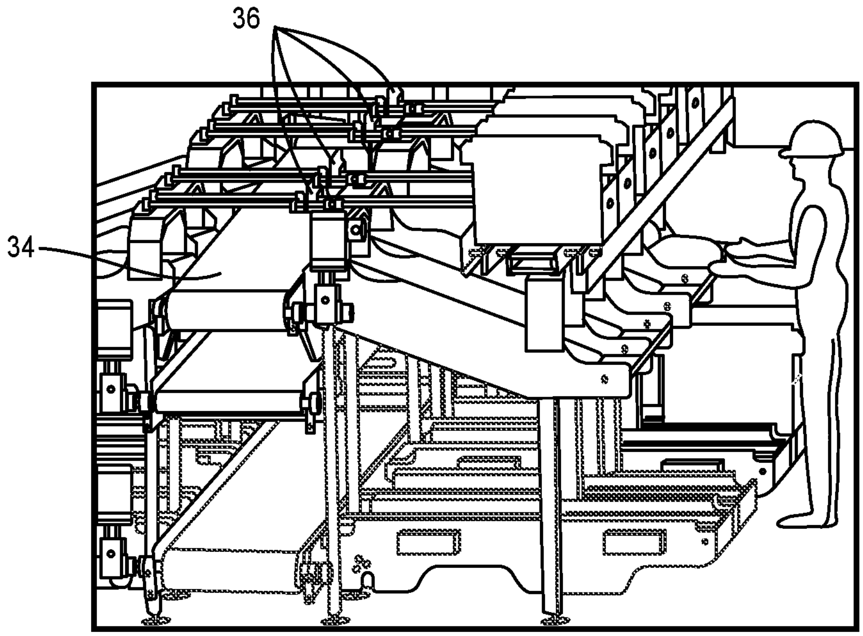
FIG. 6B is another perspective view of the sorting conveyor of FIG. 6A, according to one embodiment.
Figure 6C:
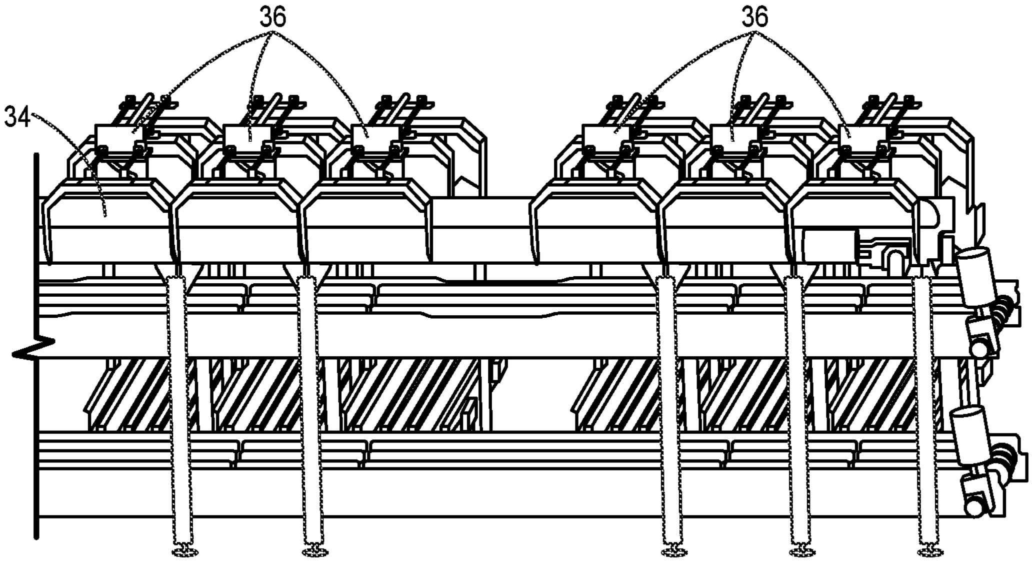
FIG. 6C is a perspective view of another sorting conveyor, according to one embodiment.

One embodiment of the sorting equipment, including a sort conveyor 34 and pushers 36, is shown in FIGS. 6A-6C and can be incorporated into any system 10 embodiment herein. The sort conveyor 34 receives the product from the classification system 32. At this point, the classification system 32 has collected the desired information about the product and the system software has used that information to classify the product (based on, for example, type/product class, weight, or other criteria) and transmit operational instructions to the appropriate sorting pusher 36 for purposes of pushing the product into the correct loading station 38. According to one embodiment, the conveyor 34 has an encoder (not shown) that can be used to track the position of each product on the conveyor 34. In one embodiment, the encoder is incorporated into the motor assembly of the conveyor 34 (such as the motor assembly 240 discussed in detail below). Alternatively, the encoder can be positioned anywhere along the conveyor 34 such that it can track product position. This position tracking of the product allows the system 10 to track the exact location of each product along the length of the conveyor 34 and thus can be used to sort each product into the desired loading station 38. More specifically, the position tracking makes it possible to actuate the appropriate pusher 36 when the product reaches the appropriate point along the length of the conveyor 34 such that the pusher 36 urges the product into the desired loading station 38.

The pushers 36 herein can be any one of a number of different pusher embodiments. In one specific embodiment as shown in FIGS. 6D-6O, the pusher 36 has a frame 130 that is made up of two supports 132A, 132B—one on each end of the frame 130—and two guide rails 134A, 134B attached at each end to the supports 132A, 132B as shown. Each of the supports 132A, 132B can be attached to a portion of the system 10. For example, in those embodiments in which there are loading stations on both sides of the sort conveyor 34, the supports 132A, 132B can be attached to the ends of opposing chutes 40, as best shown in FIG. 6B. Alternatively, in certain embodiments, one or both supports 132A, 132B can be attached to the sides of the conveyor 34.

Further, the pusher 36 has a movable pushing paddle 136 that is slidably coupled to the two guide rails 134A, 134B such that the paddle 136 can move along the guide rails 134A, 134B between the two supports 132A, 132B. In addition, the pusher 36 has an actuation device 138 disposed between the two guide rails 134A, 134B and attached at one end to the support 132B and at the other end to a third support 132C that is disposed between the two supports 132A, 132B and attached to the two guide rails 134A, 134B. In one embodiment, the actuation device 138 is an air cylinder 138. Alternatively, the actuation device 138 can be any known hydraulic actuator such as a piston actuator or other similar actuator. The paddle 136 is coupled to the actuation device 138 such that the paddle 136 can be actuated to move by the actuation device 138, which urges the paddle 130 along the two guide rails 134A, 134B such that the paddle 130 moves in a direction transverse to the direction of the conveyor on which it is positioned (such as conveyor 34).

Figure 6D:
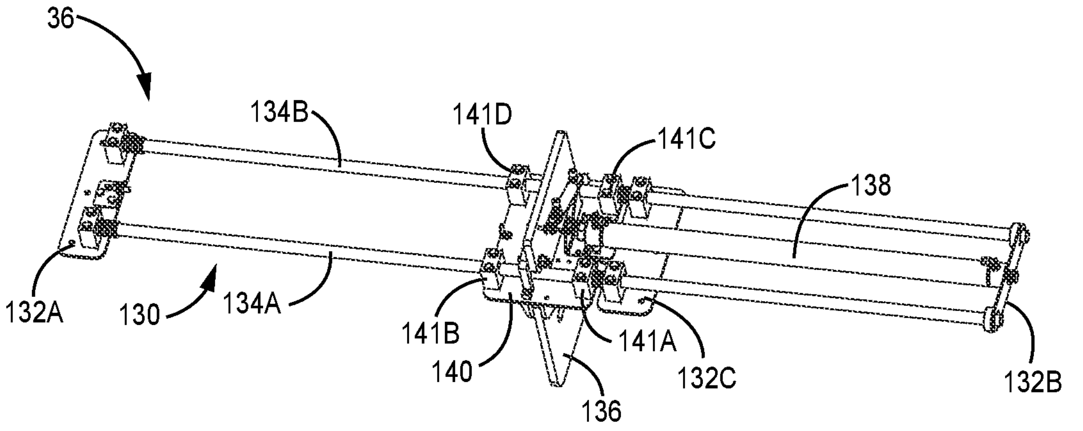
FIG. 6D is a perspective view of the top of a product pushing device, according to one embodiment.
Figure 6E:
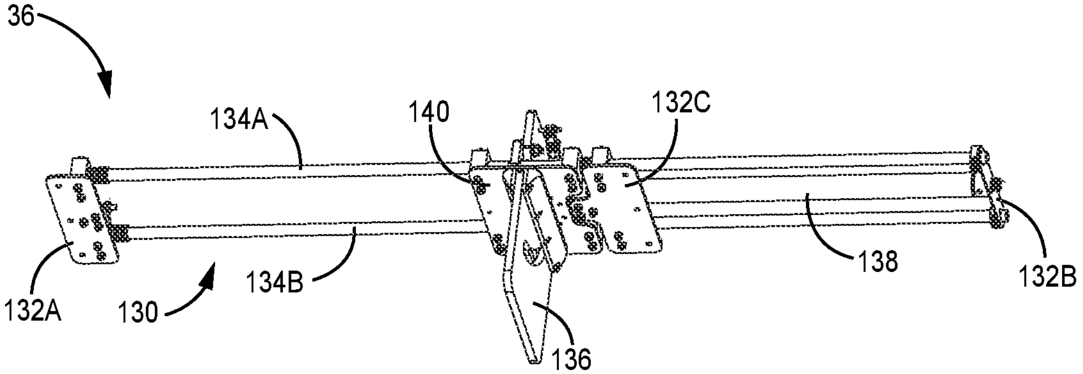
FIG. 6E is a perspective view of the bottom of the product pushing device of FIG. 6D, according to one embodiment.
Figure 6F:
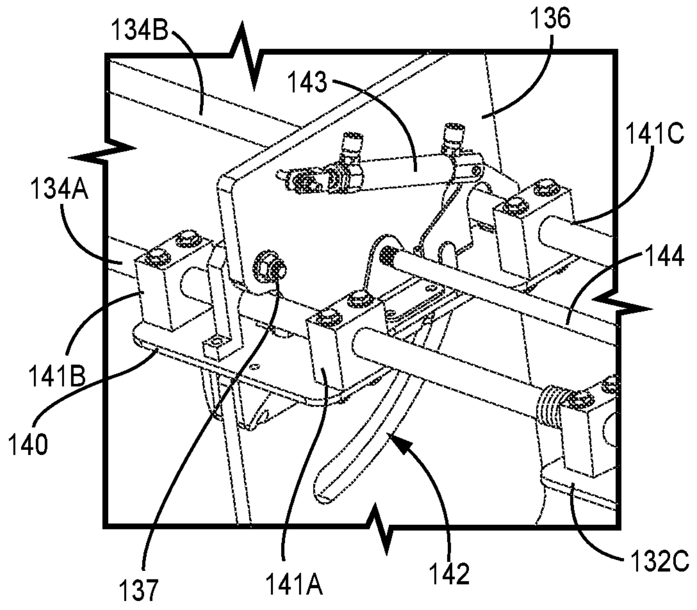
FIG. 6F is a perspective view of the paddle and carriage of the product pushing device of FIG. 6D, according to one embodiment.

As best shown in FIGS. 6D and 6F, the paddle 136 is slidably attached to the rails 134A, 134B via a slidable base 140. The base has four slidable attachment structures 141A, 141B, 141C, 141D, with two of the structures 141A, 141B slidably attached to the first rail 134A and the other two of the structures 141C, 141D slidably attached to the second rail 134B such that the base 140 is slidably attached to the rails 134A, 134B. Alternatively, the slidable base 140 can be slidably attached to the rails 134A, 134B via any known mechanism or device for such attachment. As best shown in FIG. 6F, the air cylinder 138 is coupled to the base 140 via the actuable piston 144 such that actuation of the piston 144 to move in relation to the cylinder 138 also causes the base 140 (and thus the paddle 136) in the same direction.

Figure 6G:
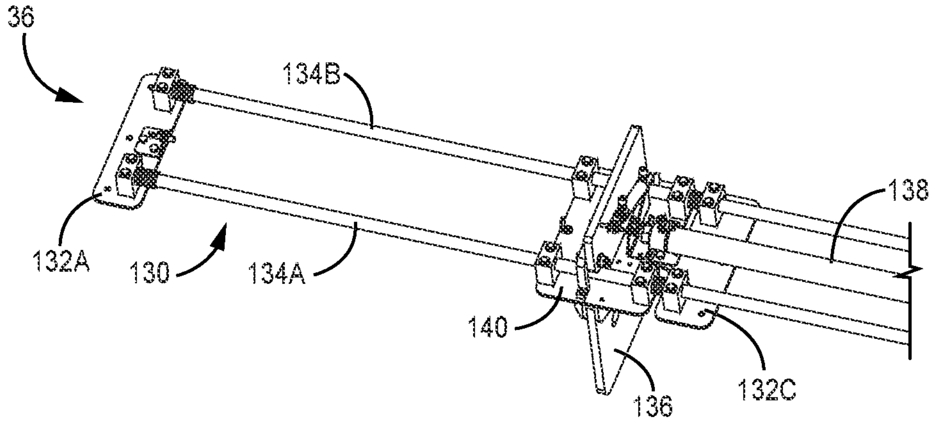
FIG. 6G is a perspective view of the product pushing device of FIG. 6D in a retracted position, according to one embodiment.
Figure 6H:
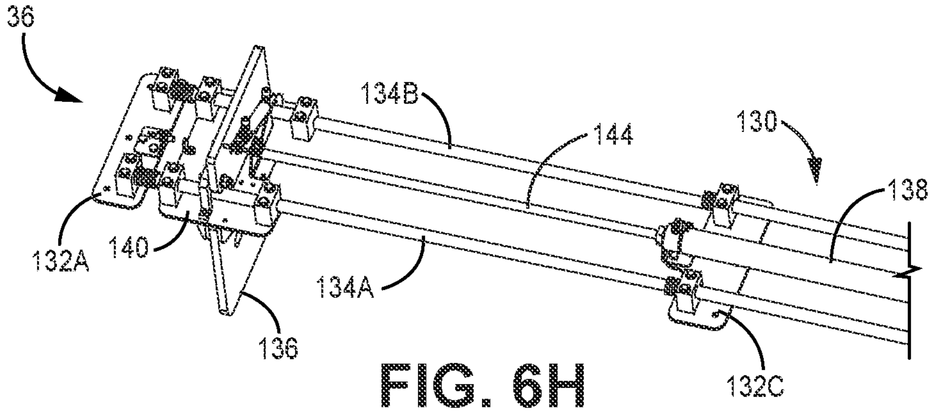
FIG. 6H is a perspective view of the product pushing device of FIG. 6D in a deployed position, according to one embodiment.
Figure 6I:
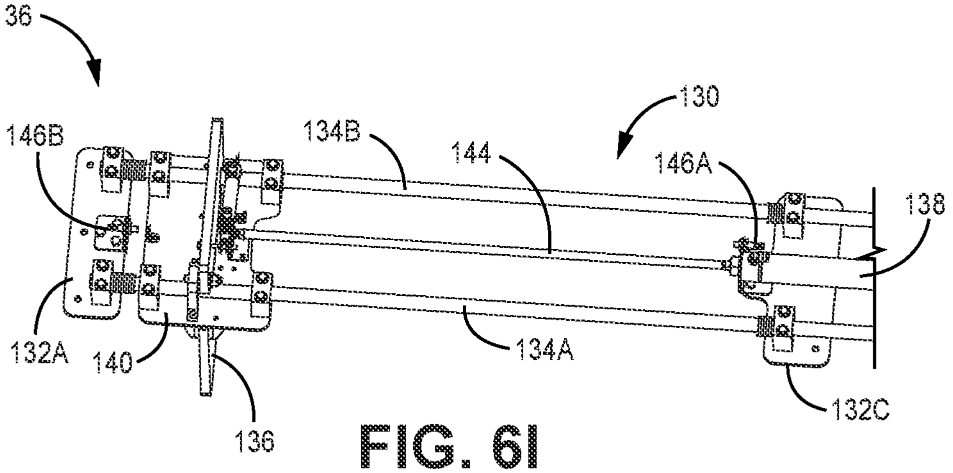
FIG. 6I is another top perspective view of the product pushing device of FIG. 6D, according to one embodiment.
Figure 6J:
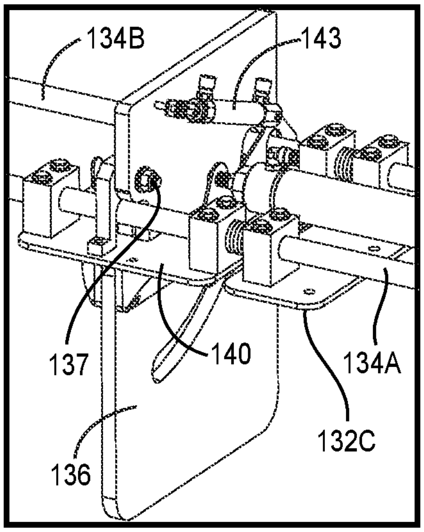
FIG. 6J is a perspective view of the paddle of the product pushing device of FIG. 6D in a deployed position, according to one embodiment.
Figure 6K:
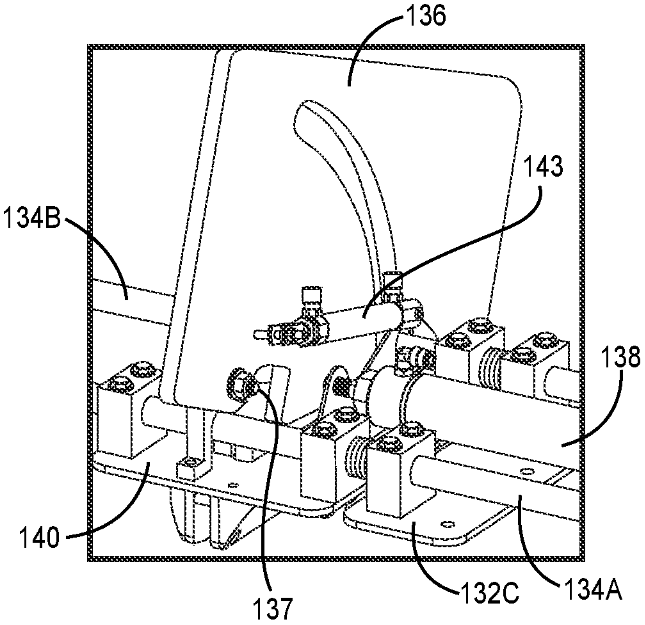
FIG. 6K is a perspective view of the paddle of the product pushing device of FIG. 6D in a retracted position, according to one embodiment.
Figure 6L:
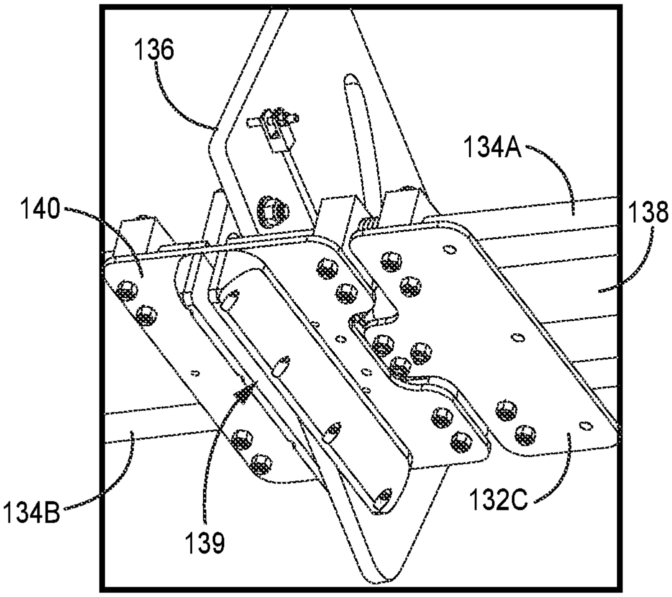
FIG. 6L is a perspective view of the underside of the paddle and carriage of the product pushing device of FIG. 6D with the paddle in the retracted position, according to one embodiment.

In addition, the paddle 136 is rotatably attached to the slidable base 140 via a joint 137 such that the paddle 136 can rotate in relation to the base 140 around the joint 137 via a slot 139 defined through the base 140 as best shown in FIG. 6L. The paddle 136 has a curved slot 142 defined through the paddle 136 that accommodates the second rail 134B as the paddle 136 rotates. In addition, a second air cylinder 143 is attached at one end to the base 140 and at the other end to the paddle 136 such that actuation of the cylinder 143 causes the paddle 136 to move from its deployed position (as shown in FIGS. 6D-6J and 6O-6P) and its retracted position (as shown in FIGS. 6K-6N).

According to one embodiment, as best shown in FIG. 6I, the pusher 36 can also have sensors 146A, 146B to detect the movement of the paddle 136 along the rails 134A, 134B. More specifically, a sensor 146A is disposed on the actuator support 132C such that the sensor 146A can detect if the paddle 136 is disposed adjacent to and/or in contact with the actuator support 132C (the retracted position), while a sensor 146B is disposed on the support 132A such that the sensor 146B can detect if the paddle 136 is disposed adjacent to and/or in contact with the support 132A (the deployed or extended position). In accordance with certain implementations, the sensors 146A, 146B can be used to confirm that the paddle 136 is operating correctly.

In use, the air cylinder 138 can be used to urge the paddle 136 from the pusher retracted position as shown in FIG. 6G to the pusher deployed position as shown in FIG. 6H by actuating the piston 144 to extend out of the cylinder 138. Further, the cylinder 138 can then be used to retract the paddle 136 back to its retracted pusher position (of FIG. 6G) by retracting the piston 144 and thereby pull the paddle 136 back into contact with (or adjacent to) the actuator support 132C. As such, the air cylinder 138 causes the paddle 136 to move laterally across the conveyor (such as conveyor 34), thereby selectively urging a target product off the side of the conveyor as described as part of the sorting process as described in additional detail elsewhere herein.

Further, when necessary, the paddle 136 can be actuated to move vertically in relation to the base 140 from its deployed paddle position as shown in FIG. 6J into its retracted paddle position as shown in FIGS. 6K and 6L by actuation of the second air cylinder 143. More specifically, the piston 148 is attached to the paddle 136 such that extension of the piston 148 from the cylinder 143 as shown in FIG. 6K causes the paddle 136 to move into the retracted position. This makes it possible to lift the paddle 136 vertically away from the conveyor (such as conveyor 34) and maintain it in that retracted position when desired or necessary. For example, in certain embodiments, if there is a product jam on the conveyor, the paddle 136 can be urged into the retracted position in order to raise it away from the products such that the paddle 136 can then be urged to either its retracted pusher position or its deployed pusher position.

Figure 6M:
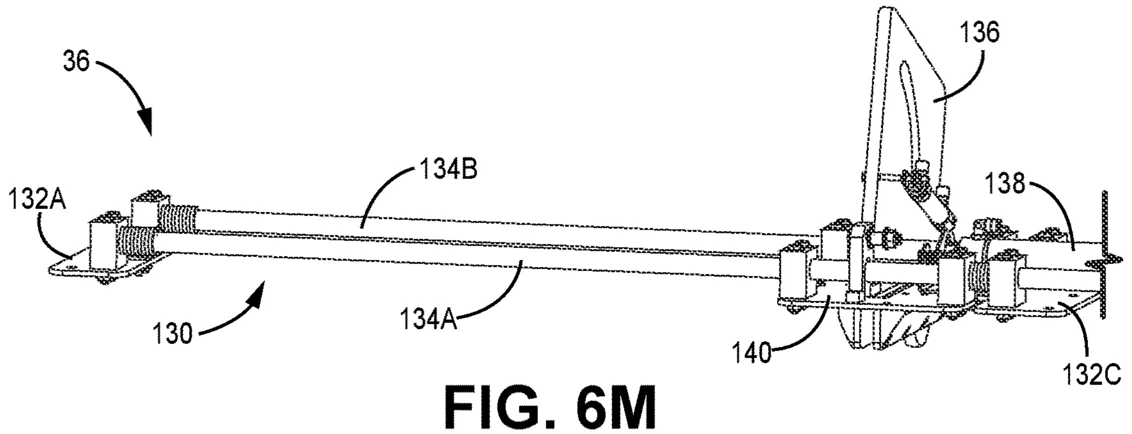
FIG. 6M is a perspective view of the product pushing device of FIG. 6D in a retracted position with the paddle in a retracted position, according to one embodiment.
Figure 6N:
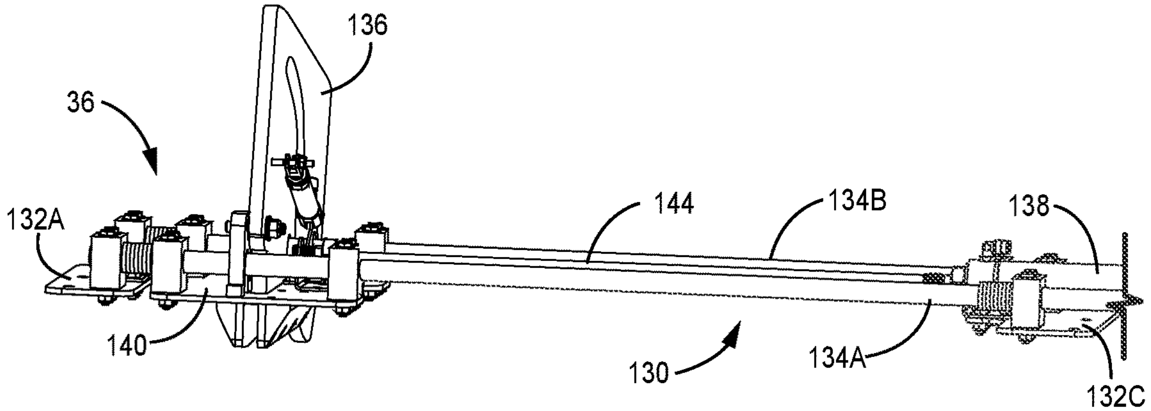
FIG. 6N is a perspective view of the product pushing device of FIG. 6D in a deployed position with the paddle in a retracted position, according to one embodiment.
Figure 6O:
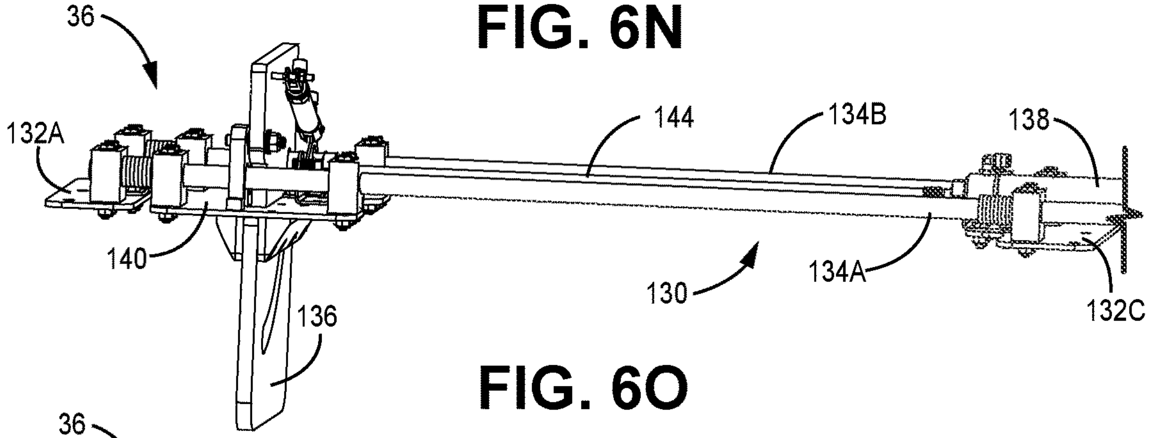
FIG. 6O is a perspective view of the product pushing device of FIG. 6D in a deployed position with the paddle in a deployed position, according to one embodiment.
Figure 6P:
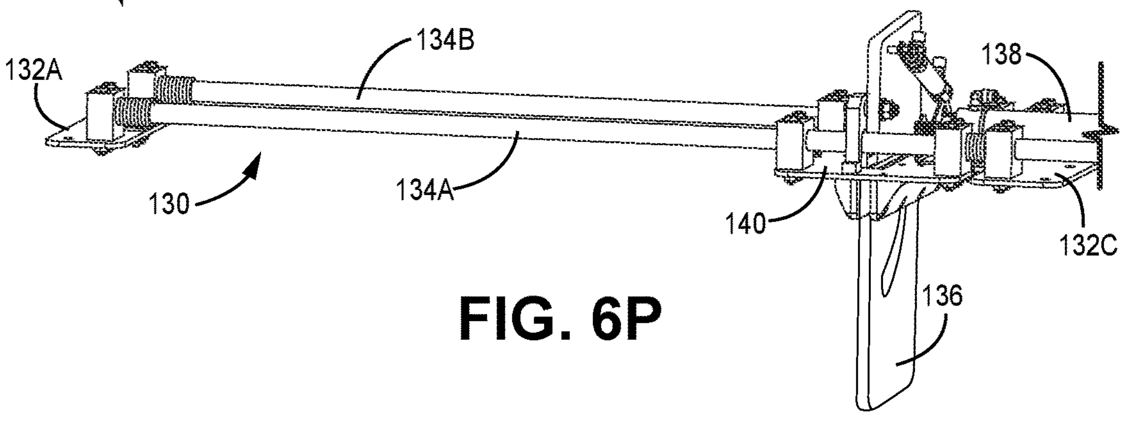
FIG. 6P is a perspective view of the product pushing device of FIG. 6D in a retracted position with the paddle in a deployed position, according to one embodiment.

Further, as shown in FIGS. 6M-6P, this feature also allows the paddle 136 to be raised up and moved laterally across the conveyor to move the paddle 136 to the other side of a product disposed on the conveyor such that the paddle 136 can then be deployed and used to urge the product off the same side of the conveyor. For example, assume that a product is disposed on the conveyor and needs to be urged off the conveyor on the same side of the conveyor as the support 132B, but the paddle 136 is disposed in its retracted pusher position (against the actuator support 132C). To address this, the paddle 136 can be actuated to move into its retracted paddle position as shown in FIG. 6M and then the air cylinder 138 can urge the paddle 136 into its deployed pusher position as shown in FIG. 6N. At this point, the paddle 136 can be urged back into its deployed paddle position by actuation of the second air cylinder 143 as shown in FIG. 6O, and then the paddle 136 can be urged back into its retracted pusher position as shown in FIG. 6P such that the paddle moves across the conveyor and pulls the product toward the support 132B and off that side of the conveyor.

In one embodiment, the pusher 36 can move unidirectionally such that it can only urge products toward one side of the conveyor 34. Alternatively, the pusher 36 can move bidirectionally such that it can urge products toward either side of the conveyer 34. Various implementations of the pusher 36 can also be standalone devices that can be easily attached and removed from any of the systems herein (such as system 10). As such, if any pusher 36 coupled to the system develops any operational issues and/or requires any kind of repair or maintenance, the pusher 36 can be quickly and easily removed and replaced, thereby avoiding any significant time delays in operation of the system.

Alternatively, other known mechanisms for urging the products into the loading stations can be used. For example, in some embodiments, diverters or "power diverts" are used. A power divert is a powered arm that is extended across the conveyor 34 at an angle when the correct product is approaching such that it utilizes the motive force of the conveyor 34 to urge the product into the desired loading station. In other words, the conveyor 34 causes the product to make contact with the diverter and urges the product along the diverter as the diverter urges the product toward the loading station.

Figure 7A:
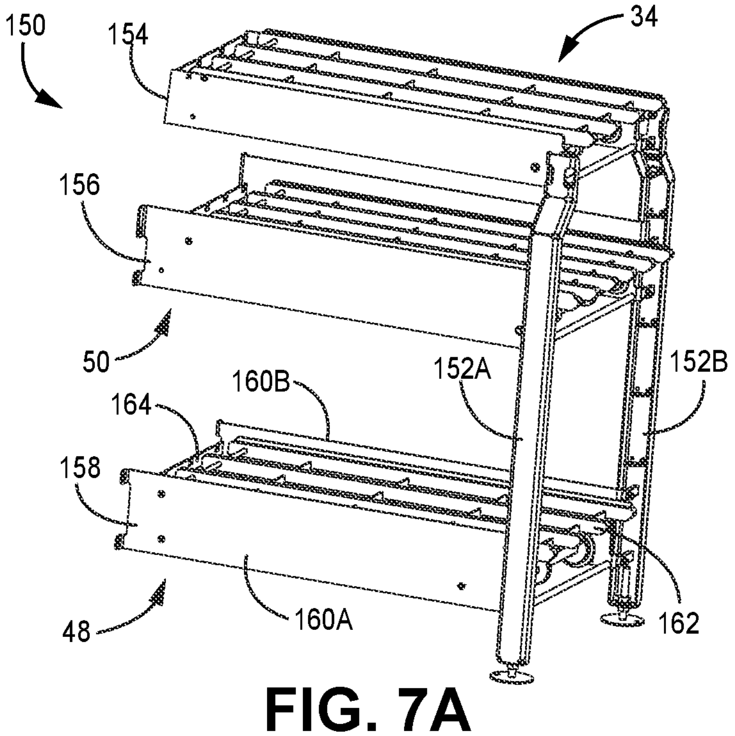
FIG. 7A is a perspective view of a stacked conveyor structure, according to one embodiment.

As shown in FIGS. 7A-7D according to certain embodiments, the modularity of the conveyors and the packoff stations can result in part from the modular configuration of the stacked conveyor structure 33 having the three conveyors: the sort conveyor 34, the rejected product conveyor 50, and the packed box conveyor 48. More specifically, in certain implementations, coupleable, modular conveyor sections 150 can be provided that have all three conveyors 34, 50, 48 coupled together in a stacked configuration via legs 152A, 152B at one end of the conveyors 34, 50, 48 as best shown in FIG. 7A. The stacked conveyor section 150 can have any length that makes it possible to construct a packoff system in a specific space of a facility by combining two or more of the stacked sections 150. That is, the various stacked section 150 implementations cannot be limited to a specific length, because the dimensions can be determined entirely by the specific dimensions of the space in which the system will be positioned. In one embodiment, the stacked conveyor section 150 can be used in a configuration having two loading stations (such as loading stations 38 or the like) on each side or two on one side attached thereto or otherwise positioned adjacent thereto with an access space for an operator to access the rejected product conveyor 50 therebetween (as described in further detail elsewhere herein). Each of the conveyors 34, 50, 48 has a conveyor frame 154, 156, 158 that includes two sides 160A, 160B and a conveyor belt bed 162 supported by crossrails 164 as shown. These frame components are identified on the packed box conveyor frame 158, but it is understood that each of the conveyor frames 154, 156, 158 has similar components. Alternatively, each of the conveyors 34, 50, 48 can have any known configuration. Each of the frames 154, 156, 158 is attached to the legs 152A, 152B via the sides 160A, 160B as shown. Alternatively, the legs 152A, 152B can be attached to the section 150 in any known fashion. Further, each section 150 is configured such that it can easily couple with and be quickly and easily attached to a corresponding adjacent section.

Figure 7B:
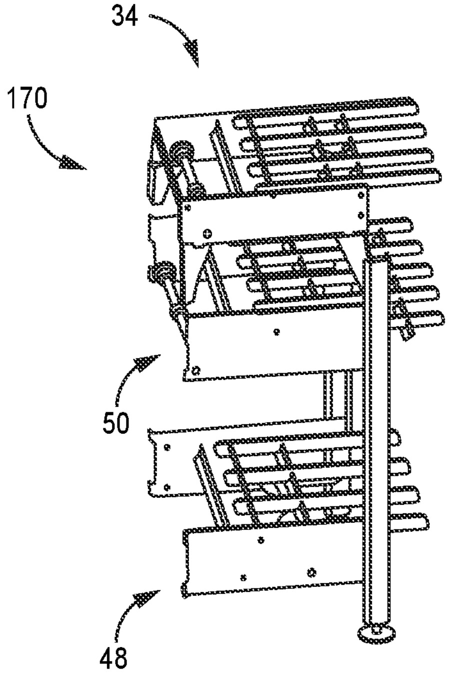
FIG. 7B is a perspective view of another stacked conveyor structure, according to another embodiment.

An alternative modular conveyor section 170 is depicted in FIG. 7B, in which the section 170 has a shorter length in comparison to the section 150 discussed above. Except as expressly stated herein, the various components, features, and functionality of the modular section 170 are substantially similar to the equivalent components, features, and functionalities of the modular section 150 discussed above and elsewhere herein. In certain implementations, the conveyor section 170 can have any length to extend the length of the conveyors 34, 50, 48 by a desired amount in a specific space of a facility. That is, the various stacked section 170 implementations cannot be limited to a specific length, because the dimensions can be determined entirely by the specific dimensions of the space in which the system will be positioned. In one embodiment, the stacked conveyor section 170 can be used in a configuration having one loading station (such as loading station 38 or the like) on each side or one station on one side attached thereto or otherwise positioned adjacent thereto. According to various embodiments, the shorter conveyor section 170 can be used to add additional length to the conveyors 34, 50, 48 in those situations in which the longer section 150 cannot be used, perhaps because of the limitations of the space in which the conveyors 34, 50, 48 are disposed. Thus, the optional shorter conveyor section 170 can add additional configurability and flexibility to the configuration of the various system embodiments herein.

It should be noted that other stacked sections of different lengths can also be provided based on the desired configuration of the overall processing/packing equipment system 11.

Figure 7C:
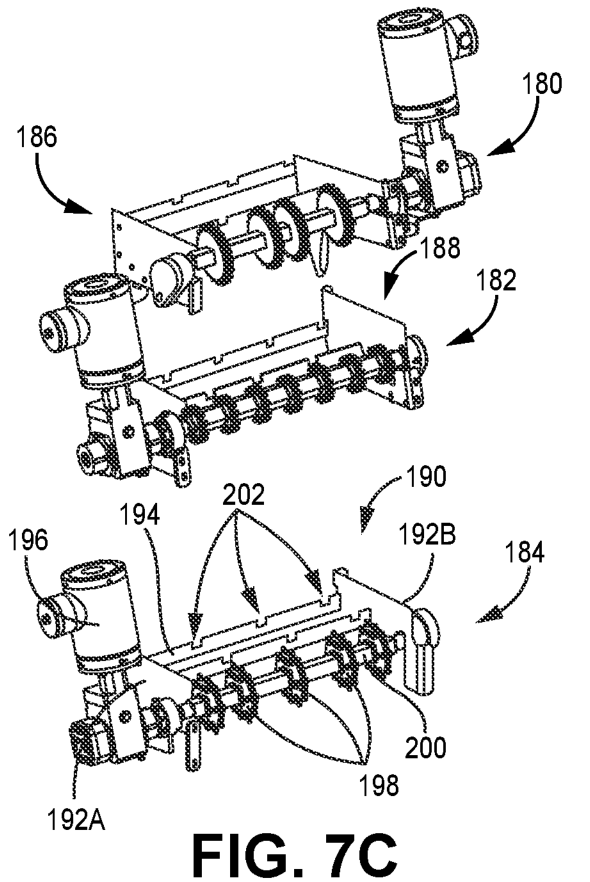
FIG. 7C is a perspective view of detachable drive sections that can be coupled to a stacked conveyor structure, according to one embodiment.

In certain system embodiments, the drive motors are disposed at one end of the conveyors 34, 50, 48. One specific example is best shown in FIG. 3D as discussed above, in which the drive motors are disposed at an end of the conveyors 34, 50, 48 opposite the end closest to the classification system 32. Alternatively, the drive motors can be disposed at either end of the conveyors 34, 50, 48. In one exemplary modular embodiment as best shown in FIG. 7C, detachable drive sections 180, 182, 184 are provided that can be easily attached to the ends of the conveyors 34, 50, 48, including, for example, the ends of either modular conveyor sections 150, 170 discussed above or any similar sections as contemplated herein. Each of the drive sections 180, 182, 184 has a frame 186, 188, 190 that includes two sides 192A, 192B, crossrails 194 extending across and attached to the two sides 192, 192B, a drive motor 196, and a set of drive sprockets 198 on a drive shaft 200 coupled to the motor 196 to attach to and drive the conveyor belt (not shown). These drive section components are identified on the packed box conveyor drive section 184, but it is understood that each of the drive sections 180, 182, 184 has similar components. In one embodiment as shown, each of the crossrails 194 has indentations 202 defined within the top surface of the crossrail 194 to receive the elongate bars of the conveyor belt bed of the conveyor to which the drive section is to be attached. Alternatively, each of the drive sections 180, 182, 184 can have any known configuration that allows the drive sections to be easily coupleable to the corresponding conveyors 34, 50, 48. In some embodiments, the drive sections 180, 182, 184 can be attached to the conveyor frames (such as frames 154, 156, 158) by attaching the sides 192A, 192B of the drive section 180, 182, 184 to the sides 160A, 160B of the frame 154, 156, 158. Alternatively, the drive sections 180, 182, 184 can be attached to the frames 154, 156, 158 in any known fashion. Further, each drive section 180, 182, 184 is configured such that it can easily couple with and be quickly and easily attached to a corresponding conveyor 34, 50, 48.

Figure 7D:
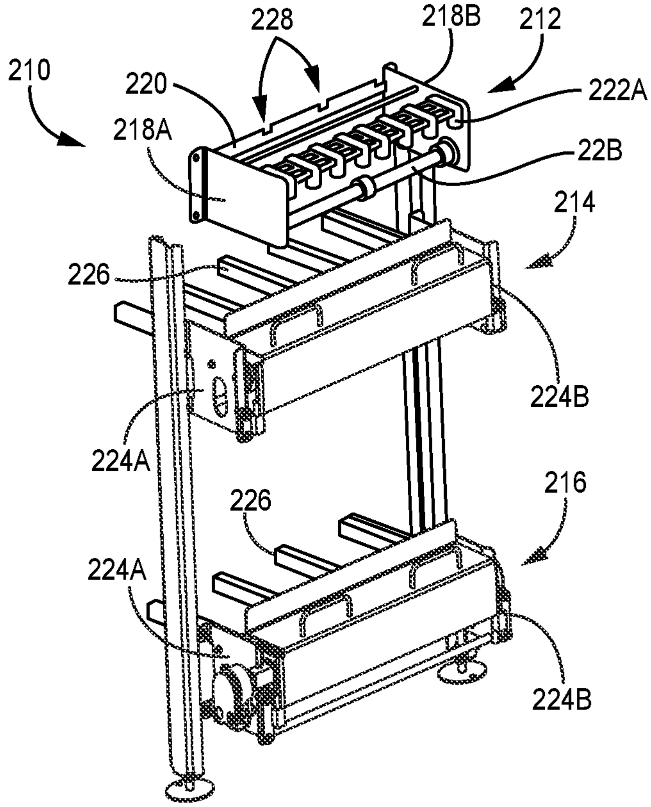
FIG. 7D is a perspective view of stacked conveyor structure end section, according to one embodiment.
Figure 7E:
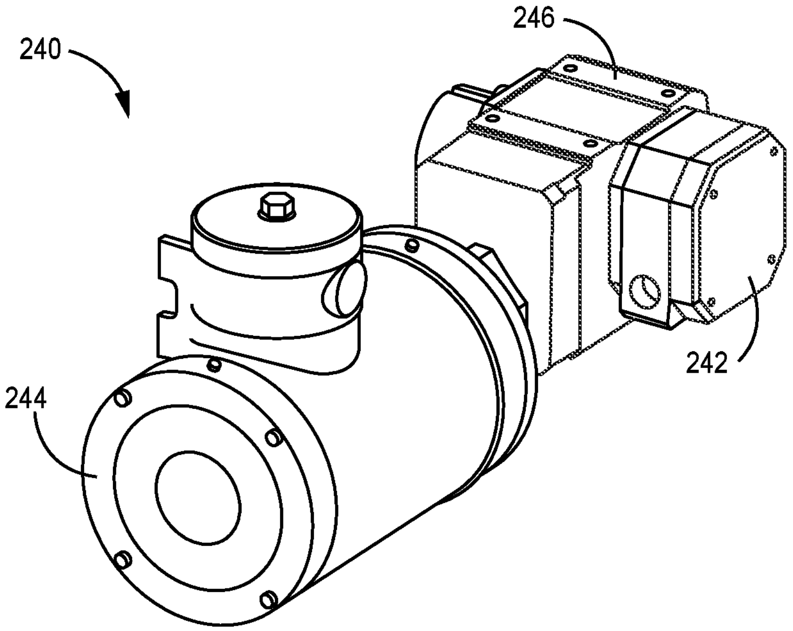
FIG. 7E is a perspective view of a motor assembly and encoder, according to one embodiment.
Figure 7F:
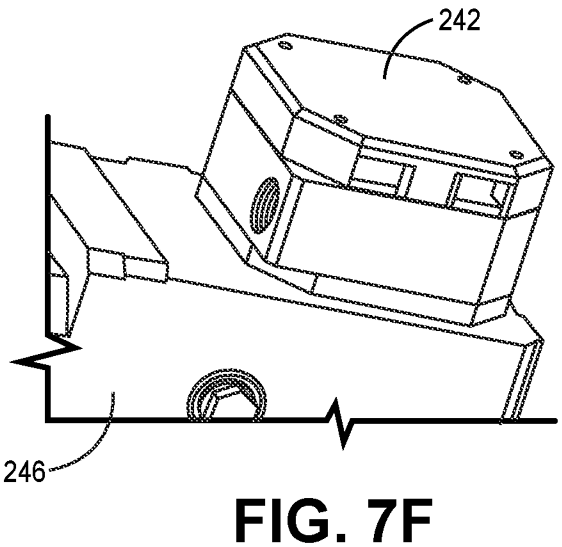
FIG. 7F is a perspective view of the encoder of FIG. 7E, according to one embodiment.
Figure 7G:
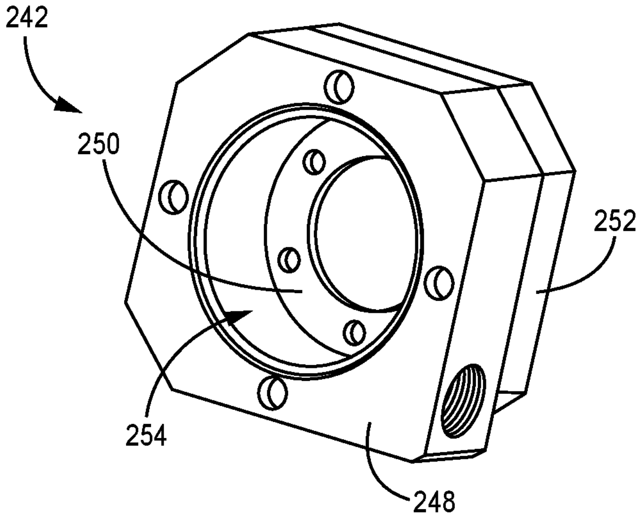
FIG. 7G is another perspective view of the encoder of FIG. 7E, according to one embodiment.

As shown in FIG. 7D, in some embodiments, the various conveyor configurations herein can also have a modular end section 210 that can be attached to the conveyors 34, 50, 48 at the end opposite the drive sections 180, 182, 184. The modular end section 210 has three frames 212, 214, 216 are provided that can be easily attached to the ends of the conveyors 34, 50, 48, including, for example, the ends of either modular conveyor sections 150, 170 discussed above or any similar sections as contemplated herein. The frame 212 has two sides 218A, 218B, a crossrail 220 extending across and attached to the two sides 218A, 218B, and two belt receiving structures 222A, 222B extending across and attached to the two sides 218A, 218B such that the belt (not shown) can contact the two belt receiving structures 222A, 222B as the belt rotates around the frame 212. In addition, each of the frames 214, 216 has two sides 224A, 224B, and bars 226 attached to the frames 214, 216 and extending therefrom parallel to the sides 224A, 224B such that the bars align with the elongate bars of the conveyor belt beds on the corresponding conveyors 50, 48. In one embodiment as shown, the crossrail 220 has indentations 228 defined within the top surface of the crossrail 220 to receive the elongate bars of the conveyor belt bed of the conveyor 34 to which the frame 212 is to be attached. Further, in the specific implementation as depicted, the end section 210 has two legs 230A, 230B to which each of the frames 212, 214, 216 are attached. Alternatively, the end section 210 and each of the frames 212, 214, 216 can have any known configuration that allows the frames 212, 214, 216 to be easily coupleable to the corresponding conveyors 34, 50, 48. In some embodiments, the end section 210 can be attached to the conveyor frames (such as frames 154, 156, 158) by attaching the sides 218A, 218B, 224A, 224B of the frames 212, 214, 216 to the sides 160A, 160B of the frame 154, 156, 158. Alternatively, the end section 210 can be attached to the frames 154, 156, 158 in any known fashion. Further, end section 210 is configured such that it can easily couple with and be quickly and easily attached to a corresponding conveyor 34, 50, 48.

Thus, the modular components as shown in FIGS. 7A-7D, including the modular conveyor sections 150, 170, the drive sections 180, 182, 184, and the end section 210, can be coupled together in multiple different configurations to create systems having different lengths and configurations, thereby making it possible for any system embodiment herein to be easily expanded or contracted to fit different spaces and production speeds/product mixes. Further, any of the conveyors in the system embodiments herein can be modular in a fashion similar to the modular conveyor sections 150, 170 such that any conveyors, including the sections 150, 170, can be incorporated into any portion of the system embodiments herein (including system 10, for example), such as between the classification system 32 and the sort conveyor 34, between any of the loading stations 38, or anywhere else in the system.

One exemplary embodiment of a motor assembly 240 with an encoder 242 that can be incorporated into the various systems disclosed or contemplated herein is depicted in FIGS. 7E-7H. In one specific implementation, the assembly 240 and encoder 242 can be incorporated into the sort conveyor drive section 180 and/or the packed box conveyor drive section 184 as depicted in FIG. 7C. As described elsewhere herein, the encoder 242 is configured to be used in combination with the computing device 54 to track the exact location of every product/box on the conveyor to which the encoder 242/motor assembly 240 is attached. More specifically, the motor assembly 240 with the encoder 242 can be incorporated into the sort conveyor drive section 180 such that the encoder 242 can be used in conjunction with the information from the classification system 32 to track the exact location of every product on the sort conveyor (such as conveyor 34). Further, the motor assembly 240 with the encoder 242 can be incorporated into the packed box conveyor drive section 184 such that the encoder 242 information can be used by the computing device 54 in conjunction with the information from the takeaway conveyors on the loading stations (as discussed in further detail below) to track the exact location of every packed box on the packed box conveyor (such as conveyor 48).

In this specific embodiment, the motor assembly 240 has a motor 244 and a gear box 246 that transmits the motive force from the motor 244 to the conveyor belt via the drive shaft (such as drive shaft 200 as described above with respect to FIG. 7C). The gear box 246 also has a rotatable end wheel 256 that is rotationally constrained to the drive shaft (such as shaft 200) and disposed on the side of the gear box 246 opposite the drive shaft. Further, the encoder 242 is attached to the gear box 246 over the rotatable end wheel 256 as shown such that the encoder 242 is also coupled to the drive shaft.

Figure 7H:
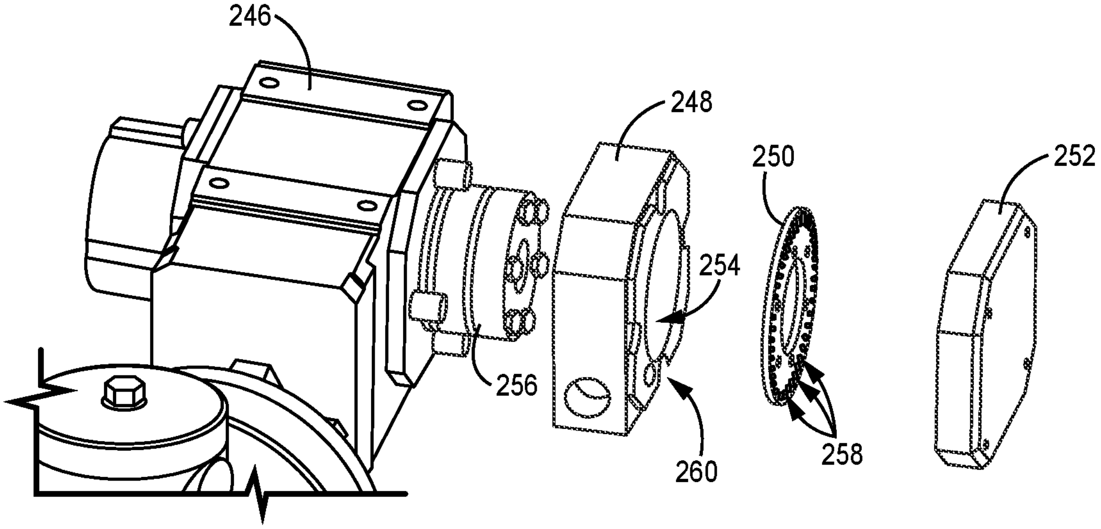
FIG. 7H is another perspective, exploded view of the encoder and part of the motor assembly of FIG. 7E, according to one embodiment.

As best shown in FIG. 7H, the encoder 242 has a housing 248, an encoder wheel 250, and a cover 252 such that the encoder wheel 250 is rotatably disposed between the housing 248 and the cover 252. Further, the housing 248 has an opening 254 defined within the housing 248 that can be positioned over the rotatable end wheel 256 of the gear box 246 when the housing 248 is attached to the gear box 246 such that the encoder wheel 250 can be attached to the rotatable end wheel 256. Thus, when the motor 244 transmits motive force to the drive shaft (such as shaft 200), and thereby causes rotation of the conveyor belt, the rotation of the drive shaft causes rotation of the rotatable end wheel 256, which causes rotation of the encoder wheel 250 at exactly the same rotational speed as the shaft (such as shaft 200). The encoder wheel 250 has multiple small openings 258 around the outer circumference of the wheel 250 that are positioned adjacent to a sensor 260 disposed within the housing 248 such that the sensor 260 is triggered by each opening 258 that passes the sensor 260 during rotation of the encoder wheel 250. Thus, the sensor 260, which is operably coupled to the computing device 54, can track the exact rotation of the encoder wheel 250, which tracks the exact rotation of drive shaft (such as shaft 200), and thereby tracks the exact location of the conveyor belt (and thus any product/box thereon).

Alternatively, any known encoder can be used with the motor assembly 240 or alternatively can be incorporated into any location on the relevant conveyor (such as the sort conveyor 34 and/or the packed box conveyor 48 to track the location of the products/boxes thereon.

As discussed above, certain system embodiments (including system 10) can have an empty box conveyer (such as conveyer 46 as shown in FIGS. 2A and 3A-3C) positioned across and above the loading stations 38. One exemplary version of this conveyor 46 is depicted in additional detail in FIGS. 8A-8G, according to one embodiment. During the packing process at each loading station, the operator (or the system via automation) packs the box disposed on the takeaway conveyor 44. Once that box is packed and transported along the conveyor 44 and then transferred to the packed box conveyor 48, the operator will require another empty box to place on the takeaway conveyor 44 for packing.

In known empty box conveyors, the conveyor belt is constantly moving, which results in the boxes being forced together along the conveyor when they reach the end of conveyor. This results in a phenomenon referred to as "back pressure" in which the lateral force of numerous boxes being urged together causes substantial frictional resistance to any one of those boxes being removed from the conveyor. The problem is compounded by the fact that known empty box conveyors used today can be very long (up to 20 or 30 feet long). Given the number of boxes that can be disposed on such long conveyors, the total weight of those boxes can be significant, which creates a lot of back pressure as those boxes are forced together by the continually rotating conveyor belt, especially for the operators near the end of the empty box conveyor. As a result, the operators have to fight this back pressure and can struggle to remove a box from the conveyor. In contrast, the empty box conveyor 46 embodiment herein reduces or eliminates that back pressure, as explained below.

Figure 8A:
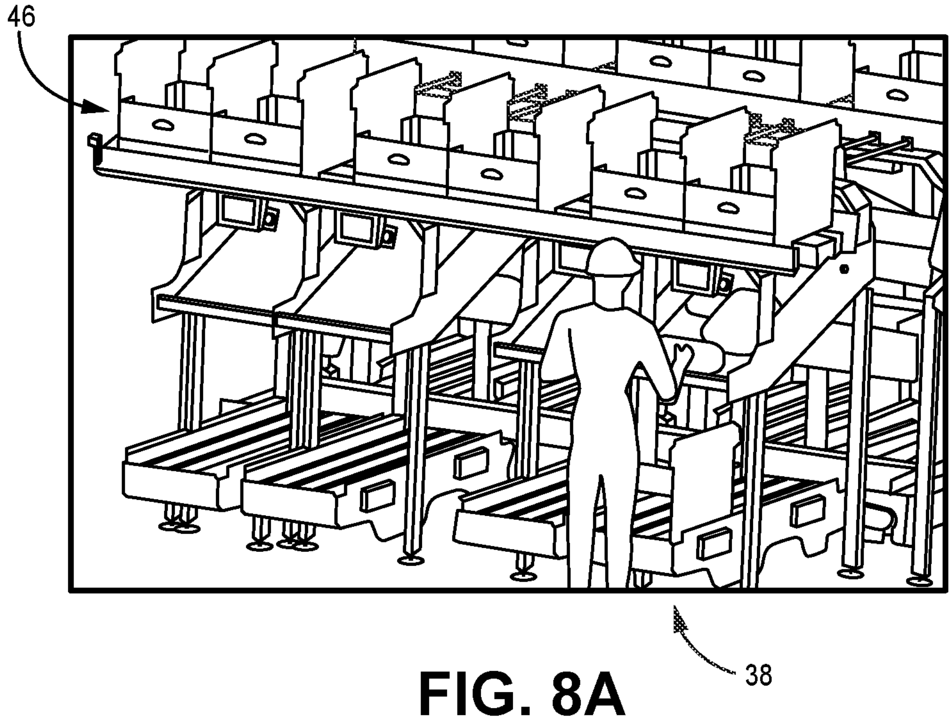
FIG. 8A is a perspective view of an empty box conveyor, according to one embodiment.
Figure 8B:
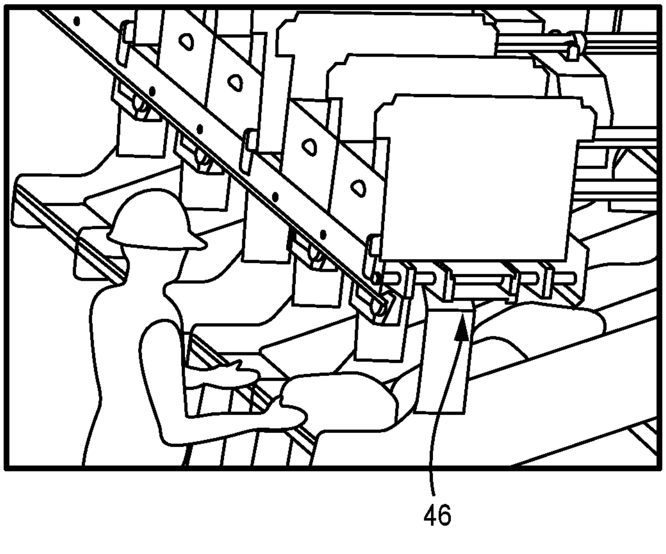
FIG. 8B is another perspective view of the empty box conveyor of FIG. 8A, according to one embodiment.
Figure 8C:
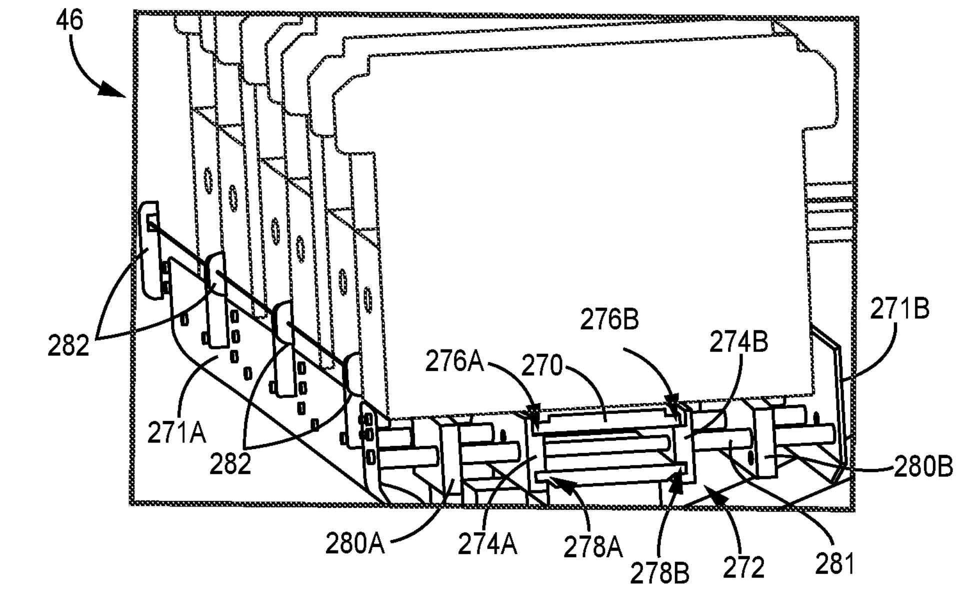
FIG. 8C is another perspective view of the empty box conveyor of FIG. 8A, according to one embodiment.

In the embodiment shown, a conveyor 46 providing empty boxes is disposed above and attached to the loading station 38 and thus is positioned above the operator's head. As best shown in FIG. 8C, the conveyor 46 includes sides 271A, 271B, a conveyor belt 270 disposed on a conveyor body 272 having two sides 274A, 274B with an inner lip 276A, 276B formed on each side 274A, 274B on which the belt 270 is positioned as it passes along the top of the conveyor body 272. Further, both sides 274A, 274B also have a channel 278A, 278B defined therein such that the belt 270 is positioned within the channels 280A, 280B as it passes back along the underside of the conveyor body 272. Thus, the portion of the belt 270 moving along the lips 276A, 276B can transport boxes on top of the belt 270, while the portion of the belt 270 moving along the channels 278A, 278B is the "return" portion of the belt 270 that passes along the channels 278A, 278B until it reaches the end of the conveyor body 272 and rotates around such that it is again positioned on the lips 276A, 276B.

In certain embodiments, the belt 270 is constantly moving. That is, the belt does not stop rotating around the conveyor body 272.

Figure 8D:
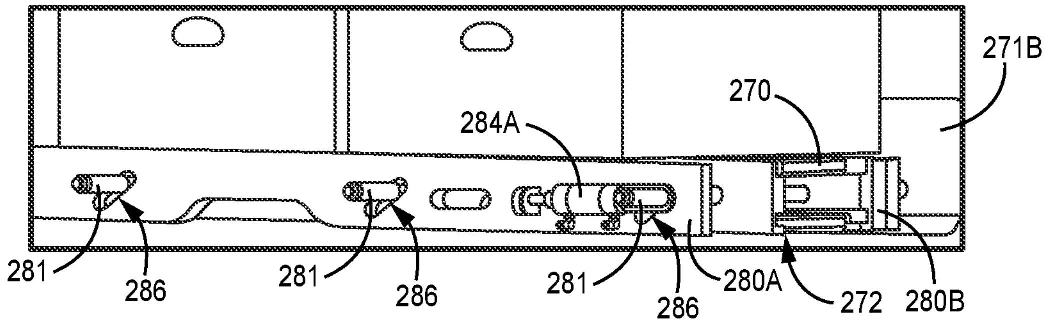
FIG. 8D is a perspective, cutaway view of a portion of the empty box conveyor of FIG. 8A in the lowered position, according to one embodiment.
Figure 8E:
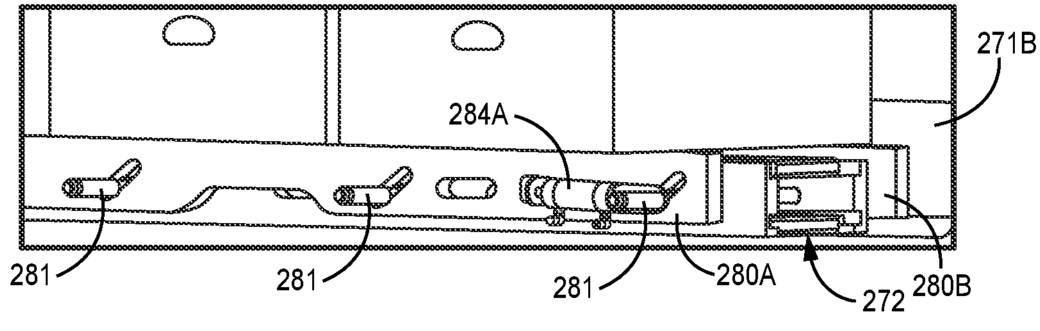
FIG. 8E is a perspective, cutaway view of a portion of the empty box conveyor of FIG. 8A in the raised position, according to one embodiment.
Figure 8F:
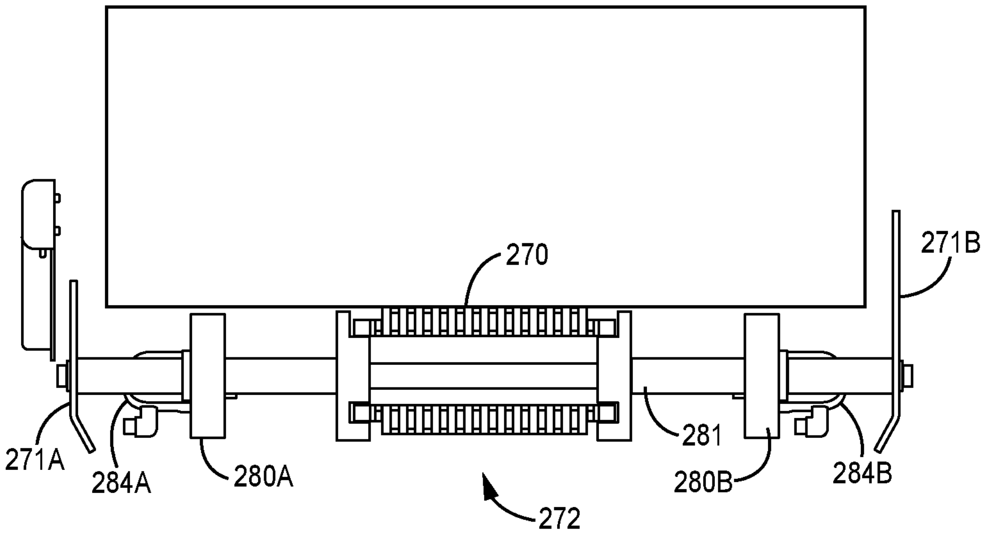
FIG. 8F is a cross-sectional end view of the empty box conveyor of FIG. 8A in the lowered position, according to one embodiment.
Figure 8G:
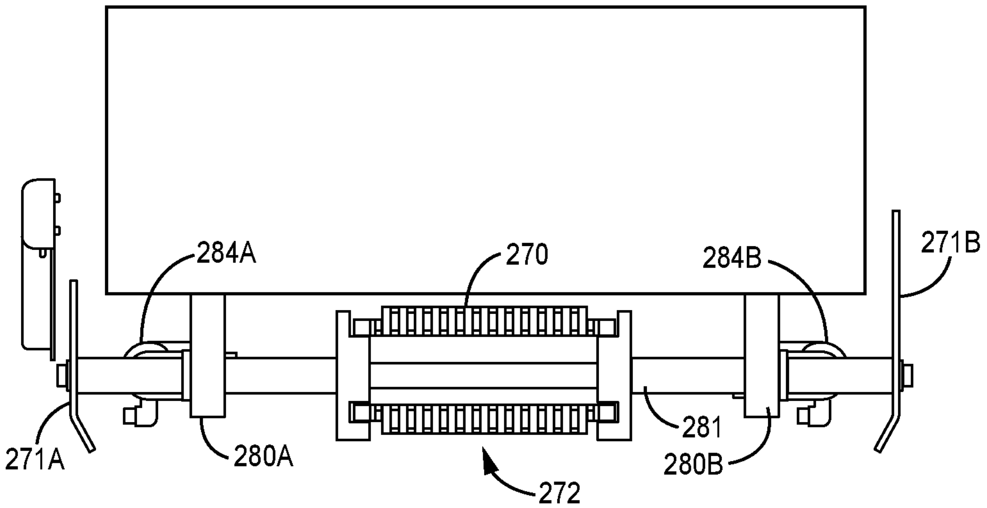
FIG. 8G is a cross-sectional end view of the empty box conveyor of FIG. 8A in the raised position, according to one embodiment.

In addition, the conveyor 46 also has at least two lifter rails 280A, 280B disposed on either side of the conveyor body 272 as shown. The rails 280A, 280B are movable between a lowered position as shown in FIGS. 8D and 8F (in which the top of the rails 280A, 280B are disposed lower than the top of the conveyor belt 270) and a raised position as shown in FIGS. 8E and 8G (in which the top of the rails 280A, 280B are disposed higher than the top of the conveyor belt 270). In the lowered position (FIGS. 8D and 8F), the top of the rails 280A, 280B are not in contact with the boxes disposed on the conveyor, and thus the boxes are in contact with and are urged along the conveyor 46 by the belt 270. In contrast, in the raised position (FIGS. 8E and 8G), the top of the rails 280A, 280B are in contact with the boxes, and thus the boxes are not in contact with the conveyor 46, meaning that the lateral force applied by the belt 270 along the conveyor 46 is removed.

In one specific embodiment, the lifter rails 280A, 280B can be actuated to move from the lowered position into the raised position by actuators that urge the rails 280A, 280B into their raised position. When the lifters 280A, 280B move into the raised position, the boxes on the conveyor belt 270 are raised up away from the belt 270 such that they are no longer in contact with the belt 270. At this point, the boxes are no longer being urged along the conveyor 46 by the belt 270 and thus are no longer being subjected to the back pressure discussed above. As a result, urging the lifter rails 280A, 280B into the raised position makes it possible for an operator to remove a box from the conveyor 46.

In one embodiment, at least one air cylinder is the actuator coupled to each of the lifter rails 280A, 280B via the rods 281 that extend across the width of the conveyor 46 as shown such that actuation of the air cylinder causes the rails 280A, 280B to move into their raised position. Alternatively, any known actuator can be used for this purpose.

As best shown in FIGS. 8D-8G, the lifter rails 280A, 280B can be actuated to move between the lowered position and the raised position by two actuators 284A and 284B (in which the first actuator 284A is attached to rail 280A and the second actuator 284B is attached to rail 280B) and a set of rods 281 that are operably coupled to the rails 280A-B such that the rails 280A-B move in unison when actuated by the actuators 284A-B. More specifically, the rods 281 are attached at each end to the conveyor sides 271A-B and extend across the width of the conveyor 46 through both rails 280A-B and the conveyor belt body 272. All three rods 281 are fixedly attached to the sides 271A-B and the conveyor body 272 such that the body 272 and the rods 281 do not move in relation to the sides 271A-B of the conveyor 46. In contrast, the rods 281 are slidably positioned within slots 286 defined in the rails 280A-B. According to one embodiment, the slots 286 are disposed at about a 45 degree angle in relation to a longitudinal axis of the rails 280A-B. Further, the first actuator 284A is attached at one end to the rail 280A and at the other end to one of the rods 281 as best shown in FIGS. 8D and 8E. Further, the second actuator is attached at one end to the rail 280B and at the other end to the same rod 281 (or a different rod) as can be seen with reference to FIGS. 8D-8G.

As such, actuation of the actuators 284A-B causes the rails 280A-B to move in relation to the conveyor 46 along the path of the slots 286 defined within the rails 280A-B. Because the path established by the slots 286 is disposed at about a 45 degree angle as described above, the rails 280A-B move both horizontally and vertically as shown. Alternatively, the slots 286 can be disposed at any angle that allows the rails 280A-B to move vertically such that the rails 280A-B can be disposed at a height higher than the conveyor belt 270 in the raised position and lower than the conveyor belt 270 in the lowered position.

In one embodiment, the actuators 284A-B are air cylinders 284A-B. Alternatively, each of the actuators 284A-B can be any hydraulic actuator or a piston actuator.

Thus, actuation of the air cylinders 284A-B causes the rails 280A-B to move between the lowered position as best shown in FIGS. 8D and 8F and the raised position as best shown in FIGS. 8E and 8G. In operation, when each of the air cylinders 284A-B is actuated such that the pistons is urged away from the cylinder 284A-B, the rails 280A-B are urged in the direction opposite the direction of the piston until they reach the raised position as shown in FIGS. 8A and 8G. In this position, any box positioned on the set of rails 280A-B is not in contact with the belt 270. In contrast, when each of the air cylinders 284A-B is actuated to retract the piston toward the cylinder 284A-B, the rails 280A-B are urged into the lower position as shown in FIGS. 8D and 8F. In this position, the box is placed into contact with the belt 270 such that the box is then urged along the belt 270 toward the end of the empty box conveyor 46.

In accordance with one embodiment, the lifter rails 280A, 280B can be actuated to move into the raised position (and thereby remove the back pressure from the boxes) via sensors 282 disposed along the outer side 271A of the conveyor 46 as shown. Each of the sensors 282 can be a motion detection sensor 282 or any other type of sensor 282 that can detect the presence of an operator's arm or hand being positioned over the outer side 271A of the conveyor 46 to grasp a box. In one specific embodiment, the sensors 282 are photo eyes 282 that are positioned to be triggered by the operator's arm breaking the "beam" between two of the sensors 282. The sensors 282 are coupled to the computing device 54 as discussed elsewhere herein such that the computing device 54 immediately causes the lifter rails 280A, 280B to be actuated into their raised position, thereby raising the boxes, halting forward movement and force, and thus reducing or eliminating the back pressure on the boxes. As a result, the operator can readily remove a box from the conveyor 46.

According to certain implementations, once the sensors 282 have been triggered and the rails 280A, 280B have been lifted, the rails 280A, 280B are lowered back to their lowered position after a predetermined amount of time. At this point, the boxes are again in contact with the belt 270 and are urged forward along the conveyor 46 to fill the space created by the removal of the previous box, thereby ensuring that another empty box is available to the operator when it is needed.

In some embodiments, the conveyor 46 can be a single conveyor 46 with a single set of sensors 282 along the entire length thereof. Alternatively, the conveyor 46 can be divided into separate sections with separate sets of sensors 282 so that the triggering of the sensors 282 in one section only causes the rails 280A, 280B to be raised in that section, rather than along the entire length of the conveyor 46.

According to certain embodiments, the rails 280A, 280B can not only provide the lifting described herein, but can also provide stability to the empty boxes on the belt 270 as they move along the conveyor 46. Alternatively, there can be at least two additional rails (not shown) that can also be lifter rails like rails 280A, 280B or solely can be stability rails to provide additional stability to the empty boxes.

In accordance with certain embodiments, the empty box conveyor 46 can be curved for the same reasons that the curved portion 102 of the conveyor in FIGS. 4A and 4B is curved. Further, any conveyor embodiment herein can have the same modularity (with coupleable sections, etc.) as the three-level stacked conveyors (such as the stacked conveyor structure 33) as discussed above.

Of course, other embodiments for providing empty boxes can be incorporated into the various system embodiments herein, including an empty box chute, an empty box chain, or any other known mechanism or system for providing empty boxes.

Figure 3E:
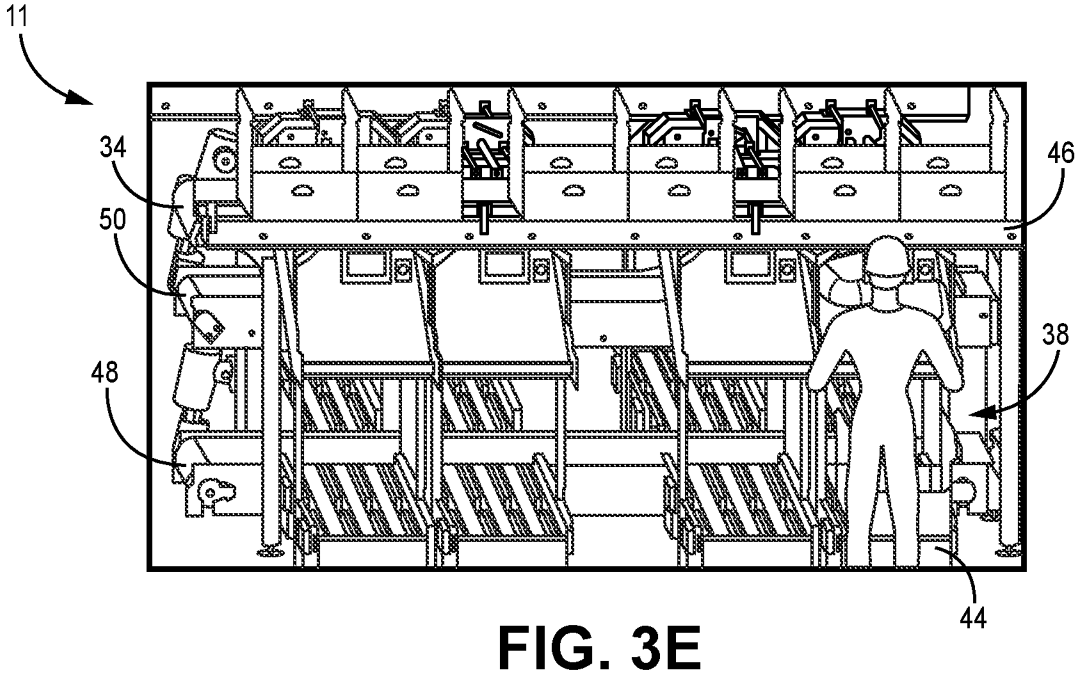
FIG. 3E is another perspective view of the product processing and packing equipment system of FIG. 3A, according to one embodiment.
Figure 3F:
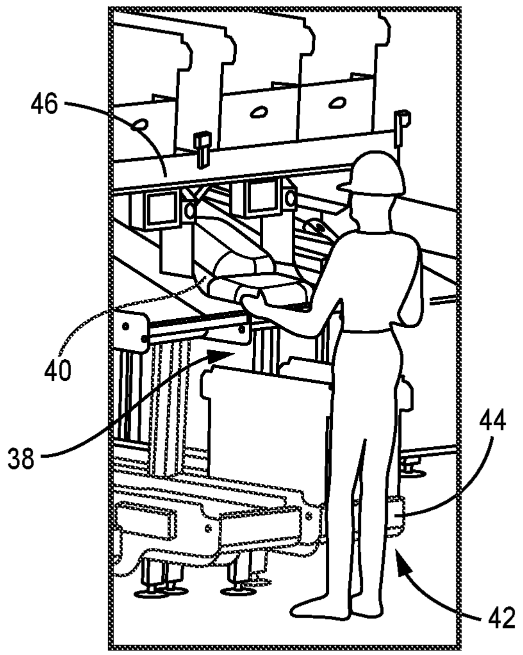
FIG. 3F is a perspective view of a loading station, according to one embodiment.

As discussed above, the various systems herein have at least two loading stations, such as the loading stations 38 depicted above in FIGS. 2B, 3B, and 3E. One embodiment of a loading station 38 is depicted in FIGS. 9A-11I—including the product chute 40, the takeaway conveyor 44, and the box loading area 42 at the end of the conveyor 44—and discussed in further detail below.

Figure 9A:
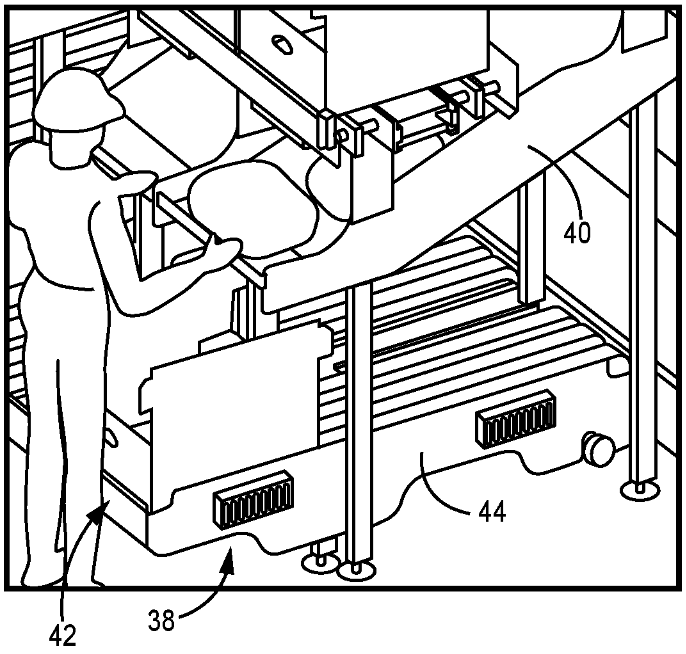
FIG. 9A is a perspective view of a loading station, according to one embodiment.
Figure 9B:
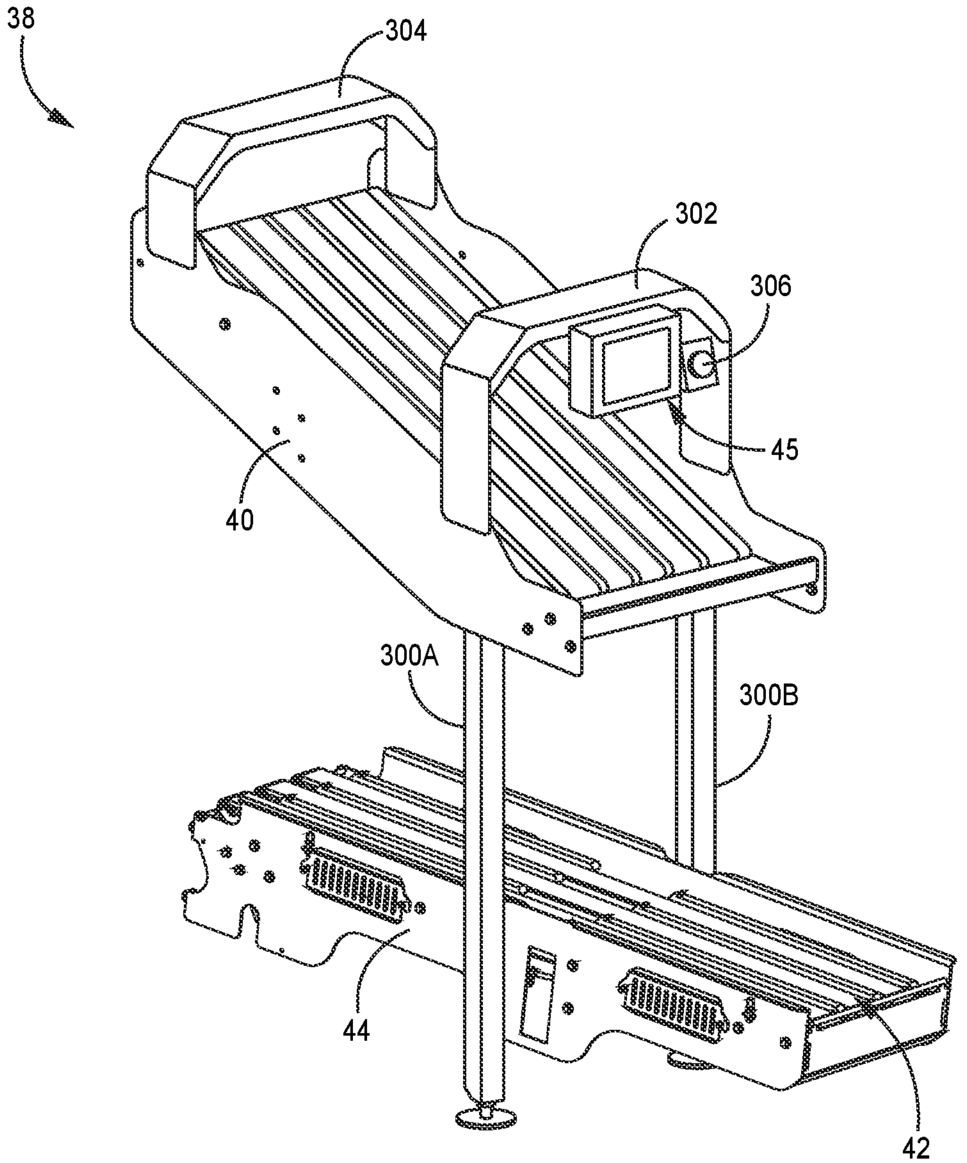
FIG. 9B is another perspective view of the loading station of FIG. 9A, according to one embodiment.

As best shown in FIGS. 9A and 9B, one loading station 38 has a product chute 40 adjacent to the sort conveyor 34, a box loading area 42, and a takeaway conveyor 44 disposed under the chute 40. In certain implementations, each loading station 38 can also have a computer interface 45 that can display certain information about the products being boxed at that station 38 and further can allow for a user to interact with the interface 45 to input information and/or control certain aspects of the system 10. In accordance with certain embodiments, the computer interface 45 can provide basic information about the product(s) being boxed at that particular loading station 38. Such information can include the number of products per box, the product codes, the type of product, etc. Further, in some implementations, the computing device 54 can track the products being sorted into a particular loading station 38 and adjust the product assignment to that station 38 as needed. For example, if the sensors disposed in the chute 40 (as discussed in further detail below) indicate that the chute 40 is full or becoming full with products, the computing device 54 can adjust the sorting so that that particular type of product is sorted to a different loading station 38. Alternatively, the computing device 54 can dynamically reallocate products in any way based on any real-time product flow information to accommodate production.

As best shown in FIG. 9B, according to certain embodiments, the loading station 38 can have two legs 300A, 300B disposed on either side of the takeaway conveyor 44 and attached to the chute 40 such that the legs 300A, 300B provide support to the chute 40. In addition, the chute 40 can have two vertical supports 302, 304 extending above the chute 40 such that the supports 302, 304 are disposed sufficient distance above the chute 40 such that the supports 302, 304 do not interfere with the products moving down the chute 40. According to some implementations, the support 302 can have the computer interface 45 and a release button 306 attached thereto as shown. Further, the support 302 can also provide support for an empty box conveyor such as the conveyor 46 discussed above, as shown in FIG. 8B. In addition, the support 304 can provide support for other components of the system embodiments herein, including, for example, the pushers 36, as shown in FIG. 2A above.

Figure 10A:
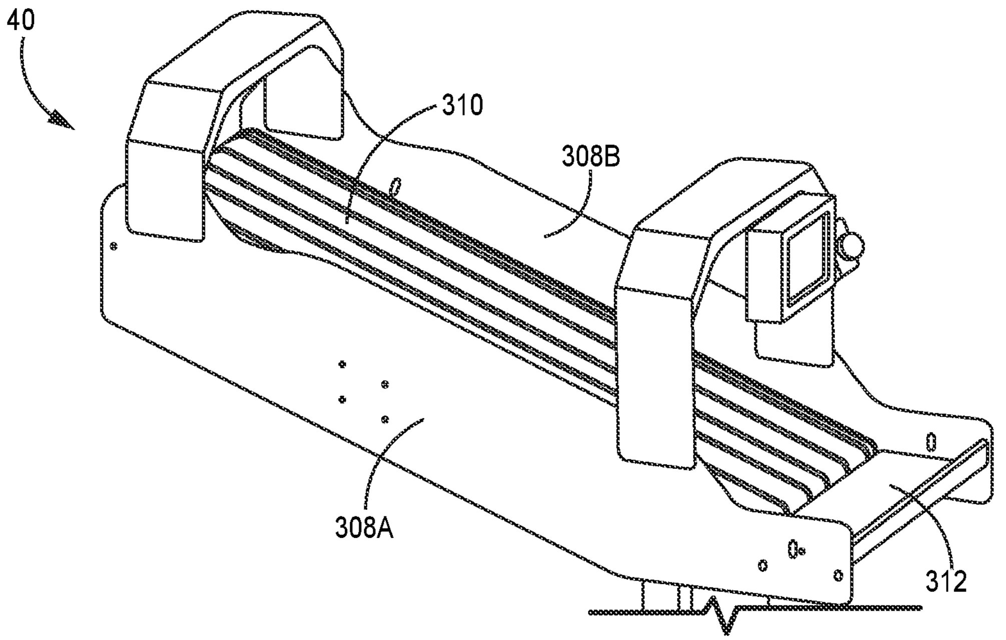
FIG. 10A is a perspective view of a chute of a loading station, according to one embodiment.
Figure 10B:
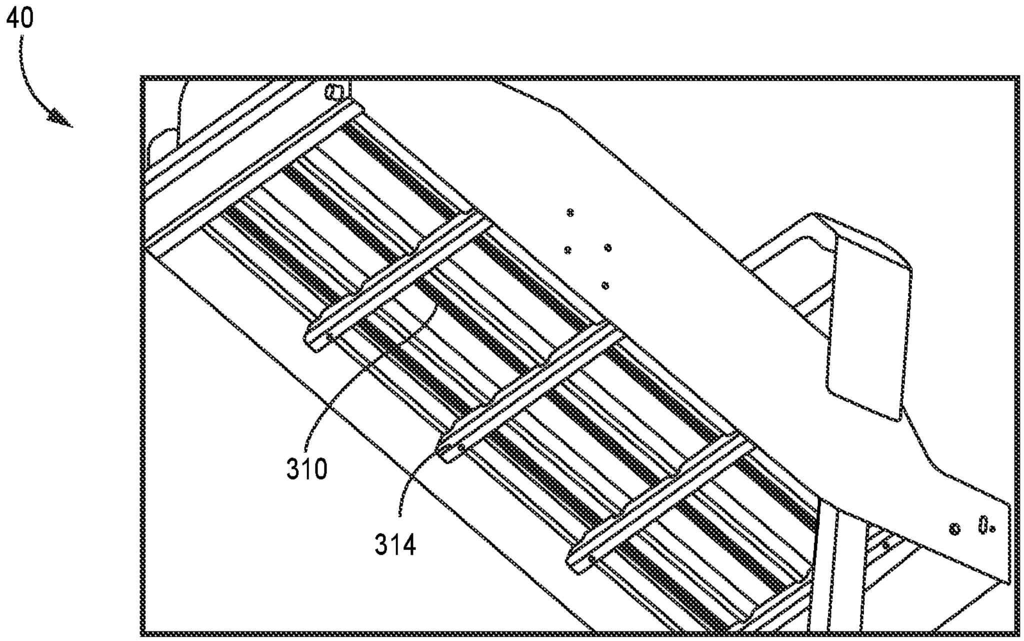
FIG. 10B is another perspective view of the chute of FIG. 10A, according to one embodiment.

As best shown in FIGS. 9B, 10A, and 10B, one embodiment of the chute 40 has two sides 308A, 308B and a chute bed 310 that is configured to allow the products slide or otherwise move down the bed 310. In certain implementations, the surface of the chute bed 310 is configured to allow products to slide down the chute bed 310 to the bottom of the chute while preventing the products from sliding at such a speed that the products strike the end of the chute 40 too violently or fly off the end of the chute 40. In one specific embodiment, the chute bed 310 is a roller bead bed 310 that can restrict the speed at which the products slide down the bed 310. For example, the roller bead bed 310 can be the Series 1000 High Density Insert Roller™ belt, which is commercially available from Intralox® (www.intralox.com). Alternatively, the chute bed 310 can have any known insert similar to the Series 1000 belt above or any other known surface and/or be made of any known material that can help to restrict the speed at which the products slide down the bed 310. The chute bed 310 can be supported by support rails 314 that are disposed under the bed 310 and are attached to the sides 308A, 308B, as best shown in FIG. 10B.

According to certain embodiments, the inner walls of the sides 308A, 308B can have sensors (not shown) that can detect the presence of products within the chute 40 such that the computing device 54 can track how many products are in the chute 40 or when the chute 40 is full of products. In one embodiment, the sensors are photoelectric sensors. For example, the sensors are through-beam Miniature Photoelectric Sensors model #PR-F51, which are available from Keyence (www.keyence.com). Alternatively, any known photoelectric sensors or other known types of sensors for detecting the presence of objects can be used.

In some implementations, the chute 40 can have a product receiving area (also referred to herein as a "landing pad") 312 that is configured to receive the products that slide down the chute bed 310. The landing pad 312 can slow products down as they exit the chute bed 310 and can act as a buffer to allow products to accumulate prior to be packed into a box.

According to another embodiment, other chute embodiments can be incorporated into the loading stations 38 and/or the systems (such as system 10) disclosed or contemplated herein. In one specific implementation, a chute can be incorporated that is described in additional detail in U.S. patent application Ser. No. 18/449,566, entitled "Variable Friction Chute" and filed on Aug. 14, 2023, a commonly assigned, concurrently filed U.S. patent application, which is hereby incorporated herein by reference in its entirety.

Figure 11A:
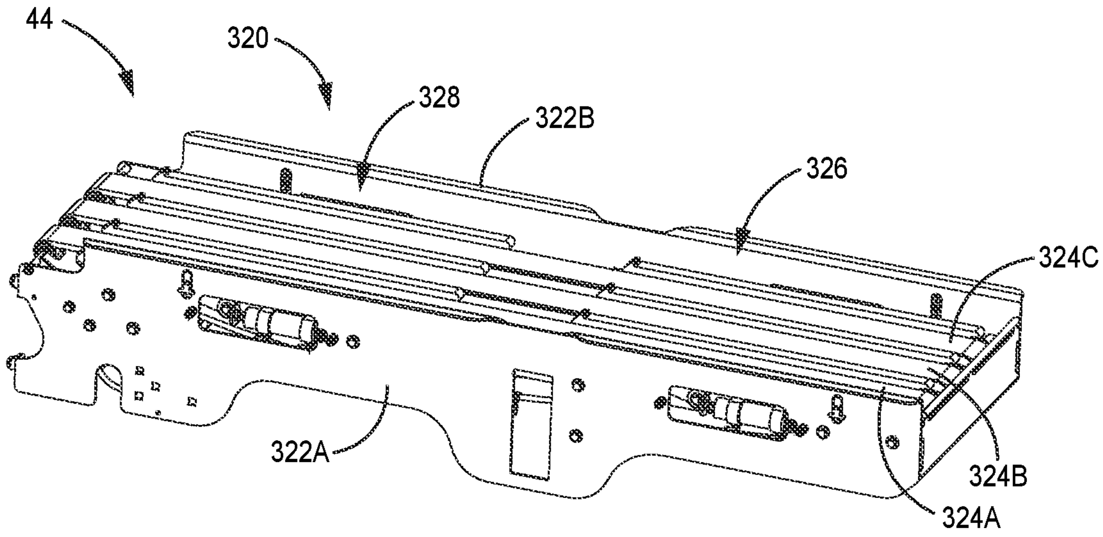
FIG. 11A is a perspective view of a takeaway conveyor of a loading station, according to one embodiment.
Figure 11B:
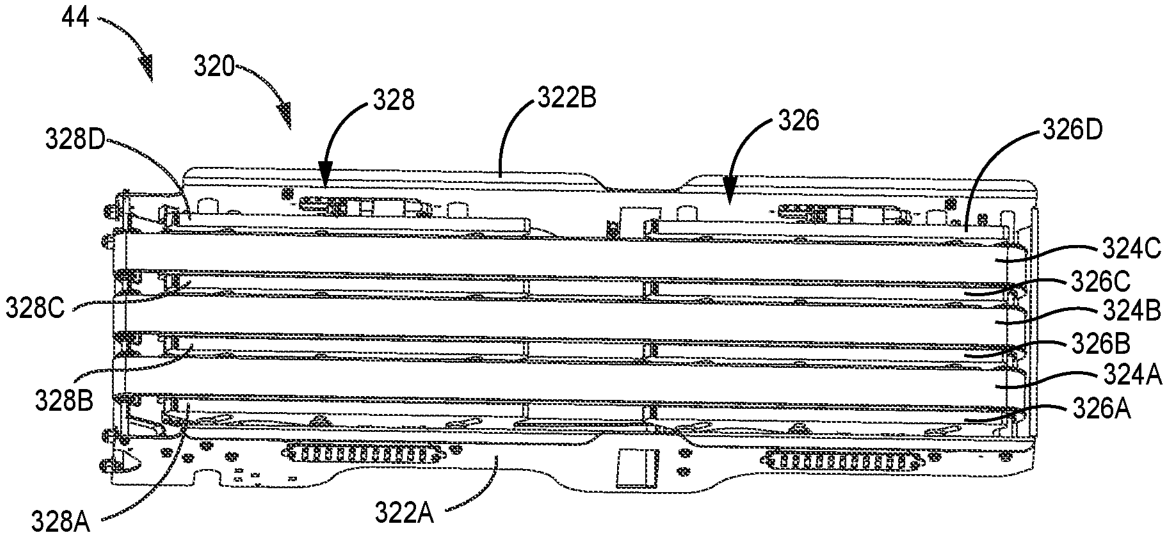
FIG. 11B is a top view of the takeaway conveyor of FIG. 11A, according to one embodiment.

Below the chute 40 is the takeaway conveyor 44, as best shown in FIGS. 9B and 11A-11I according to certain embodiments. This specific conveyor 44 has a frame 320 with two sides 322A, 322B. Within the frame 320, the conveyor 44 has three conveyor belts 324A, 324B, 324C and two sets of lifter rails 326, 328, with each set of rails 326, 328 being made up of four rails 326A-D, 328A-D, as best shown in FIG. 11B. In one embodiment, the front four rails 326A-D and the back four rails 328A-D are disposed within the frame 320 such that the three belts 324A-C are positioned between the rails 326A-D, 238A-D as shown. Alternatively, the conveyor 44 can have two belts, four belts, five belts, six belts, or any number of belts and further can have a corresponding number of rails disposed on either side of the belts. The first or front set of lifter rails 326 is disposed at the end of the conveyor 44 closest to the operator such that the set of lifter rails 326 define the box loading area (or "zone") 42. In other words, the lifter rails 326 can be used to retain the empty box in the box loading area 42 while the operator is packing products therein. Similarly, the second or rear set of lifter rails 328 is disposed at the end of conveyor 44 adjacent to the packed box conveyor 48 such that the set of lifter rails 328 define the box merge area.

Figure 11C:
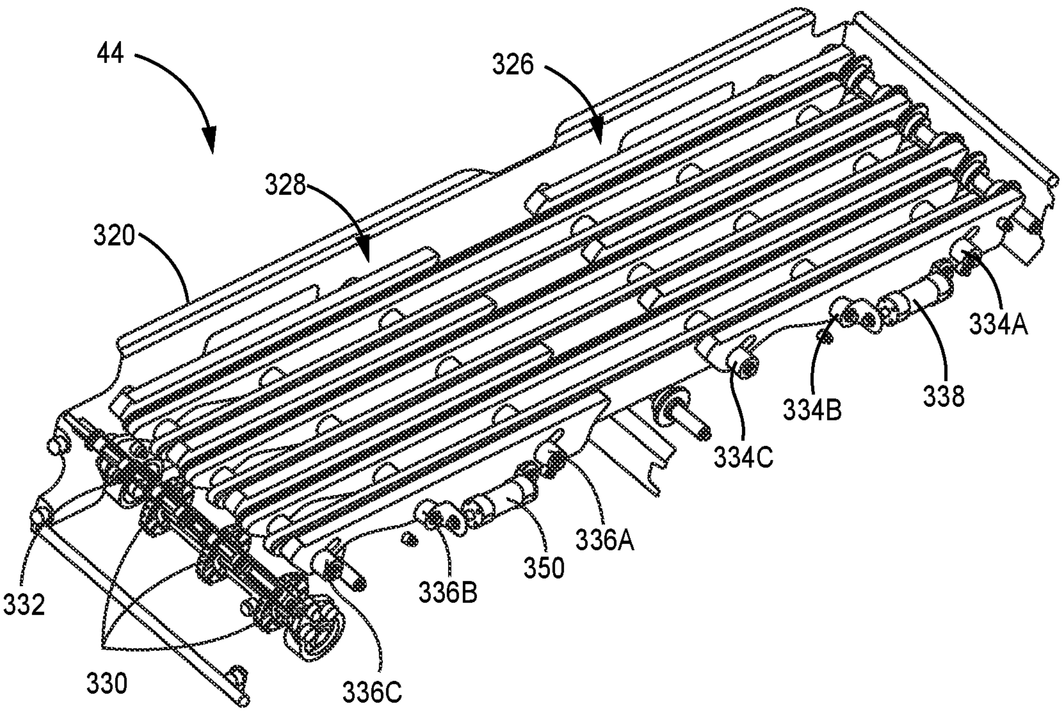
FIG. 11C is a perspective, partial cutaway view of the takeaway conveyor of FIG. 11A, according to one embodiment.

In certain embodiments, the conveyor belts 324A-C of the takeaway conveyor 44 are continuously rotating in a fashion similar to the conveyor belt 270 of the empty box conveyor 46 as discussed above. As best shown in FIGS. 11C, 11H, and 11I, the belts 324A-C can be actuated to rotate by a set of three drive sprockets 330 that are driven by a drive shaft 332 at one end of the conveyor 44 as shown. The belts 324A-C are disposed over the sprockets 330 such that rotation of the sprockets 330 cause rotation of the belts 324A-C. A motor (not shown) is coupled to the drive shaft 332 such that actuation of the motor causes the drive shaft 332, the sprockets 330, and thus the belts 324A-C to rotate.

As best shown in FIG. 11C, the first set of lifter rails 326 can be actuated to move between a lowered position (disposed below the height of the conveyor belts 324A-C) and a raised position (disposed above the height of the conveyor belts 324A-C) by an actuator 338 and a set of three rods 334A-C that are operably coupled to the rails 326A-D such that the rails 326A-D move in unison. More specifically, the rods 334A-C extend across the width of the frame 320 and through each of the rails 326A-D. The first rod 334A and the third rod 334C are attached to the frame 320 such that they are fixed in position in relation to the frame 320 while the second rod 334B can be moved between a first position and a second position by the actuator 338. In one embodiment, the actuator 338 is an air cylinder 338. Alternatively, the actuator 338 can be any hydraulic actuator or a piston actuator.

Figure 11D:
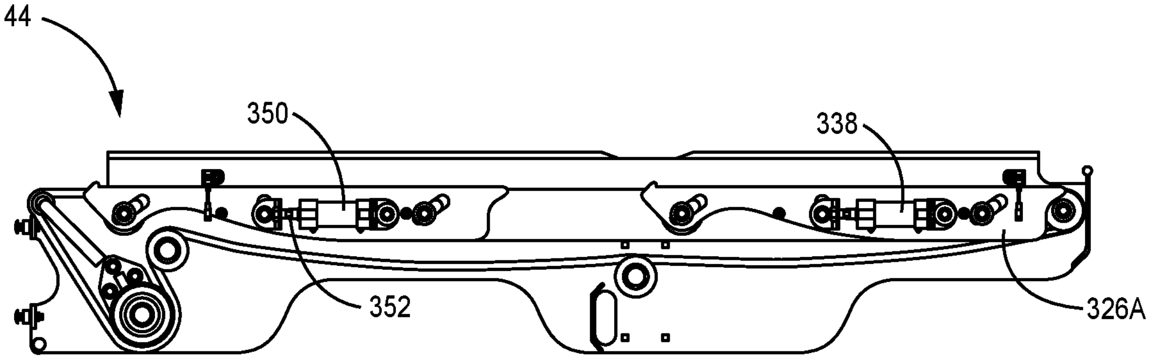
FIG. 11D is a cross-sectional, partial cutaway side view of the takeaway conveyor of FIG. 11A, according to one embodiment.
Figure 11E:
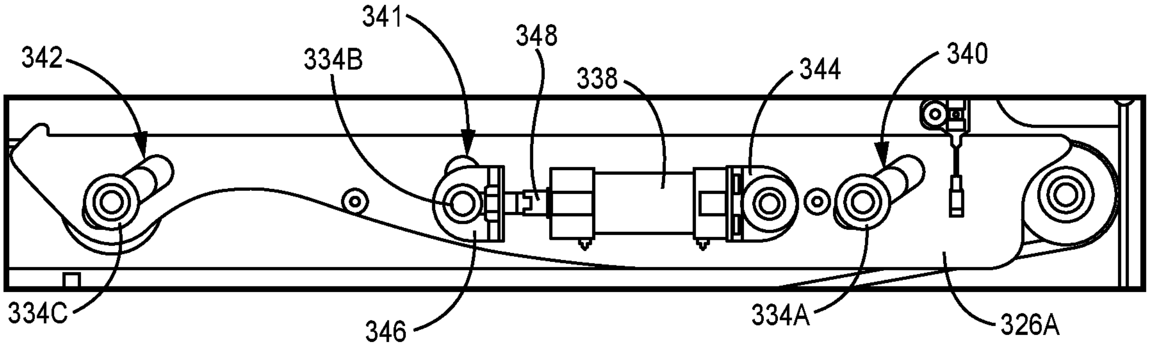
FIG. 11E is another cross-sectional, partial cutaway side view of the takeaway conveyor of FIG. 11A, according to one embodiment.

As best shown in FIGS. 11D and 11E, the first rail 326A has a first angled slot 340 in which the first rod 334A is positioned, a second vertical slot 341 in which the second rod 334B is positioned, and a third angled slot 342 in which the third rod 334C is positioned such that the first rail 326A can slide in relation to the first, second, and third rods 334A, 334B, 334C. More specifically, because the slots 340, 342 are angled, the first rail 326A will move vertically as it moves horizontally in relation to the first and third rods 334A, 334C. In addition, the air cylinder 338 is attached at one end 344 to the frame 320 and at the other end 346 (the end of the piston 348) to the second rod 334B such that the air cylinder 338 causes the second rod 334B to move horizontally. Because the second slot 341 is a vertical slot, the actuation of the second rod 334B by the air cylinder 338 causes the first rail 326A to move horizontally. As noted above, this horizontal movement of the rail 326A causes the rail 326A to also move vertically as a result of the angled slots 340, 342 moving in relation to the first and third rods 334A, 334C. Thus, actuation of the air cylinder 338 causes the first rail 326A to move between a lowered position and a raised position. Further, because the other three rails 326B-D are substantially similar to the first rail 326A, and because the rods 334A-C are coupled to the other three rails 326B-D in the same manner that they are coupled to the first rail 326A, the actuation of the air cylinder 338 will also cause the other three rails 326B-D to move in unison with the first rail 326A. Thus, actuation of the air cylinder 338 causes the full set of rails 326 to move between a lowered position and a raised position.

Figure 11F:
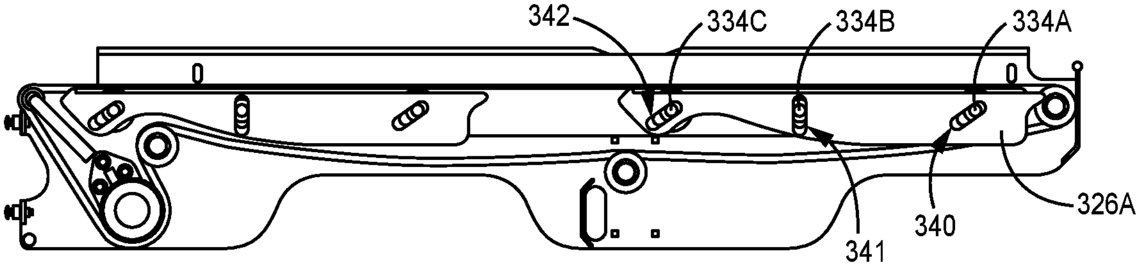
FIG. 11F is another cross-sectional, partial cutaway side view of the takeaway conveyor of FIG. 11A in the lowered position, according to one embodiment.
Figure 11G:
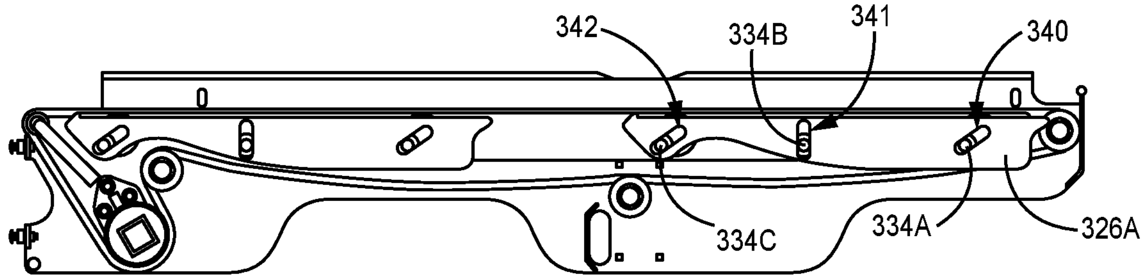
FIG. 11G is another cross-sectional, partial cutaway side view of the takeaway conveyor of FIG. 11A in the raised position, according to one embodiment.
Figure 11H:
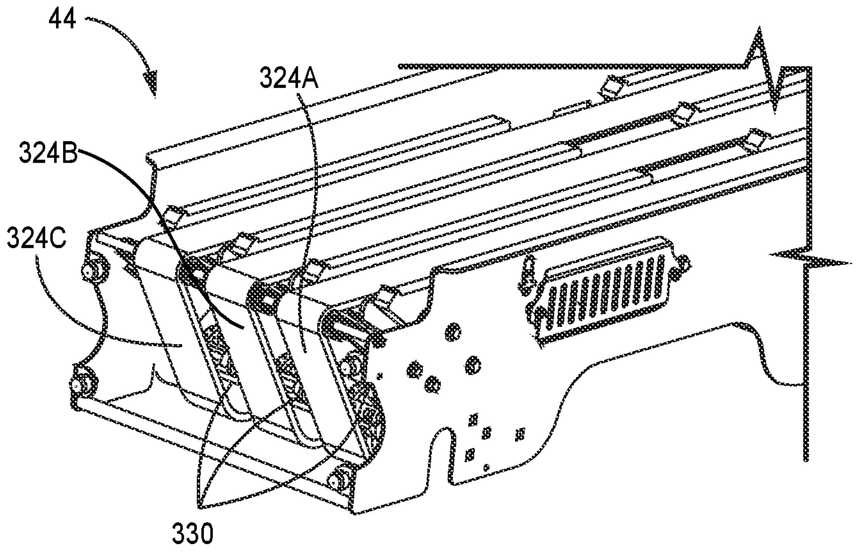
FIG. 11H is a perspective view of a back end of the takeaway conveyor of FIG. 11A, according to one embodiment.
Figure 11I:
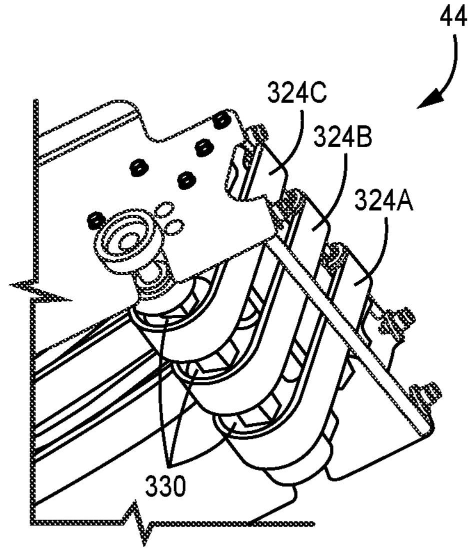
FIG. 11I is a perspective view of an underside of the back end of the takeaway conveyor of FIG. 11A, according to one embodiment.
Figure 12A:
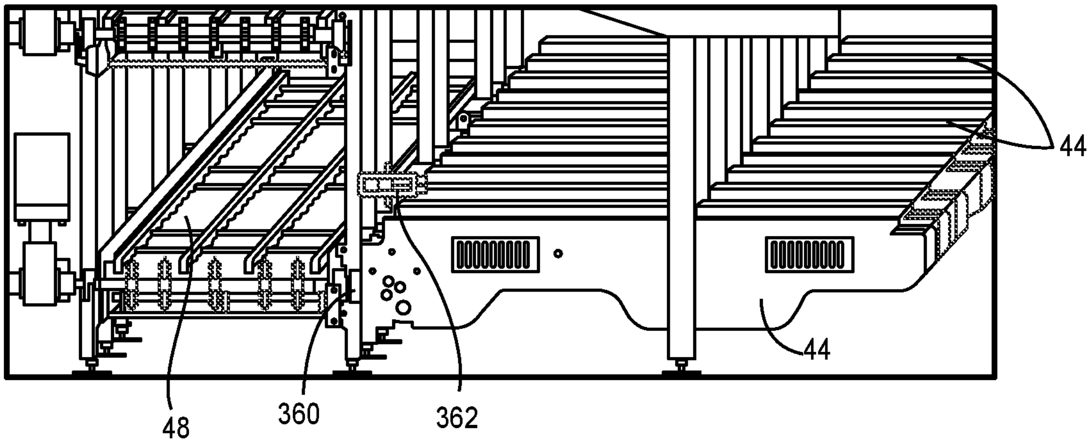
FIG. 12A is a perspective view of a packed box conveyor, according to one embodiment.
Figure 12B:
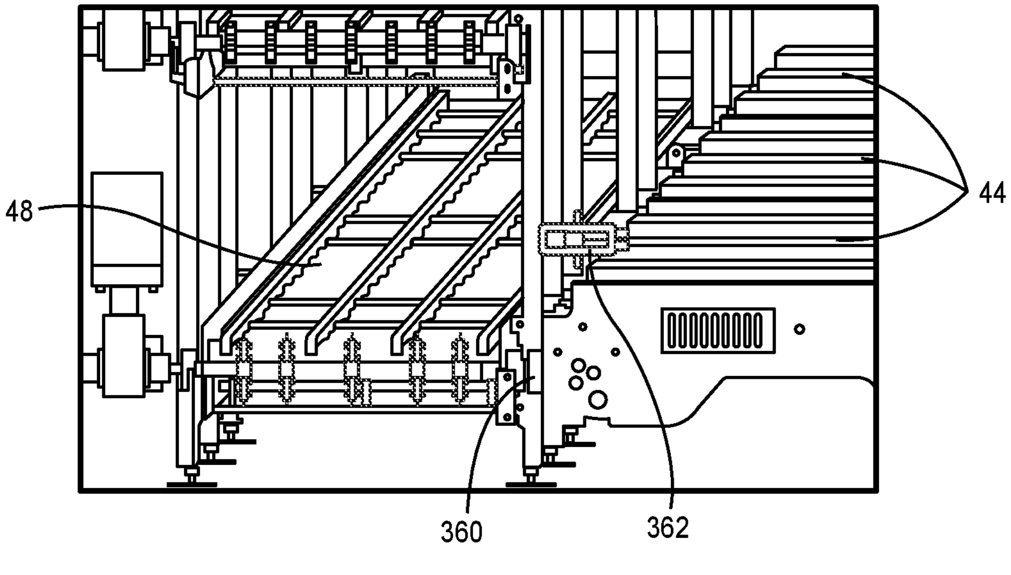
FIG. 12B is another perspective view of the packed box conveyor of FIG. 12A, according to one embodiment.
Figure 12C:
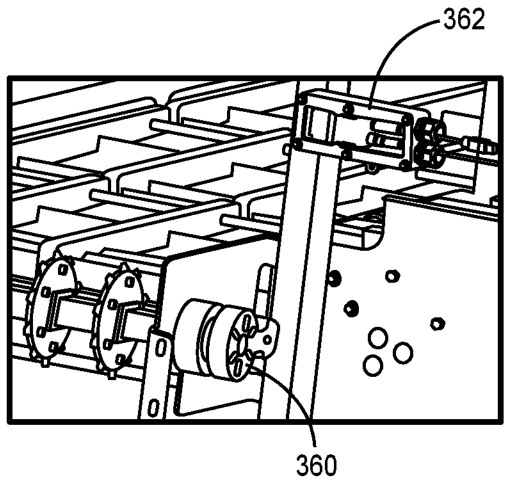
FIG. 12C is a close-up perspective view of the end of the packed box conveyor of FIG. 12A, according to one embodiment.
Figure 13:
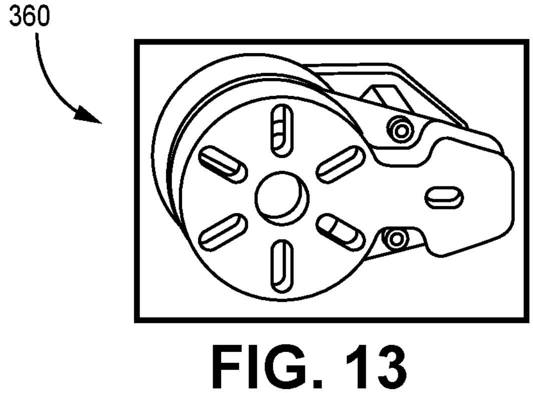
FIG. 13 is a perspective view of an encoder, according to one embodiment.
Figure 14:
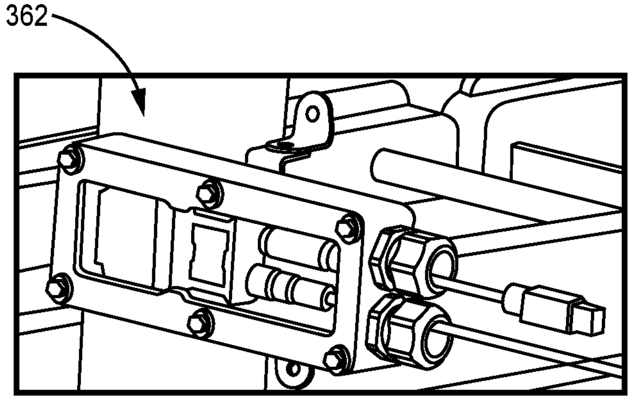
FIG. 14 is a perspective view of a QR code reader, according to one embodiment.

The movement of the first rail 326A between the lowered and raised positions is shown in additional detail in FIGS. 11F and 11G. More specifically, in FIG. 11F, the first rail 326A is in the lowered position as shown. In contrast, in FIG. 11G, the first rail 326A is in the raised position as shown. In operation, when the air cylinder 338 is actuated such that the piston 348 is urged away from the cylinder 338, the first rail 326A (and the other three rails 326B-D connected thereto) is urged in the direction opposite the direction of the piston 348 until it reaches the raised position as shown in FIG. 11G. In this position, any box positioned on the set of rails 326 is retained in position on the rails 326 as a result of the rails 326 being disposed above the rotating belts 324A-C such that the box is not in contact with the belts 324A-C. In contrast, when the air cylinder 338 is actuated to retract the piston 348 toward the cylinder 338, the rails 326A-D are urged into the lower position as shown in FIG. 11F. In this position, the box is placed into contact with the belts 324A-C such that the box is then urged along the belts 324A-C toward the packed box conveyor 48.

Similarly, the second set of lifter rails 328 can be actuated to move between a lowered position and a raised position by an actuator 350 and a set of three rods 336A-C in the fashion described above with respect to the first set of rails 326. That is, the various components, features, and functionality of the second set of rails 328, the rods 336A-C, and the actuator 350 and related components are substantially similar to the equivalent first set of rails 326, the rods 334A-C, and the actuator 338 and related components, features, and functionalities as discussed above. Thus, in operation, when the air cylinder 350 is actuated such that the piston 352 is urged away from the cylinder 350, the rails 328A-D are urged in the direction opposite the direction of the piston 352 until they reach the raised position (similar to the raised position of the first rail 326A as shown in FIG. 11G). In this position, any box positioned on the set of rails 328 is retained in position on the rails 328 as a result of the rails 328 being disposed above the rotating belts 324A-C such that the box is not in contact with the belts 324A-C. In contrast, when the air cylinder 350 is actuated to retract the piston 352 toward the cylinder 350, the rails 328A-D are urged into the lower position (similar to the lowered position of the first rail 326A as shown in FIG. 11F). In this position, the box is placed into contact with the belts 324A-C such that the box is then urged along the belts 324A-C from the takeaway conveyor 44 onto the packed box conveyor 48.

In operation, the operator can place an empty box in the box loading area 42 defined by the front lifters 326 disposed in the raised position such that the box remains in place while the operator packs products into the box. Once the box is full, the operator can release the box. For example, in one embodiment, the operator can hit the release button 306 discussed above, thereby notifying the system that the box is packed and ready for transport to the packed box conveyor 48. At this point, the computing device of the system receives the notification from the release button 306 and causes the front lifters 326 to be lowered to their lowered position such that the box makes contact with the belts 324A-C and is urged to the rear rails 328 at the back of the conveyor 44. Once the box has been urged to the back of the conveyor 44, the front rails 326 are urged back into their raised position so that the operator can place a new empty box on the front rails 326 (the box loading area 42).

Meanwhile, the box on the rear rails 328 (the box merge area) is held in place until a space is available on the packed box conveyor 48. More specifically, the computing device 54 can use an encoder, a sensor, or any other similar mechanism to determine when there is a space on the packed box conveyor 48 for the packed box. Once a space is identified, the computing device 54 actuates the rear rails 328 to move into the lowered position, thereby allowing the box to make contact with the belts 324A-C and thus causing the box to be urged into the open space on the packed box conveyor 48.

Further, in certain embodiments, the computing device 54 can also automatically hold a box in place on the front rails 326 if there is still a box on the rear rails 328. In other words, if a box is sitting in the box merge area (the rear rails 328) awaiting a space on the packed box conveyor 48 and the operator fills the box on the front rails 326 and hits the button 306 to release that box, the computing device 54 can override that box release and hold the box on the front rails 326 until the box on the rear rails 328 is finally transferred onto the packed box conveyor 48.

According to some implementations, the conveyor 44 can have sensors (not shown) disposed on the frame 320 that can be used by the computing device 54 to track the presence of a box on the conveyor 44. For example, in one specific embodiment, the sensors can identify when a box is moving along the conveyor 44 toward the packed box conveyor 48 and the computing device 54 can use that information to actuate the rear rails 328 to move into the raised position, thereby holding the box on the rear rails 328 (the box merge area). Once a gap on the packed box conveyor 48 is identified by the computing device 54, the rear rails 328 are lowered and the box moves into that space on the packed box conveyor 48.

Much like the conveyors as discussed above, the takeaway conveyor 44 can be modular, such that two or more such conveyors 44 can be coupled together as needed.

As discussed further above, once the packed boxes are transferred onto the packed box conveyor 48, they can be transferred along the conveyor 48 to a predetermined location. In certain embodiments as mentioned elsewhere herein, the boxes can be transferred to another conveyor that transports the boxes to another location within the facility. According to certain embodiments, the various systems herein can use QR codes to track the contents of a given box, along with any other information that may be useful.

This QR code process can save a lot of time and effort in comparison to the known processes used today for labeling packed boxes. That is, the known process requires the use of rolls of labels with different product names, product codes, and barcodes. The operator chooses the correct label for the box and places it on the box before urging the box onto the box takeaway conveyor. Before boxes are sealed, they are weighed on a certified scale. At that point, a label with the box weight and the product information is printed and placed on the box. There is quite a bit of labor involved in making sure each operator has the correct labels at his/her station and switching those labels out as production changes throughout the day.

In contrast, in certain embodiments herein, an intelligent QR code is applied (stamped/printed/labeled) to the box in the box forming room, prior to the packaging process. The QR code is a unique serial number that has no information other than a URL link and the serial number when it is applied to the box.

As discussed elsewhere herein, the various systems herein result in a predetermined type of product being sorted into a predetermined loading station and packed in a box. Further, this information is provided on the computer interface (such as interface 45) at the loading station 38 so that the operator is aware. Thus, each box contains the products intended to be packed therein.

As described above, after the box is packed, the operator pushes the release button (such as button 306) and the box is ultimately transferred from the takeaway conveyor 44 onto the packed box conveyor 48. In the instant embodiment, the packed box conveyor 48 can have an encoder 360 that the computing device 54 uses to track the exact position of the box on the conveyor 48, along with every other box on the conveyor 48. Alternatively, the encoder can be the encoder 242 depicted in FIGS. 7E-7H and discussed above.

In addition, the conveyor 48 can also have a QR code scanner 362 positioned adjacent to the conveyor 48 such that the scanner 362 can capture the QR code of each box as it passes by the scanner 362. This QR code scanner 362 makes it possible to capture a great deal of information about the box for future reference. That is, as the box passes the scanner 362, the computing device 54 can use the encoder 360 to identify the exact box and the loading station 38 that it came from. As a result, a great deal of information is known about the box, including (1) the loading station where the box was packed, (2) the time when the first product entered the loading station, (3) the amount of time the box was sitting at the loading station to be packed, (4) the average weight of the products, (5) images (still and/or video of the products placed in the box, and other information. The system—and more specifically, the computing device 54—then digitally applies all that information to that QR code in the cloud database, thereby linking the serial number of the box to the information in the database. And the linking of this information to the box serial number occurs while the box is still on the packed box conveyor 48.

Subsequently, according to some embodiments, once the same box reaches the box room (or other destination within the processing facility), it is placed on a scale certified for selling meat products (when the products in question are meat). At this point, the QR code of the box is scanned by another QR code scanner (not shown) and the computing device 54 accesses the information associated with the QR code/serial number and gives some of that information to the scale, such as the product SKU. In addition, any information created by the scale can also be added to the QR code, including, for example, the final net weight, other product information, etc. According to some exemplary embodiments, a photo image can be captured of the box prior to sealing and the image can be attached to the QR code as well.

Thus, the QR code assigned to each box adds product trackability that is unavailable in known systems.

Alternatively, instead adding a QR code to each box as described above, any system embodiment herein can have a labeler configured to label each box. According to one implementation, each loading station (such as station 38) can have a labeler that labels each box before the box departs the front of the takeaway conveyor 44. Alternatively, any of the various system embodiments herein can have an automatic box labeler that prints and applies labels to filled boxes at the end of the packed box conveyor 48. In yet another alternative, a labeler can be provided at any location with the system that would allow for labelling the box. According to a further alternative, an Inkjet printer can be provided at the end of the full box conveyor 48 to print a QR code or human readable information about the box.

Figure 15A:
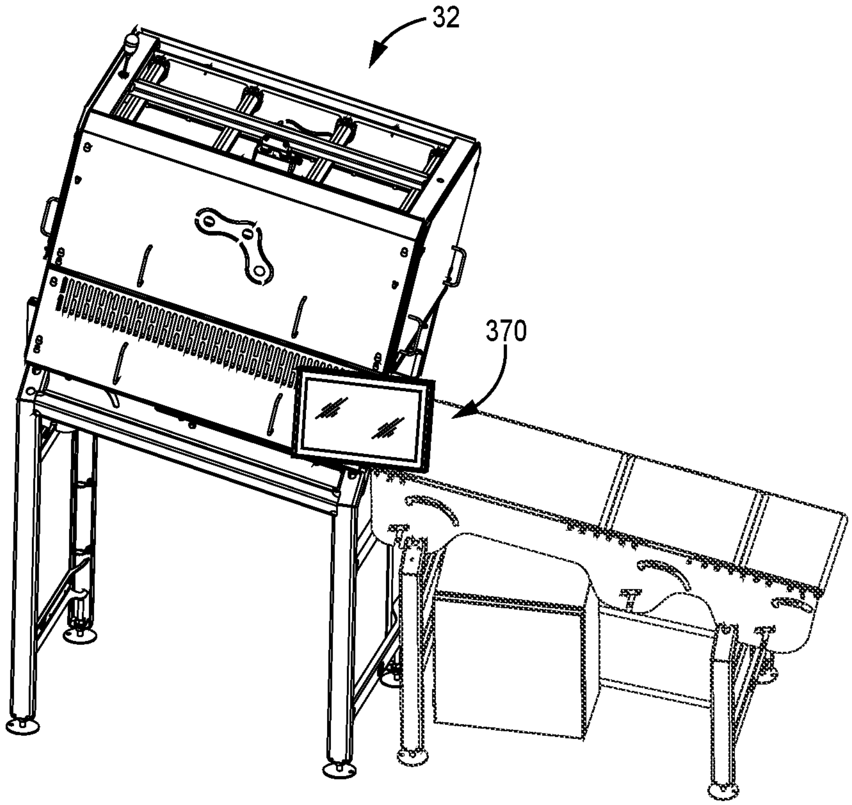
FIG. 15A is a perspective view of a computer interface attached to a component of a product processing and packing system, according to one embodiment.
Figure 15B:
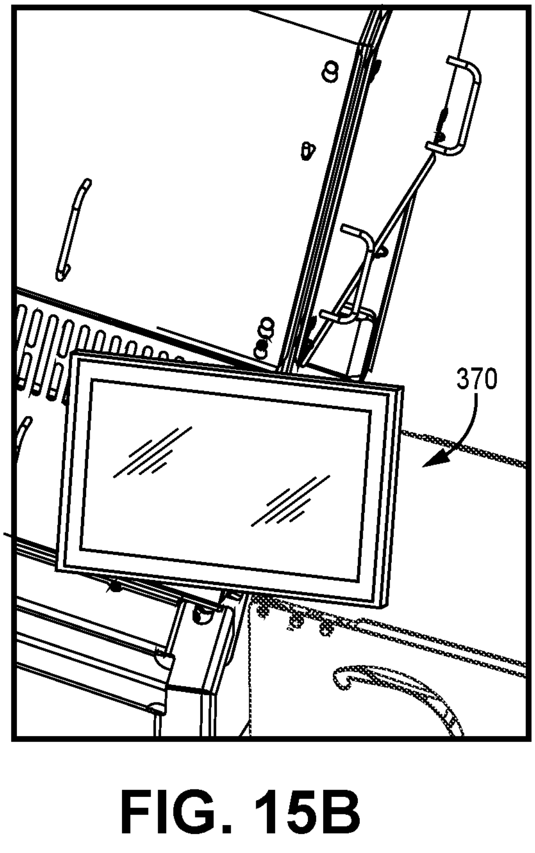
FIG. 15B is a close-up perspective view of the computer interface of FIG. 15A, according to one embodiment.
Figure 15C:
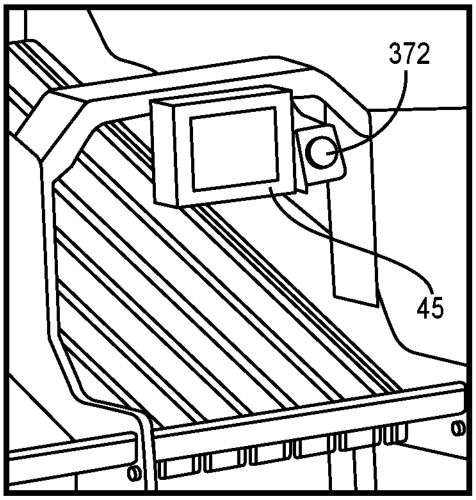
FIG. 15C is perspective view of a computer interface and release button attached to a loading station, according to one embodiment.

According to various implementations of the systems disclosed or contemplated herein, there can be two primary computer interfaces for the operator(s): a primary interface screen 370 and the computer interface screens 45 disposed on the loading stations 38. As shown in FIGS. 15A-15C, any system herein can have a primary interface screen 370 attached to any one of the various pieces of equipment. In the exemplary embodiment as shown, the primary interface screen 370 is attached to the classification system 32 as shown. According to one implementation, the screen 370 can show what the vision system is capturing within the classification system 32. Alternatively, the screen 370 can show any relevant system information.

Further, the various systems herein can also have a computer interface screen 45 on every loading station 38, as discussed in additional detail elsewhere herein.

In accordance with certain embodiments, the primary screen 370 can be the interface where the most interaction between an operator and the computing device 54 occurs. The screen 370 can display all products, product flow, product classification by the vision system, system health, chute configuration, and many other kinds of information.

With respect to the computer interfaces 45 on the loading stations 38, each interface 45 can be a touch screen and typically provides information about that specific loading station 38, including the product type, the SKu, the number of products that go into a box, maintenance information, still or video images (such as, for example, images showing the optimal way to pack a particular product). Further, according to various implementations, information can be input into the computer interfaces 45 as well. For example, the display of the interface 45 can include feedback buttons allowing the operator to provide information (including feedback) to the computing device 54. Such information can include, for example, information about an incorrect product being sorted into the loading station 38, information about a defective product being sorted into the loading station 38, etc. In certain embodiments, the interface 45 provides solely a single button or small number of buttons to allow the operator to press that one button or choose among a small number of buttons. This is because the operator may not have time to provide an explanation/input a lot of information to about the issue. Instead, the actuation of the relevant button by the operator notifies the computing device 54 associated with the various systems herein that an issue exists such that the computing device 54 can flag the timestamp associated with the issue/product so that the computing device 54 (and/or the software therein) can utilize the notification and other information to identify the issue that triggered the negative feedback from the operator.

Further, the computing device 54 in combination with any of the loading station interfaces 45 can provide for dynamic adjustment of the sorting and packing process in real-time. In one specific example to explain the point, a loading station has been assigned to ribeyes, but no ribeyes are being received at the loading station. On the other hand, a large number of tenderloins are being received by the tenderloin loading station such that the tenderloin chute fills up. In this scenario, the computing device can detect that the tenderloin chute has filled up (typically via sensors in the chute) and modify the sorting process in real-time such that the loading station previously assigned to ribeyes is now assigned to tenderloins to accommodate the surge in tenderloins.

According to various embodiments, the product chute assignment for a particular loading station 38 can be determined and modified for a wide variety of reasons. For example, one factor can be ergonomics: keeping high flow products together helps to reduce the distance that the operator is required to travel between common products. The computing device 54 can automatically see the flow and then take steps to minimize the number of steps the operator must take to fill boxes through chute assignments.

According to certain embodiments, each loading station 38 can also have a release button 372 (similar to release button 306 as discussed above) as shown in FIG. 15C. In this particular embodiment, the button 372 can be illuminated or otherwise displayed in different indicator colors that can provide information to the operator. For example, in one specific implementation, the button 372 can display one of three different colors to indicate the status of the loading station 38: green when the chute 40 is empty (no products have been received), yellow when the chute 40 is somewhat full, and red when the chute 40 is full/overfilled. This notification provides information to the operator about how to prioritize the operator's attention to the various loading stations 38. Because the computing device 54 can utilize the classification information and the location of the products to anticipate what will be sorted into a particular loading station 38, the device 54 can anticipate the impending status of that loading station 38 and provide notification via the button 372 (or, alternatively, via the interface 45) to the operator. Alternatively, any colors can be displayed and can be intended to provide notification to the operator about any number of different matters relating to the products and/or the system. Further, in some alternative embodiments, each loading station 38 can have additional interfaces and/or buttons to convey more information to and/or receive more information from the operator.

Figure 16A:
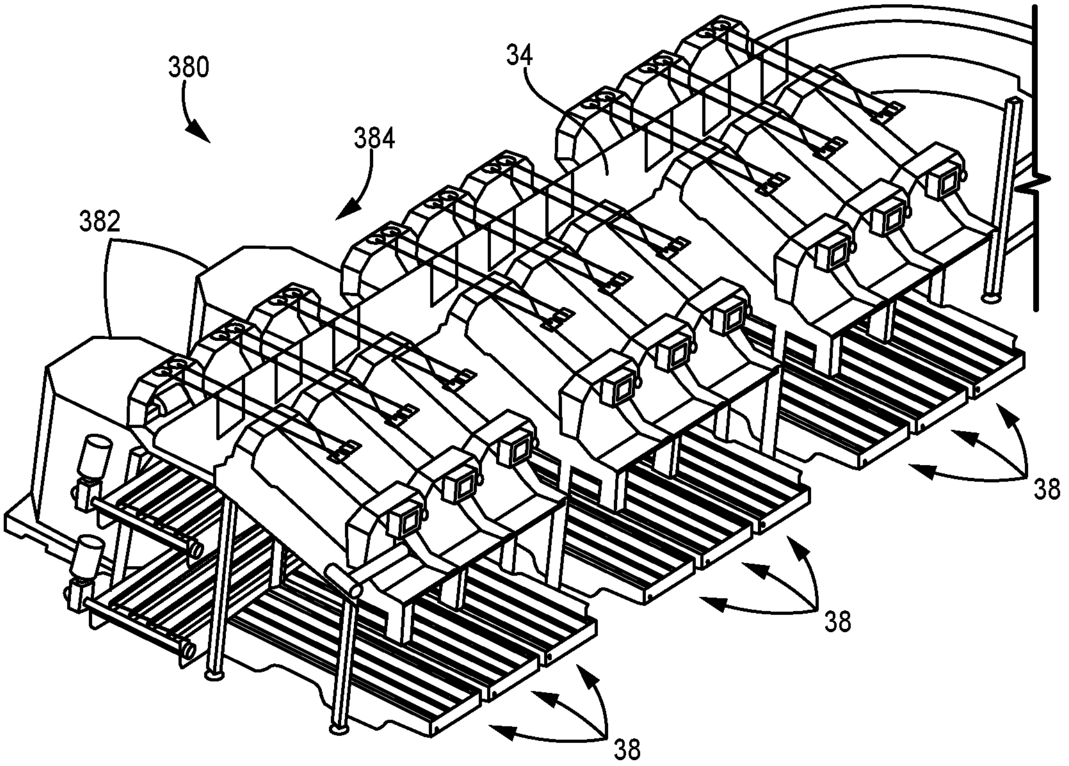
FIG. 16A is a perspective view of another product processing and packing equipment system, according to another embodiment.
Figure 16B:
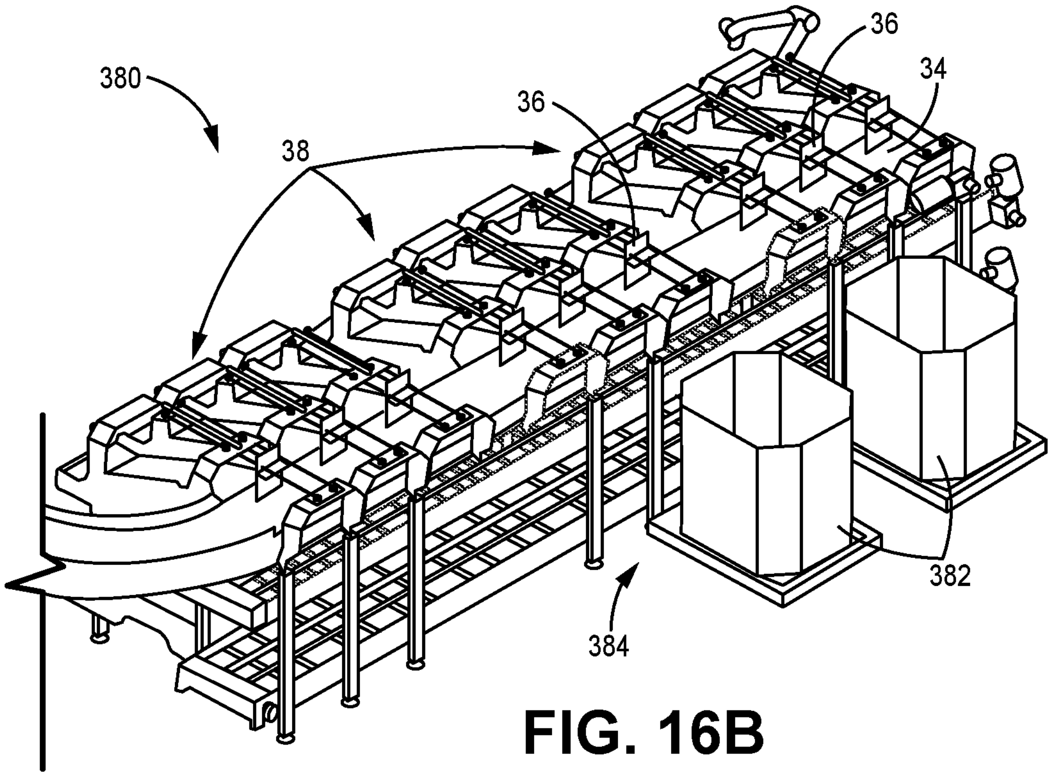
FIG. 16B is another perspective view of the product processing and packing equipment system of FIG. 16A, according to one embodiment.
Figure 16C:
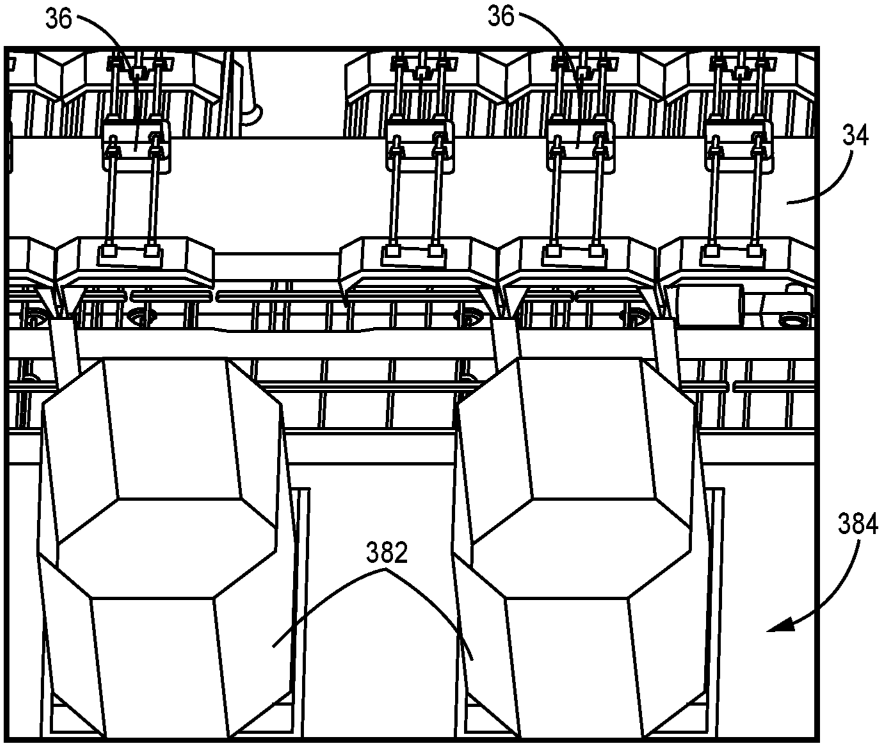
FIG. 16C is another perspective view of a portion of the product processing and packing equipment system of FIG. 16A, according to one embodiment.
Figure 17:
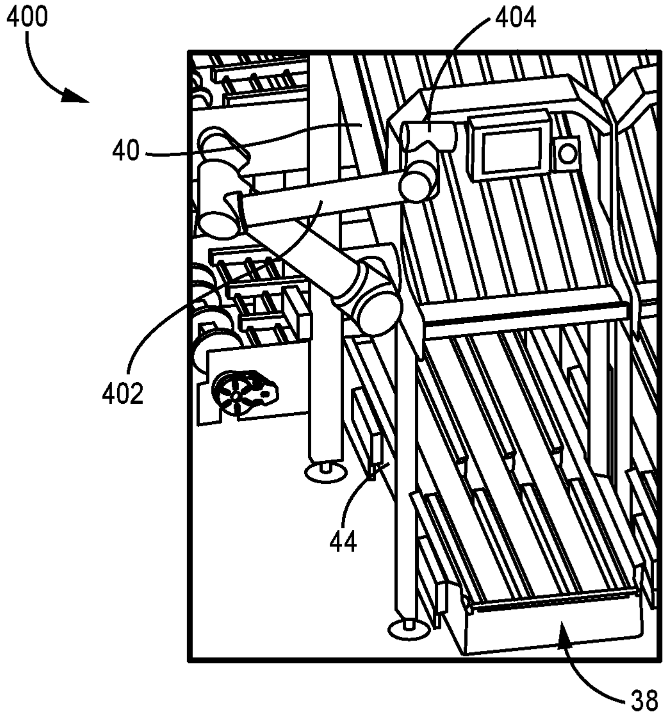
FIG. 17 is a perspective view of a robotic arm disposed adjacent to a loading station, according to one embodiment.

Another system embodiment 380 with a different configuration is depicted in FIGS. 16A-17. In this implementation, the system 380 can have a combination of loading stations 38 as discussed in detail elsewhere herein on one side of the sort conveyor 34 and a space 384 on the other side of the conveyor 34 for placement of one or more bulk product containers 382 as shown. The containers 382 can be large boxes 382 that are transported on pallets and can receive products that are sorted into the containers 382 in bulk without arrangement of the products within the containers 382 by an operator.

In the exemplary embodiment as shown, the conveyor 34 only has loading stations 38 disposed on one side such that the other side has a space or area 384 into which any type of container (such as the bulk containers 382 as shown) can be placed. The pushers 36 in this implementation are disposed in their typical position on the conveyor 34 such that they can sort products into the loading stations 38 on the one side and further can also sort products into the bulk containers 382 or any other type of containers that can be placed in the receiving space 384 as shown.

According to some alternative implementations, chutes (not shown) similar to any of the chute 40 embodiments herein can be positioned on the side of the conveyor 34 opposite the loading stations 38 to receive and direct any products sorted toward the receiving space 384.

In use, according to one embodiment, the computing device 54 of the system 380 can track the number of products sorted into one of the bulk containers 382 such that the system 380 stops sorting products into that container 382 when the total number of products sorted into the container 382 reach a predetermined maximum number. Alternatively, the system 380 can sort products into one or more bulk containers 382 based on any set of parameters.

In accordance with certain embodiments, any of the various systems disclosed or contemplated herein can also incorporate one or more robotic mechanisms for use in automating any of the various steps in the process. For example, in FIG. 17 the system 400 has a robotic arm 402 attached to one or more of the loading stations 38 as shown. The arm 402 can be operated by the computing device 54 to load products from the chute 40 into the box (not shown) disposed on the takeaway conveyor 44. In such implementations, the bottom of the chute 40—such as the landing pad 312 embodiment as discussed above, for example—can be configured to assist the end effector (such as a gripper or vacuum, for example) 404 with successfully grasping the product for placement in the box.

Alternatively, or in addition, the robotic arm 402 can also be operated by the computing device 54 to acquire an empty box and place the box on the takeaway conveyor 44 so that products can be packed therein. For example, in one embodiment in which the system 400 has an empty box conveyor (similar to any empty box conveyor 46 disclosed or contemplated herein), when the previous box has been packed and transported toward the packed box conveyor 48, the sensors in the takeaway conveyor 44 can notify the computing device 54 that the conveyor 44 needs a new empty box. At this point, the computing device 54 can also actuate the empty box conveyor 46 to raise the lifter rails into the raised position and halt the movement of the boxes and then actuate the robotic arm 402 to grasp the box from the empty box conveyor 46 and place it on the takeaway conveyor 44. The robotic arm 402 would then be actuated to load products into the box while the computing device 54 tracks the number of products that have been packed and releases the box to move along the takeaway conveyor 44 when the appropriate number had been reached.

In accordance with certain embodiments, the robotic arm 402 (or any other robotic mechanism incorporated into the system 400) can be configured to work with one or more operators. For example, the computing device 54 can operate the arm 402 to pack every product into the box except for the last product such that the operator can pack the last product (which may require additional effort and/or human decision-making to ensure the product fits).

In a further embodiment, instead of using a robotic arm, the end of the chute 40 can be automated to allow for it to be actuated by the computing device 54 to urge the product into the box below. For example, in one embodiment, the landing pad 312 as discussed above could be configured to be automated such that the pad 312 can have a mechanism that urges the products into the box.

In yet another implementation, the system 400 could include the sorting of products from the sort conveyor 34 to another conveyor belt positioned in close proximity with the system 400. For example, the products could be sorted to this additional conveyor belt (not shown), transported to a different area, and then sorted at that point into a container. In one specific embodiment, it could be sorted into a bulk container similar to the containers 382 discussed above. This configuration (with the additional conveyor) would make it possible to position bulk containers in different locations throughout the facility or in a place more accessible to a forklift that could be required to move the full bulk container. Alternatively, instead of placing the products into a bulk container, the additional conveyor could transport the products to another location to be acted on in some other way, such as additional sorting, repair/reworking of the product, boxing of the products, etc.

Figure 18A:
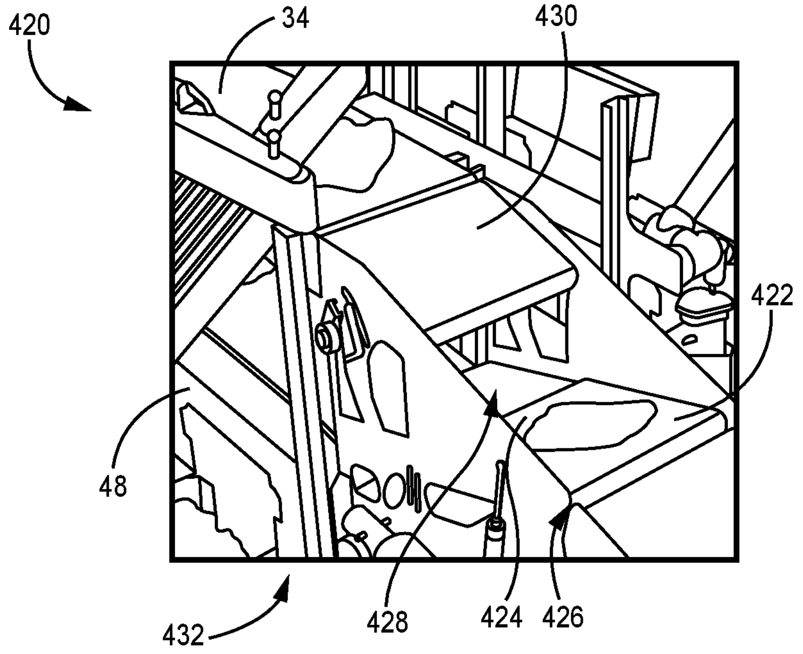
FIG. 18A is a perspective view of another product processing and packing equipment system with a rotatable selection conveyor section, according to another embodiment.
Figure 18B:
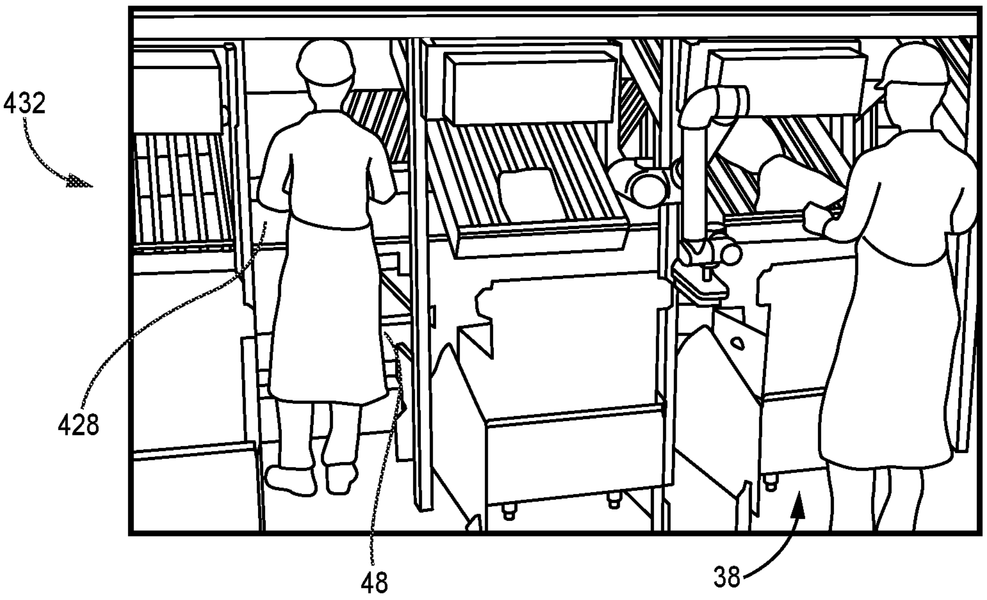
FIG. 18B is another perspective view of the product processing and packing equipment system of FIG. 18A, according to one embodiment.

Other features and mechanism can also be incorporated into any of the various systems disclosed or contemplated herein. For example, in one embodiment as shown in FIGS. 18A and 18B, a system 420 has an adjustable conveyor 422 that can be incorporated into the system 420 upstream of two different sort conveyors 34, 428 such that the system 420 provides for two different sorting options for each product: automated or manual. As a result, this adjustable conveyor 422 makes it possible for the system 420 to have two different types of sorting conveyors in the same system: an automated sorting conveyor 34 (substantially similar to the various sort conveyor embodiments 34 disclosed or contemplated herein) and a manual sorting conveyor 428. In such system 420 embodiments, the computing device 54 can implement a selection process prior to the product sorting in which each product is first classified in a classification system (such as system 32 as discussed elsewhere herein or any other classifier or classification device or system) and, based on the classification, the computing device 54 designates the product as appropriate for either automated sorting (via automated sorting conveyor 34) or manual sorting (via manual sorting conveyor 428). The computing device 54 then actuates the adjustable conveyor 422 to move into the appropriate position to direct the product to the correct conveyor.

As shown in FIGS. 18A and 18B, in certain embodiments, the manual sorting conveyor 428 is disposed below the automated sort conveyor 34 such that the conveyors 34, 428 form a stacked conveyor structure 432 similar to the stacked conveyor structures 33 discussed above in various implementations. In this embodiment, the stacked structure 432 includes a top-level automated sorting conveyor 34 configured to automatically sort the products into one of the loading stations (such as loading stations 38 discussed above or any other type of loading station), and a middle-level manual sorting conveyor 428 configured to move other products to manual pack stations. In certain embodiments, including the implementation as shown, the stacked structure 432 can also have a packed box conveyor 48 similar to conveyors 48 discussed in detail above that is disposed under the manual sorting conveyor 428. In other alternatives, a defective product conveyor similar to conveyor 50 discussed in detail above (or any other conveyor configuration) can also be incorporated into the stacked structure 432. As noted above, stacking the conveyors in this manner (i.e., in the Z-direction) into a stacked structure like structure 432 enables use of the overall system in a smaller space such that operators can access the manual sorting conveyor 428 as best shown in FIG. 18B and thereby provide the manual sorting of the products thereon, while other operators oversee the loading stations 38 receiving products from the automated sort conveyor 34.

In accordance with one exemplary embodiment, the adjustable conveyor 422 is configured to move between two different positions: an upper conveyor position (not shown) and lower conveyor position as shown in FIG. 18A. In the upper conveyor position, the adjustable conveyor 422 directs the product toward the automated sort conveyor 34, while in the lower conveyor position, the adjustable conveyor 422 directs the product toward the manual sort conveyor 34. More specifically, the adjustable conveyor 422 can be a single section 422 of a longer conveyor leading up to the sort conveyors 34, 428 in which the conveyor bed 424 can rotate around a joint 426. In the lower conveyor position as shown, the conveyor section 422 rotates downward such that the end of section 422 away from the joint 426 is positioned lower than the end of the section 422 at the joint 426. In this embodiment, that lower end of the section 422 is then positioned adjacent to and at the same level with a manual sorting conveyor 428 as shown such that any product moving along the adjustable conveyor 422 would be directed onto the manual sorting conveyor 428. In contrast, in the upper conveyor position (not shown), the conveyor section 422 is positioned such that the end of the section 422 away from the joint 426 is positioned higher than the end of the section 422 at the joint 426. In this position, that higher end of the section 422 is thus positioned adjacent to and at the same level with a section 430 of the automated sorting conveyor 34 such that any product moving along the adjustable conveyor 422 would be directed onto the automated sorting conveyor 34.

In some embodiments, the system 420 has one or more actuators operably coupled to the adjustable conveyor section 422 to urge the conveyor 422 between the upper and lower positions. Further, the system 420 can have photoelectric sensors configured to detect a meat product or a belt encoder configured to measure the belt speed, to name but a few examples. According to certain embodiments, the computing device 54 can actuate the adjustable conveyor 422 to move into the desired position based on the product classification or sensor data from sensors.

In use, the adjustable conveyor 422 can be used in the following fashion. The computing device 54 of the system 420 can use information about a specific product on the conveyor to determine whether it should be sorted by automated sorting or manual sorting and then actuate the adjustable conveyor 422 to transport the product to the correct conveyor. More specifically, the classification system (such as system 32) can gather information about the particular product and thereby classify the product. Given that some products may be automatically sorted, while others require or are best handled with manual sorting (e.g., using a person in the process), the classification system can determine whether the specific product should be sorted automatically or manually.

If the computing device 54 determines that automatic sorting is appropriate, the adjustable conveyor 422 will be actuated to move into the upper position such that the product is directed to the automated sort conveyor 34. The computing device 54 may classify the product as appropriate for automated sorting based on a number of different factors including, for example, as a function of a confidence value of the product classification. For example, if the confidence value is greater than a threshold, the computing device 54 may direct the product to the automated sort conveyor 34.

On the other hand, if the computing device 54 determines that manual sorting is appropriate, the adjustable conveyor 422 will be actuated to move into the lower position such that the product is directed to the manual sort conveyor 428. The computing device 54 may classify the product as appropriate for manual sorting based on a number of different factors, including, for example, as a function of a confidence value of the product classification, as mentioned above. For example, if the confidence value is less than a threshold, the computing device 54 may direct the product to the manual sorting conveyor 428. A low confidence value may be indicative of an unrecognized product that needs manual assistance for packing, or even for discarding. The product may also be directed to the manual sorting conveyor 428 in response to a number of other requirements, such as in response to determining a given product is an overflow product from another line, there is no available space in the top-level conveyor, there is no available space in a chute of a pack station, multiple products are clumped together, and/or a system malfunction, to name but a few examples.

As noted above, various system embodiments disclosed or contemplated herein can use any number of different pushers or other mechanisms for sorting the products from the sort conveyor 34 into the loading stations 38 or other product receiving mechanisms or equipment. For example, in one specific implementation as shown in FIGS. 19-20G, the sorting mechanism can be one or more diverting arms 440 disposed on the sort conveyor 34 such that each arm 440 can be positioned across the conveyor 34 to divert a product toward the desired side of the conveyor 34.

One embodiment of the diverter arm 440 includes a frame 442 with a motor 444 at one end and rollers 446 at the opposite end of the frame 442 as shown with a conveyor belt 448 rotatably disposed around the frame 442. In one embodiment, the motor 444 is a drum-style motor 444 that is configured to rotate and thereby drive the rotation of the conveyor belt 448. Alternatively, any known motor for use with such a conveyor belt can be used.

Figure 19:
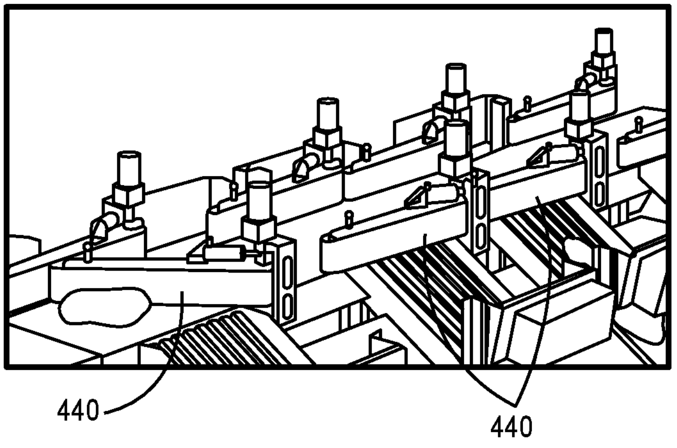
FIG. 19 is a perspective view of a set of diverter arms on a sorting conveyor, according to one embodiment.
Figure 20A:
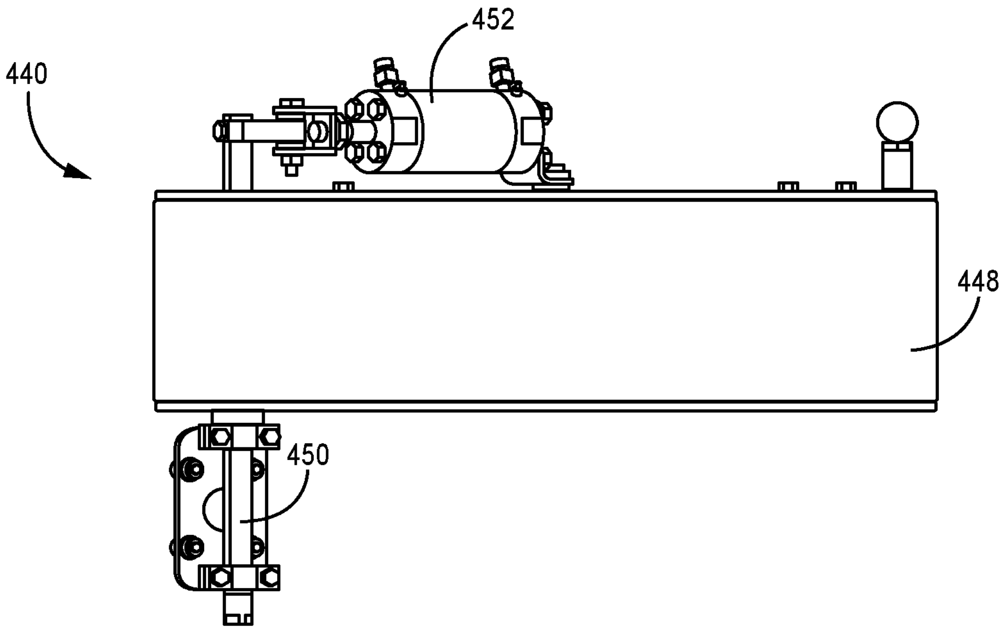
FIG. 20A is a perspective view of a diverter arm, according to one embodiment.
Figure 20B:
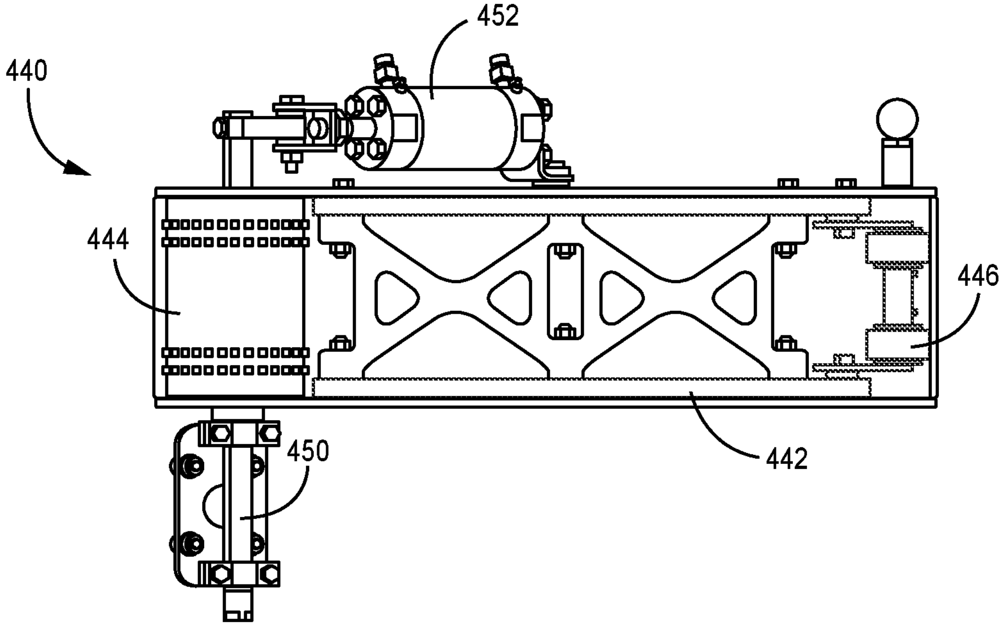
FIG. 20B is a cutaway side view of the diverter arm of FIG. 20A, according to one embodiment.
Figure 20C:
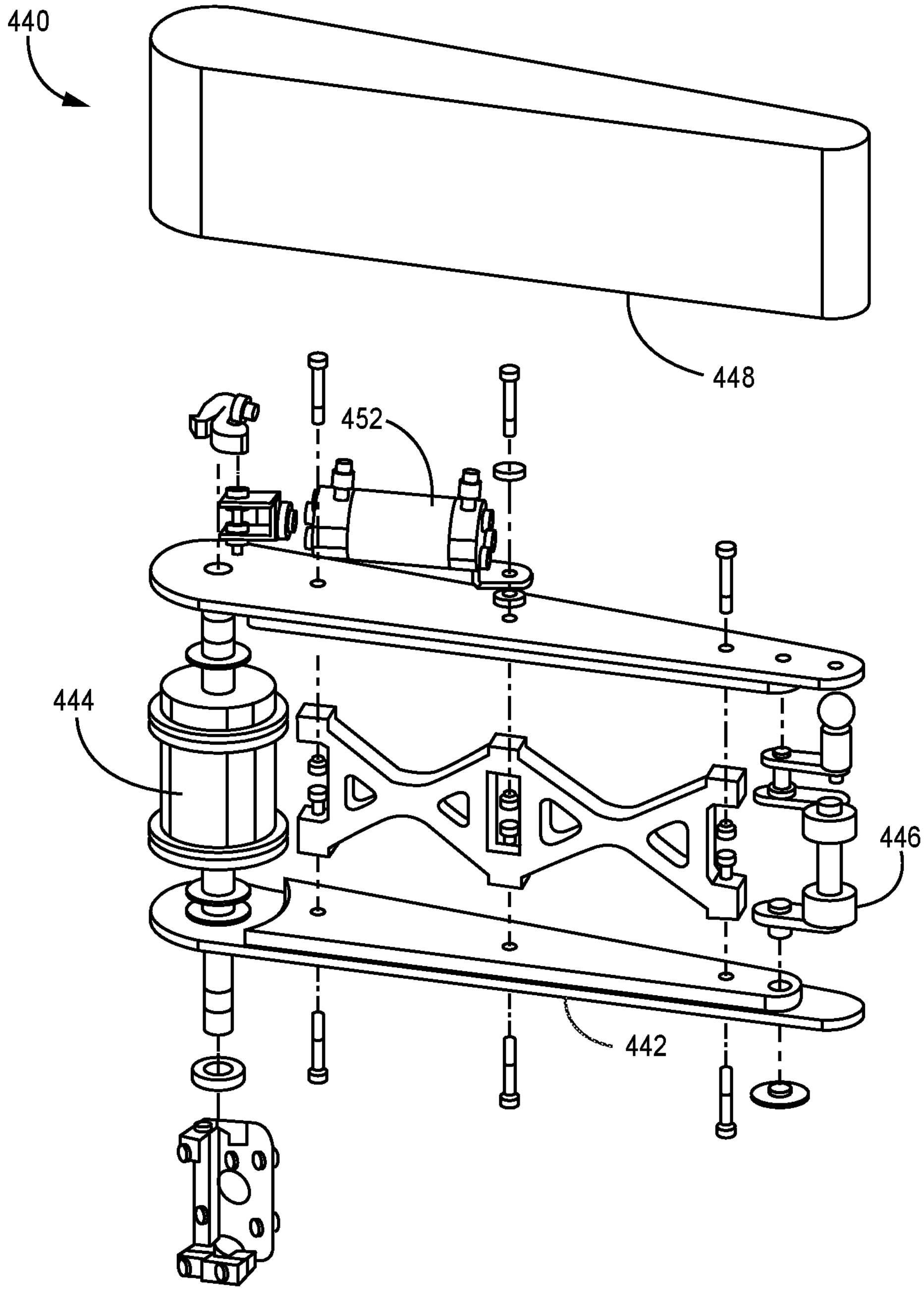
FIG. 20C is an exploded perspective view of the diverter arm of FIG. 20A, according to one embodiment.
Figure 20D:
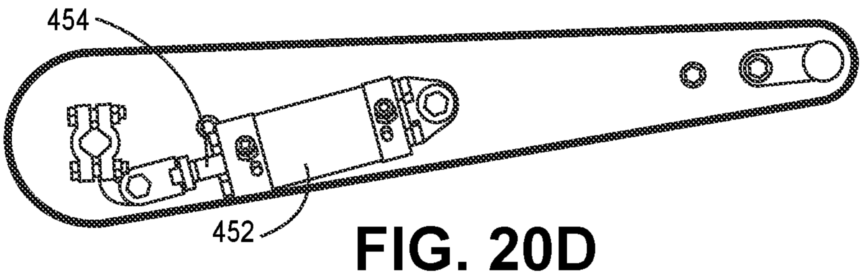
FIG. 20D is a top view of the diverter arm of FIG. 20A, according to one embodiment.
Figure 20E:
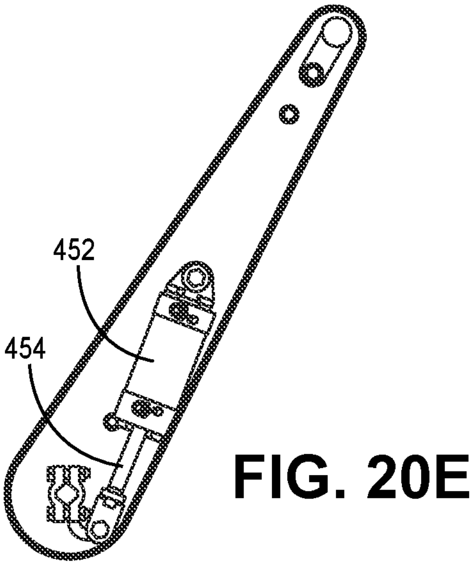
FIG. 20E is another top view the diverter arm of FIG. 20A, according to one embodiment.

In addition, the arm 440 is rotatably disposed on a shaft 450 such that the arm 440 can rotate between a retracted position and a deployed position (positioned across the conveyor belt), as shown for example in FIG. 19. For actuation of that rotation, the arm 440 has an actuator 452 that can rotate the arm 440 in relation to the shaft 450. In one embodiment the actuator 452 is an air cylinder 452. Alternatively, the actuator 452 can be any hydraulic actuator, piston actuator, or the like. The piston 454 of the air cylinder 452 is attached to the shaft 450 and the air cylinder 452 is attached to the arm 440 such that actuation of the piston 454 to extend away from the air cylinder 452 will cause the arm 440 to move into its deployed position as best shown in FIG. 20E. In contrast, actuation of the piston 454 to retract toward the air cylinder 452 will cause the arm 440 to move into its retracted position as best shown in FIG. 20D.

Figure 20F:
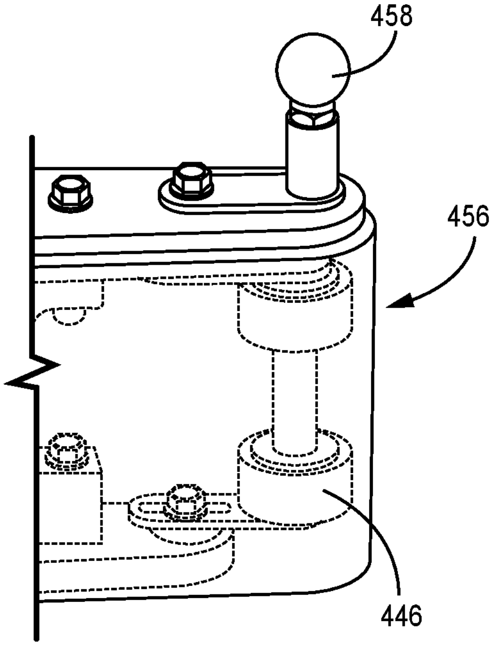
FIG. 20F is a cutaway perspective view of a portion of the diverter arm of FIG. 20A, according to one embodiment.
Figure 20G:
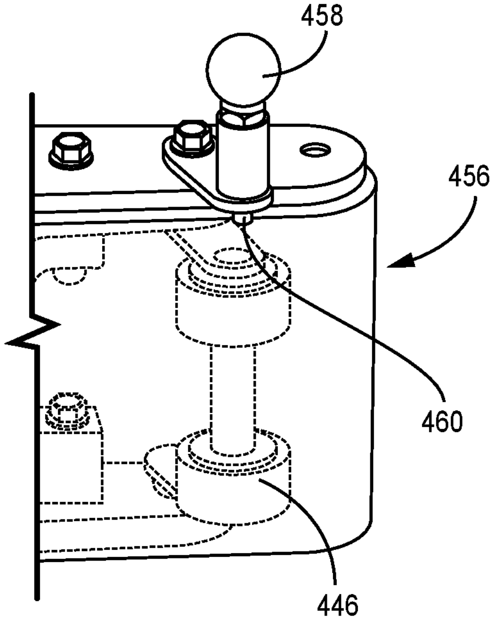
FIG. 20G is another cutaway perspective view of a portion of the diverter arm of FIG. 20A, according to one embodiment.
Figure 21:
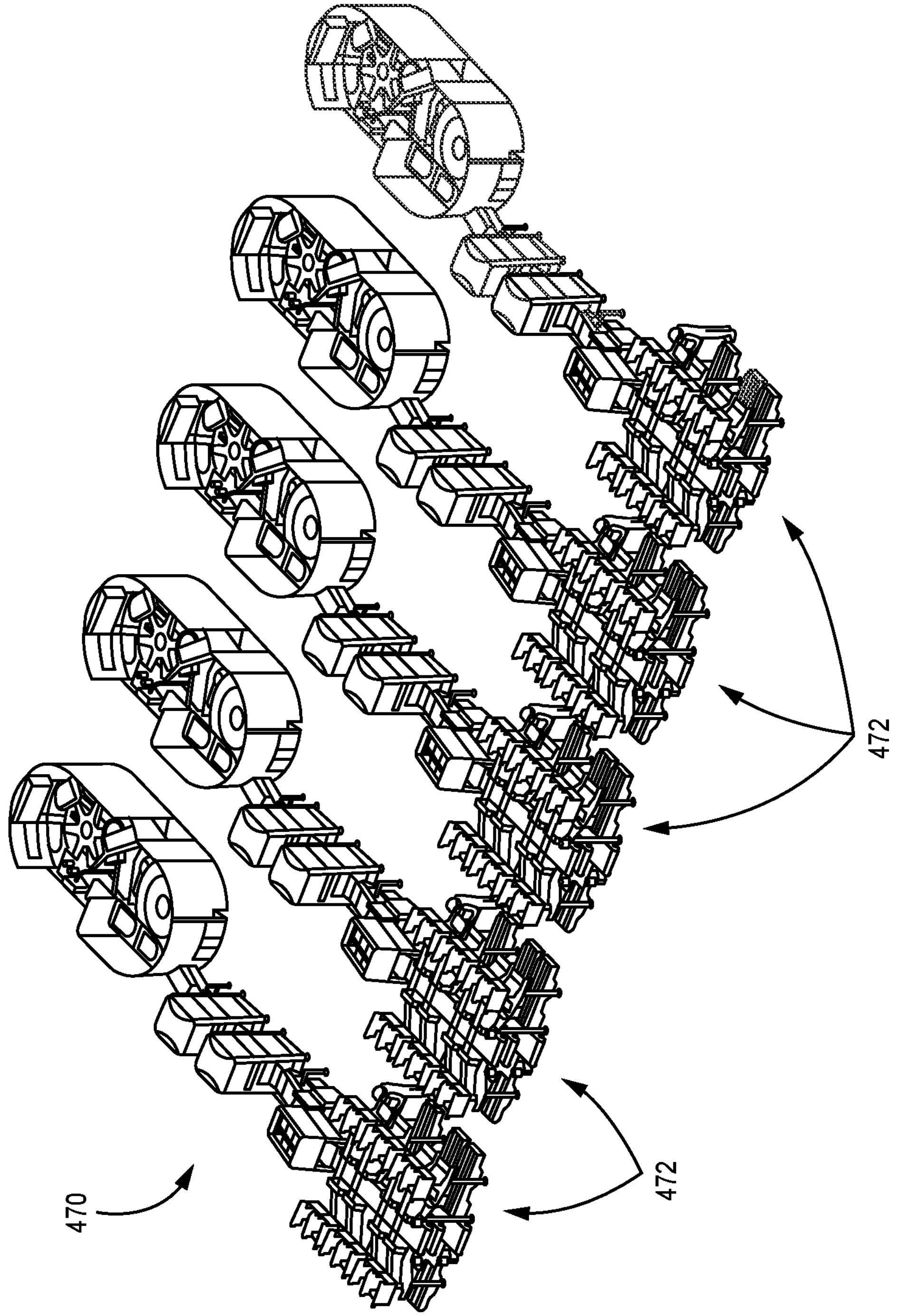
FIG. 21 is a perspective view of five processing and packing systems disposed in the same space, according to one embodiment.

In one optional embodiment, the arm 440 has a de-tensioning mechanism 456 that can move the rollers 446 between a tensioned position (as shown in FIG. 20F) and a de-tensioned position (as shown in FIG. 20G). The mechanism 456 includes a release knob 458 that can be pulled upward to release the rollers 446 from their tensioned position. More specifically, the knob 458 is coupled to a peg 460 that can be positioned in an opening 462 in the frame 442. Urging the knob 458 upward also urges the peg 460 upward such that it exits the opening 462, thereby releasing the peg 460 therefrom. The knob 458 is coupled to an arm 464 that is rotatably constrained to the rollers 446 such that rotation of the arm 464 causes rotation of the rollers 446. Thus, the knob 458 can be lifted and the arm 464 can be rotated 464 to cause the rollers 446 to move to the de-tensioned position. In contrast, the arm 464 can be rotated back toward the opening 462 and the peg 460 re-inserted into the opening 462 to lock the rollers 446 back in the tensioned position.

In operation, the rollers 446 can be moved into the de-tensioned position in order to perform various tasks, including, for example, removing the belt 448, cleaning the arm 440, performing some maintenance or repair, etc.

In use, the diverter arm 440 can be moved into the deployed position such that the arm 440 is disposed across the conveyor 34 as best shown in FIG. 19. At the same time, the belt 448 is rotating at a speed such that when a product makes contact with the arm 440 and specifically the belt, the belt 448 urges the product along the side of the arm 440 and directs it toward the side of the conveyor. According to certain embodiments, the conveyor belt 448 on the arm 440 ensures a smooth and repeatable transition of the products off the side of the sort conveyor (such as conveyor 34) into a predetermined loading station (such as a loading station 38 as described above) or any other receiving equipment or area (such as a bulk container as described above, for example). With the diverter arm 440 having a powered belt 448, friction is not relied upon to redirect the product, thereby removing the effect of the product's size, weight and orientation on the sort conveyor 34, which increases reliability and throughput performance. In addition, in some exemplary aspects, while the product is being urged toward the side of the conveyor 34, the arm 440 is urged toward its retracted position on the same side of the conveyor 34, thereby further urging the product off the conveyor 34 on that side.

In certain embodiments, the diverter arm 440 and any other such arm can be used for products when the shape of the products are unknown or fairly variable. Further, the arm 440 can be used when the products being sorted are groups of loose products that are not separated as may be the case with other products as described elsewhere herein.

According to certain implementations, two or more of the various system 10, 100, 380, 400, 420 embodiments herein can be operated in the same facility or location. One such exemplary operating space 470 includes five processing and packing systems 472 disposed adjacent to each other as shown, wherein each of the systems can be any of the system 10, 100, 380, 400, 420 embodiments disclosed or contemplated herein. In such embodiments, the operation of two or more such systems 472 in the same location increases the processing and packing capacity of that location. Depending on the configuration of the space and the two or more systems (10, 100, 380, 400, 420, etc.) operating therein, one or more common conveyors (not shown) can extend across and link to each of the two or more systems to transport products toward or away from the systems and/or to transport packed boxes of products away from the systems.

As mentioned above, any of the various processing and packing system 10, 100, 380, 400, 420, embodiments herein can be used to process and pack a variety of different products. In certain specific implementations, any of the systems herein can process and pack meat products. Further, the various systems can be used to process/pack a wide variety of meat products, which can be sourced from beef, swine, poultry (e.g., turkey, chicken), deer, fish, etc. In operation according to certain exemplary embodiments, the various systems disclosed or contemplated herein can process and pack meat products in the following fashion. It should be noted that the meat products discussed in detail below are beef products, but any meat products as listed above can be processed/packed in the same fashion using any of the various system embodiments disclosed or contemplated herein.

In accordance with certain aspects, the classification system (such as system 32) can classify the meat products based on a variety of properties, including, for example, product classification/meat cut type (i.e., shank brisket, rib, short plate, flank, etc.), size/volume information (weight, length, width, height, general depth, cross sectional area, volume, surface area, uniformity, etc.), product specific features (i.e., ribeye area, % fat cover, fat to lean ratio, fat thickness, parallel end cuts, % bone content, etc.), color, meat cut values, specification status (whether or not the product meets specific specifications, such as industry standard, customer, or contract-specific specifications to which the product is intended to be cut), or any other parameter that can be identified by the classification system (such as system 32, for example).

Of course, all of the meat properties discussed herein are illustrative and not intended to be an exhaustive list.

Once each meat product has been classified based on the parameters above, the system (such as system 10 or any other system herein) can use the classification information to sort each meat product as desired based on any of the sorting processes and techniques as described in detail above. For example, as discussed above, once the analysis module 88 has analyzed the captured sensor data from the classification system (such as system 32) to determine the product classification (including any of the properties above) for the meat product, the analysis module 88 may then determine which position of a plurality of positions to place the pusher or diverter arm (such as pusher 36 or diverter arm 440 or any other such device for urging products of the sort conveyor 34) such that the meat product is guided into the proper loading station (such as station 38), bulk container (such as container 382), other target receptacle or area, or to the defective product conveyor 50 or other area for defective products. Based on the above determinations of the analysis module 88, the communication module 86 may control the pusher 36 or diverter arm 440 (or the like) to place it in the proper position based on the determination made by analysis module 88.

More specifically, the meat products can be sorted by meat cut values, meat cut type, or any other parameter or property listed above, along with any other know characteristic that can be identified. For example, the meat products can be sorted by weight such that all products of a similar type or weight are sorted to the same loading station, bulk container, or other predetermined area/receptacle. Alternatively, the meat products can be sorted by particular types of meat cuts, by one or more geometric features or any other characteristic. In further alternatives, the meat products can be sorted based on two or more characteristics. For example, the meat products can be sorted first by specific meat cuts and then those specific meat cuts are further divided between two or more loading stations (or other destination) as a function of another characteristic. In one specific example, meat products having the same meat cut type may be sorted into two loading stations, with those products of that particular meat cut are then sorted by weight into one of the two stations. More specifically, the system may sort briskets weighing 18-20 lbs., with a length between 14 and 16 inches, and a 1:3 fat to lean ratio. As yet another example, some embodiments may sort two different types of meat so that they are packaged in the same box.

It should be appreciated that sorting the various meat products into the selected loading stations (such as stations 38 or any other destination) and then into the corresponding box or other bulk packaging enables the delivery and sale of meat products as a function of the characteristic used to sort the meat products, including any of the characteristics discussed or contemplated herein.

In some implementations, the sorting decisions based on meat product characteristics can be made for general or ad-hoc combinations of properties. Alternatively, the analysis module can apply a formula, such as a Boolean function with weighted or unweighted properties. Those of skill in the art may make appropriate elections to control sorting in a desired manner.

According to additional embodiments, the meat may be sorted using other properties that are only indirectly related to the meat itself, such as time of day, location of the plant, intended destination for meat, supervisor or other personnel in the plant (e.g., a supervisor's preference), cost issues, or any other such property. Further, in some cases, these indirect properties may be used in combination or not in combination with direct meat properties discussed above.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-alone hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

The various system embodiments herein may have a plurality of backup modes to ensure the system can operate at different levels of performance to accommodate a plurality of real world wear and tear and malfunctions of the system.

In addition, any of the processing/packing system implementations herein may include a plurality of real time, near real time, and batched production data analytics and production data that may be viewed and accessed (i.e., average weight, current production rate, product counts, percent reject, etc.) to optimize upstream operations in real time. Among other things, production data analytics may include automated alerts after production parameters indicate a malfunction or reduced system productivity. In some embodiments, the system can feed product and its classification data to a third party sorting system.

While the various systems described above are separate implementations, any of the individual components, mechanisms, or devices, and related features and functionality, within the various system embodiments described in detail above can be incorporated into any of the other system embodiments herein.

The terms "about" and "substantially," as used herein, refers to variation that can occur (including in numerical quantity or structure), for example, through typical measuring techniques and equipment, with respect to any quantifiable variable, including, but not limited to, mass, volume, time, distance, wave length, frequency, voltage, current, and electromagnetic field. Further, there is certain inadvertent error and variation in the real world that is likely through differences in the manufacture, source, or precision of the components used to make the various components or carry out the methods and the like. The terms "about" and "substantially" also encompass these variations. The term "about" and "substantially" can include any variation of 5% or 10%, or any amount—including any integer—between 0% and 10%. Further, whether or not modified by the term "about" or "substantially," the claims include equivalents to the quantities or amounts.

Numeric ranges recited within the specification are inclusive of the numbers defining the range and include each integer within the defined range. Throughout this disclosure, various aspects of this disclosure are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range. Although the various embodiments have been described with reference to preferred implementations, persons skilled in the art will recognize that changes may be made in form and detail without departing from the spirit and scope thereof.

Although the various embodiments have been described with reference to preferred implementations, persons skilled in the art will recognize that changes may be made in form and detail without departing from the spirit and scope thereof.

What is claimed is:

1. A product processing system, comprising:

(a) a sorting conveyor configured to guide a product along the sorting conveyor;

(b) at least two product pushing devices associated with the sorting conveyor, wherein each of the at least two product pushing devices is configured to move between a first position and a second position;

(c) at least two loading stations associated with the sorting conveyor such that each of the at least two loading stations is disposed adjacent to one of the at least two product pushing devices; and (d) at least one processor configured to:
(i) control one or more sensors to capture sensor data regarding the product as the product moves through the product processing system;
(ii) determine, based at least in part on the sensor data, a product classification of the product, wherein the product classification includes a meat cut value;
(iii) select, based at least in part on the product classification, the second position for one of the at least two product pushing devices to guide the product into one of the at least two loading stations; and
(iv) control the one of the at least two pushing devices to be configured in the second position,
wherein the at least one processor is configured to select one of the at least two loading stations as a function of the meat cut value.

2. The product processing system of claim 1, further comprising a product classification device comprising at least one of the one or more sensors, wherein the at least one of the one or more sensors comprises at least one of a scale, a belt encoder, or an imaging device.

3. The product processing system of claim 1, wherein the product classification includes a confidence value, and wherein the at least one processor is configured to select the first or second position as a function of the confidence value.

4. The product processing system of claim 1, further comprising a spacing conveyor configured to space the product from adjacent products.

5. The product processing system of claim 1, wherein the at least two product pushing devices comprise pushing paddles or diverter arms.

6. The product processing system of claim 1, comprising a robotic arm configured to move the product from the one of the at least two loading stations to a bulk package.

7. The product processing system of claim 1, further comprising a packed box conveyor configured to move a packed box from one of the at least two loading stations.

8. The product processing system of claim 1, wherein the system automates product sorting by meat cut type, weight, geometric features, and/or product specific features.

9. The product processing system of claim 1, wherein the at least one processor is configured to control sorting as a function of a plurality of properties.

10. A product processing system, comprising:
(a) a spacing conveyor configured to space a product from adjacent products;
(b) a product classification device comprising at least one classification sensor, wherein the product classification device is configured to receive the product from the spacing conveyor;
(c) a sorting conveyor configured to receive the product from the product classification device;
(d) at least two product pushing devices associated with the sorting conveyor, wherein each of the at least two product pushing devices is configured to move between a first position and a second position;
(e) at least two product receiving areas associated with the sorting conveyor such that each of the at least two product receiving areas is disposed adjacent to one of the at least two product pushing devices, wherein the at least two product receiving areas comprise at least one loading station, wherein the loading station comprises:
(i) a chute disposed adjacent to the sorting conveyor;
(ii) a product landing area disposed at the bottom of the chute; and
(iii) a takeaway conveyor disposed under the chute; and
(f) at least one processor configured to:
(i) control the at least one classification sensor and at least one additional sensor to capture sensor data regarding the product as the product moves through the product processing system;
(ii) determine, based at least in part on the sensor data, a product classification of the product;
(iii) select, based at least in part on the product classification, the second position for one of the at least two product pushing devices to guide the product into one of the at least two product receiving areas; and
(iv) control the one of the at least two pushing devices to be configured in the second position.

11. The product processing system of claim 10, wherein the at least one classification sensor comprises a scale, a belt encoder, or an imaging device.

12. The product processing system of claim 10, wherein the at least two product receiving areas comprise at least one bulk container.

13. The product processing system of claim 10, further comprising a packed box conveyor disposed adjacent to the takeaway conveyor, wherein the packed box conveyor is configured to receive a packed box from the takeaway conveyor and transport the packed box away from the takeaway conveyor.

14. The product processing system of claim 10, further comprising an empty box conveyor associated with the at least product receiving areas.

15. The product processing system of claim 10, wherein the system automates product sorting by meat cut type, weight, geometric features, and/or product specific features.

16. A product processing system, comprising:
(a) a product classification device comprising at least one classification sensor;
(b) a stacked conveyor structure comprising:
(i) a sorting conveyor configured to receive the product from the product classification device, the sorting conveyor comprising at least two product pushing devices associated with the sorting conveyor, wherein each of the at least two product pushing devices is configured to move between a first position and a second position; and
(ii) a packed box conveyor disposed under the sorting conveyor, wherein the packed box conveyor is configured to transport at least one packed box;
(c) at least two loading stations disposed adjacent to the stacked conveyor structure such that each of the at least two loading stations is disposed adjacent to one of the at least two product pushing devices; and
(d) at least one processor configured to:
(i) control the at least one classification sensor and at least one additional sensor to capture sensor data regarding the product as the product moves through the product processing system;
(ii) determine, based at least in part on the sensor data, a product classification of the product;
(iii) select, based at least in part on the product classification, the second position for one of the at least two product pushing devices to guide the product into one of the at least two loading stations; and
(iv) control the one of the at least two pushing devices to be configured in the second position.

17. The product processing system of claim 16, further comprising a spacing conveyor configured to space a product from adjacent products and transport the product to the product classification device.

18. The product processing system of claim 16, wherein the loading station comprises:

(a) a chute disposed adjacent to the sorting conveyor;

(b) a computer interface coupled to the chute, wherein the computer interface is operably coupled to the at least one processor;

(c) a product landing area disposed at the bottom of the chute; and (d) a takeaway conveyor disposed under the chute and adjacent to the packed box conveyor.

19. The product processing system of claim 16, wherein the stacked conveyor structure further comprises a rejected product conveyor disposed under the sorting conveyor.

20. The product processing system of claim 16, wherein the system automates product sorting by meat cut type, weight, geometric features, and/or product specific features.

* * * * *